United States Patent
Bartel et al.

(10) Patent No.: US 11,198,408 B2
(45) Date of Patent: Dec. 14, 2021

(54) CONTROL SYSTEM FOR A TERRAIN WORKING VEHICLE HAVING AN OPERATOR PROTECTION APPARATUS

(71) Applicant: Excel Industries, Inc., Hesston, KS (US)

(72) Inventors: Harlan J. Bartel, Newton, KS (US);
Eric M. Biggs, Hesston, KS (US);
Brian R. Funk, Goessel, KS (US);
Ronald E. Lefevre, Hesston, KS (US);
Royce A. Steinert, Hutchinson, KS (US); James A. Wright, Hesston, KS (US); Brian L. Nebel, Hesston, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 66 days.

(21) Appl. No.: 16/700,715

(22) Filed: Dec. 2, 2019

(65) Prior Publication Data
US 2020/0101920 A1 Apr. 2, 2020

Related U.S. Application Data

(63) Continuation-in-part of application No. 15/786,219, filed on Oct. 17, 2017, now Pat. No. 10,493,939, and
(Continued)

(51) Int. Cl.
*B60R 21/13* (2006.01)
*B60R 21/11* (2006.01)
(Continued)

(52) U.S. Cl.
CPC .......... *B60R 21/131* (2013.01); *A01D 34/828* (2013.01); *A01D 75/20* (2013.01);
(Continued)

(58) Field of Classification Search
CPC ..... B60R 21/11; B60R 21/131; A01D 34/828; A01D 2101/00; A01D 75/20; F16C 2310/00
See application file for complete search history.

(56) References Cited

U.S. PATENT DOCUMENTS 2,806,618 A 9/1957 Cook
3,584,897 A 6/1971 George et al.
(Continued)

FOREIGN PATENT DOCUMENTS

EP 0051100 A1 5/1982
EP 1197399 A2 4/2002
(Continued)

OTHER PUBLICATIONS

Ayers, P. et al., "Improving ROPS designs for agricultural tractors", University of Tennessee Department of Biosystems Engineering and Soil Science, International Conference RAGUSA SHAW 2012, Sep. 3-6, 2012, Ragusa, Italy, 7 pages.
(Continued)

*Primary Examiner* — Laura Freedman
(74) *Attorney, Agent, or Firm* — Shook, Hardy & Bacon, LLP

(57) ABSTRACT

Aspects hereof relate to a control system for a terrain working vehicle having an operator protection apparatus. In some aspects, the control system instructs and ceases an actuation of the operator protection apparatus to and between a raised position and a lowered position.

20 Claims, 31 Drawing Sheets

Related U.S. Application Data a continuation-in-part of application No. 16/601,274, filed on Oct. 14, 2019, now abandoned, said application No. 15/786,219 is a continuation-in-part of application No. 15/418,402, filed on Jan. 27, 2017, now Pat. No. 10,562,479, which is a continuation of application No. 15/041,718, filed on Feb. 11, 2016, now Pat. No. 9,573,548, said application No. 16/601,274 is a continuation of application No. 15/415,630, filed on Jan. 25, 2017, now Pat. No. 10,377,333, which is a continuation-in-part of application No. 15/041,718, filed on Feb. 11, 2016, now Pat. No. 9,573,548, and a continuation-in-part of application No. 15/133,293, filed on Apr. 20, 2016, now Pat. No. 10,442,385, which is a continuation of application No. 14/540,708, filed on Nov. 13, 2014, now Pat. No. 9,327,670, which is a continuation of application No. 13/655,014, filed on Oct. 18, 2012, now Pat. No. 8,905,434, which is a continuation-in-part of application No. 12/945,277, filed on Nov. 12, 2010, now Pat. No. 8,528,924.

(60) Provisional application No. 61/281,059, filed on Nov. 12, 2009, provisional application No. 62/115,868, filed on Feb. 13, 2015.

(51) Int. Cl.
 *A01D 34/82* (2006.01)
 *A01D 75/20* (2006.01)
 *A01D 101/00* (2006.01)

(52) U.S. Cl.
 CPC .......... *B60R 21/11* (2013.01); *A01D 2101/00* (2013.01); *F16C 2310/00* (2013.01)

(56) References Cited

U.S. PATENT DOCUMENTS

| | | | |
|---|---|---|---|
| 3,762,761 A | 10/1973 | Erickson | |
| 3,934,679 A | 1/1976 | Lieptz | |
| 4,202,565 A | 5/1980 | Mosch | |
| 4,666,183 A | 5/1987 | Azzarello | |
| 4,708,389 A | 11/1987 | Maebayashi et al. | |
| 4,715,468 A | 12/1987 | Karl-Heinz et al. | |
| 4,840,398 A | 6/1989 | Matthias et al. | |
| 4,877,265 A | 10/1989 | DeBraal et al. | |
| 4,949,991 A | 8/1990 | Ludwig | |
| 5,042,835 A | 8/1991 | Burns | |
| 5,129,676 A | 7/1992 | Sheehan | |
| 5,383,532 A * | 1/1995 | Shonai ................... | B60K 28/04 180/269 |
| 5,393,093 A | 2/1995 | Wunsche et al. | |
| 5,503,430 A | 4/1996 | Miki et al. | |
| 5,542,493 A * | 8/1996 | Jacobson ............... | B60K 28/04 180/272 |
| 5,779,272 A | 7/1998 | Panek et al. | |
| 5,839,758 A | 11/1998 | Finch et al. | |
| 6,299,207 B1 * | 10/2001 | Bares ..................... | B60R 21/02 180/268 |
| 6,322,130 B1 | 11/2001 | Wand?n et al. | |
| 6,902,024 B2 | 6/2005 | Miiller et al. | |
| 7,152,903 B2 | 12/2006 | Westendorf et al. | |
| 7,222,882 B2 | 5/2007 | Boucher | |
| 7,311,330 B2 | 12/2007 | Kachouh | |
| 7,396,047 B1 | 7/2008 | Young | |
| 7,434,379 B2 | 10/2008 | Nogami et al. | |
| 7,438,319 B2 | 10/2008 | Cooper et al. | |
| 7,565,732 B2 | 7/2009 | Le et al. | |
| 7,568,732 B2 | 8/2009 | Schlup, Jr. | |
| 7,922,201 B2 | 4/2011 | K?rten et al. | |
| 7,971,904 B2 | 7/2011 | David | |
| 7,971,905 B2 | 7/2011 | McCord et al. | |
| 8,016,320 B2 | 9/2011 | Becker | |
| 8,029,019 B2 | 10/2011 | Schmidt et al. | |
| 8,403,363 B2 | 3/2013 | Duenchel et al. | |
| 8,419,061 B2 | 4/2013 | Fukunaga et al. | |
| 8,424,911 B2 | 4/2013 | Alexander, IV | |
| 8,523,225 B2 | 9/2013 | Reinke et al. | |
| 8,528,924 B1 | 9/2013 | Bartel et al. | |
| 8,662,534 B2 | 3/2014 | Beki | |
| 8,905,434 B1 | 12/2014 | Bartel et al. | |
| 9,327,670 B1 | 5/2016 | Bartel et al. | |
| 9,573,548 B2 | 2/2017 | Bartel et al. | |
| 9,616,837 B1 | 4/2017 | Bartel et al. | |
| 10,377,333 B2 * | 8/2019 | Bartel ................... | B60R 21/131 |
| 10,442,385 B2 * | 10/2019 | Bartel ................... | B60R 21/131 |
| 10,493,939 B2 * | 12/2019 | Bartel ................... | A01D 75/20 |
| 10,562,479 B2 * | 2/2020 | Bartel ................... | A01D 75/20 |
| 2003/0046794 A1 | 3/2003 | Muir | |
| 2005/0082808 A1 | 4/2005 | Wildig et al. | |
| 2005/0212278 A1 | 9/2005 | Kurten et al. | |
| 2005/0217232 A1 | 10/2005 | Asahara et al. | |
| 2006/0001248 A1 | 1/2006 | Queveau et al. | |
| 2007/0094847 A1 | 5/2007 | Thomson | |
| 2007/0209160 A1 | 9/2007 | Darscheid et al. | |
| 2007/0290493 A1 | 12/2007 | David | |
| 2008/0034552 A1 | 2/2008 | Nguyen | |
| 2008/0136155 A1 | 6/2008 | Janisch et al. | |
| 2008/0217897 A1 | 9/2008 | Latussek | |
| 2008/0309058 A1 | 12/2008 | Kurten et al. | |
| 2017/0050600 A1 | 2/2017 | Bartel et al. | |
| 2017/0129438 A1 | 5/2017 | Bartel et al. | |
| 2017/0136974 A1 | 5/2017 | Bartel et al. | |
| 2018/0037183 A1 | 2/2018 | Bartel et al. | |
| 2020/0062205 A1 * | 2/2020 | Bartel ................... | B60R 21/131 |

FOREIGN PATENT DOCUMENTS

| | | | |
|---|---|---|---|
| EP | 1844990 | A2 | 10/2007 |
| FR | 2541953 | A1 | 9/1984 |
| GB | 2175259 | A | 11/1986 |
| JP | H0640299 | A | 2/1994 |
| JP | H0648259 | A | 2/1994 |
| JP | H07323798 | A | 12/1995 |

OTHER PUBLICATIONS

University of Tennessee, Knoxville, Powered Foldable ROPS, Senior Project, Document created May 1, 2009, Publication Date Unknown. Not Uploaded.
Notice of Acceptance dated Dec. 2, 2019 in Australian Patent Application No. 2016219120, 3 pages.
Examiner's Report dated Dec. 23, 2019 in Canadian Patent Application No. 2,976,453, 6 pages.
Office Action received for Canadian Patent Application No. 2976453, dated Nov. 3, 2020, 4 pages.
Non-Final Office Action dated Apr. 12, 2021 in U.S. Appl. No. 16/538,424, 11 pages.
Notice of Allowance received for Canadian Patent Application No. 2,976,453, dated May 6, 2021, 1 page.

* cited by examiner

CONTROL SYSTEM FOR A TERRAIN WORKING VEHICLE HAVING AN OPERATOR PROTECTION APPARATUS

CROSS-REFERENCE TO RELATED APPLICATIONS

This application is a continuation-in-part of co-pending U.S. application Ser. No. 15/786,219, filed Oct. 17, 2017, and entitled "Lever-Actuated Operator Protection Apparatus" (the "219 Application") and is also a continuation-in-part of co-pending U.S. application Ser. No. 16/601,274, filed Oct. 14, 2019, and entitled "Deployable Operator Protection Apparatus with an Over-Center Linkage" (the "274 Application"). The '219 Application is a continuation-in-part of co-pending U.S. application Ser. No. 15/418,402, filed Jan. 27, 2017, and entitled "Operator Protection Apparatus with an Over-Center Linkage" (the "402 Application"). The '402 Application is a continuation of U.S. application Ser. No. 15/041,718, filed Feb. 11, 2016, and also entitled "Operator Protection Apparatus with an Over-Center Linkage" (the "718 Application"). The '718 Application claims the benefit of U.S. Provisional Application No. 62/115,868, filed Feb. 13, 2015, and entitled "Rollover Protection Apparatus with an Over-Center Mechanism." The '274 Application is a continuation of U.S. application Ser. No. 15/415,630, filed Jan. 25, 2017, and entitled "Deployable Operator Protection Apparatus With An Over-Center Linkage" (the "630 Application"). The '630 Application is a continuation-in-part of the '718 Application and U.S. application Ser. No. 15/133,293, filed Apr. 20, 2016, and entitled "Rollover Protection Apparatus" (the "293 Application"). The '293 Application is a continuation of U.S. application Ser. No. 14/540,708, filed Nov. 13, 2014, and entitled "Rollover Protection Apparatus" (the "708 Application"). The '708 Application is a continuation of U.S. application Ser. No. 13/655,014, filed on Oct. 18, 2012, and entitled "Rollover Protection Apparatus" (the "014 Application"). The '014 Application is a continuation-in-part of U.S. application Ser. No. 12/945,277, filed Nov. 12, 2010, and entitled "Rollover Protection System" (the "277 Application"). The '277 Application claims the benefit of U.S. Provisional Application No. 61/281,059, filed on Nov. 12, 2009, and entitled "Rollover Protection System." The contents of each of the aforementioned applications are incorporated herein by reference in their entirety.

FIELD

Aspects provided relate to an operator protection apparatus for vehicles. More particularly, aspects herein relate to a lever-actuated operator protection apparatus that moves from a raised position to a lowered position and is suitable for use on a number of vehicles, including terrain working vehicles.

BACKGROUND

Some operator or operator protection apparatuses for terrain working vehicles may have a fold-down capability for avoiding overhead obstacles. Traditionally, foldable operator protection apparatuses have included a lower portion in a fixed position and an upper portion that is mounted to the lower portion. Further, many foldable operator protection apparatuses require that an operator physically rotate the upper portion between a raised and a lowered position, which may require that the operator leave the seating platform of the vehicle. Resultantly, efficiencies in the operation performed by the operator may be reduced.

Additionally, previous foldable operator protection apparatuses have used bulky securing devices to secure the upper portion in a raised position. Various securing devices, such as removable pins and the like, have been employed to secure upper portions in a raised position. Further, as can be appreciated, removable securing devices may be lost or misplaced, further decreasing efficiencies of the operator during operations.

SUMMARY

Aspects hereof relate to an operator protection apparatus that can be lowered and raised to a locked position using at least one over-center linkage. The operator protection apparatus includes a lower portion and an upper portion that is movable relative to the lower portion. The upper portion may be coupled to the lower portion with one or more hinge joints. Additionally, the at least one over-center linkage may be pivotably coupled to the upper portion and the lower portion. In some aspects, the over-center linkage includes a lower link assembly and an upper link assembly coupled at a center pivot joint. Additionally, the over-center linkage may be configured to move between the locked position and an unlocked position. When the over-center linkage is in the locked position, the over-center linkage may retain the upper portion in the raised position. Further, the apparatus may include an actuator coupled to the over-center linkage for moving the apparatus between the locked and/or raised position and the unlocked and/or or lowered position.

Additional aspects hereof relate to a lever-actuated operator protection apparatus. The lever-actuated operator protection apparatus includes a lower portion, an upper portion, and a hinge joint, which may couple the lower portion and the upper portion such that the upper portion is movable relative to the lower portion. Additionally, the lever-actuated operator protection apparatus includes a lever (e.g., a hand lever) having a first end coupled with the operator protection apparatus. The lever also includes a second end that is positioned forward of the hinge joint, when the upper portion is in a raised position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
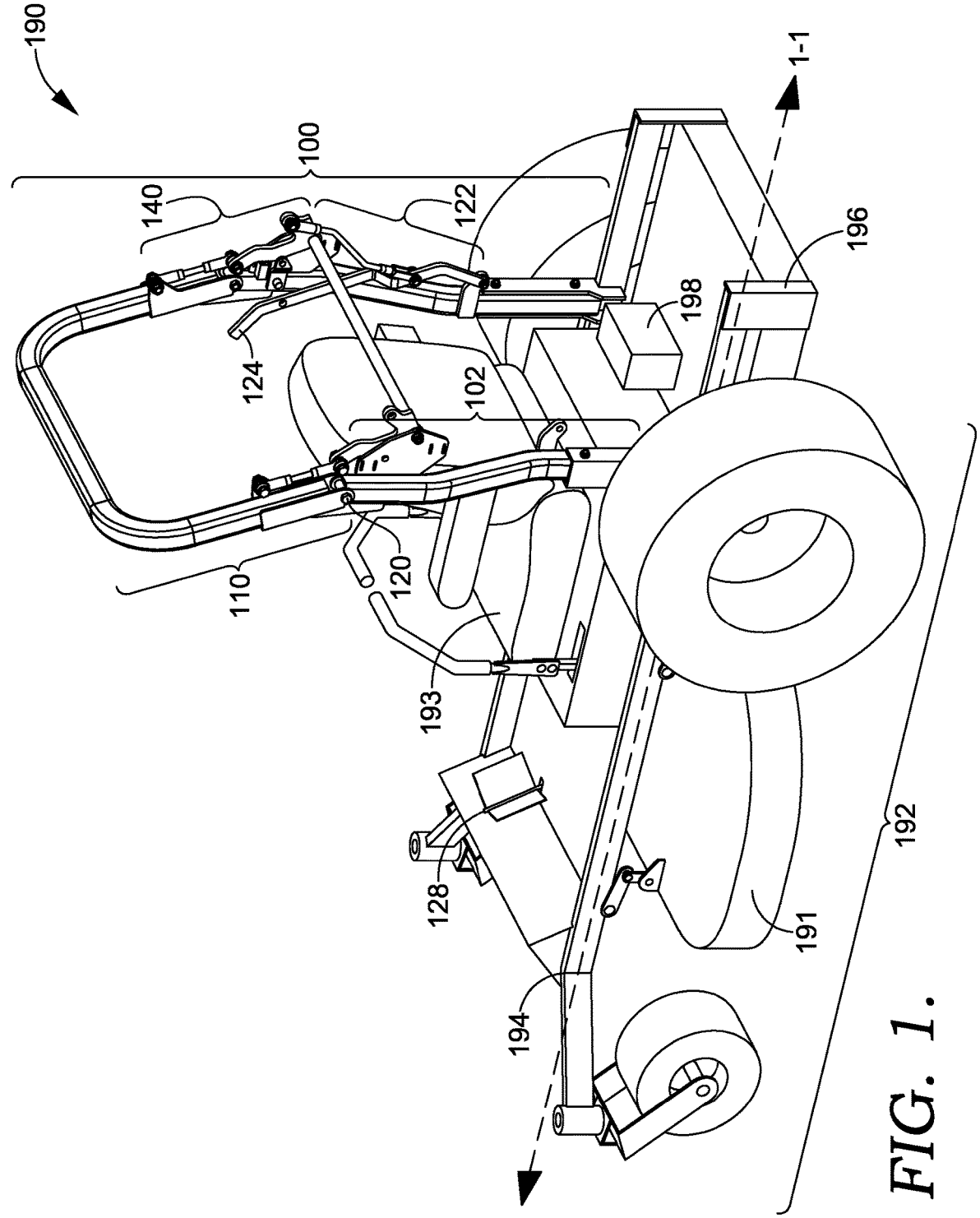
FIG. 1 depicts a riding mower having an operator protection apparatus affixed thereto in a raised position, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Aspects hereof relate to an operator protection apparatus that can be raised and lowered by an operator in a seated position, for example, on a riding mower. Additionally, the operator protection apparatus may lock in the raised position. The movement and locking may be facilitated by an over-center linkage. For example, when an operator raises an upper portion of the operator protection apparatus, a center pivot joint of the over-center linkage may be configured to move to a position past a centerline defined as extending between pivots points at opposing ends of the linkage. Accordingly, a mechanical force is then required to overcome the lock and allow the operator protection apparatus to return to a lowered position.

As a result, an operator may lower the upper portion of the operator protection apparatus, for example to avoid an obstacle, without stopping operation or leaving an operator seat of the vehicle. As can be appreciated, the convenience and ease of use of the operator protection apparatuses described herein may be conducive to improving the frequency of use of the operator protection apparatus. Further, the over-center linkage may provide a securing device that remains attached to the operator protection apparatus. Accordingly, the operator protection apparatuses provided herein may be secured in the raised and/or locked position using a securing device without loose parts. As a result, the apparatuses provided herein may eliminate the need for removable securing mechanisms, which if detached and misplaced, may cause inefficiencies during the operation of a vehicle associated with the operator protection apparatus.

A first exemplary embodiment provides for an operator protection apparatus, the apparatus comprising a lower portion and an upper portion. The lower portion may have a first end and a second end and the upper portion may also have a first end and a second end. The apparatus may also include at least one hinge joint (e.g., pivot) coupling the lower portion second end to the upper portion first end such that the upper portion is movable relative to the lower portion. Stated differently, the upper portion may be pivotably coupled with the lower portion. Further, in some aspects, the apparatus comprises at least one over-center linkage effective to lock the upper portion in a set position (e.g., raised) relative to the lower portion. The over-center linkage comprises a lower link assembly having a first end and a second end, the first end is pivotably coupled to the lower portion at a lower pivot joint. The over-center linkage further comprises an upper link assembly having a first end and a second end, the upper link assembly first end is pivotably coupled to the lower link assembly second end forming a center pivot joint, and the upper link assembly second end is pivotably coupled with the upper portion at an upper pivot joint. Accordingly, the over-center linkage is in a locked position when the center pivot joint is on a first side of a line extending between the lower pivot joint and the upper pivot joint and the center pivot joint is in an unlocked position on a second side of the line. The apparatus may also include at least one actuator coupled to the over-center linkage.

A second exemplary embodiment provides for an operator protection apparatus for a terrain working vehicle. The operator protection apparatus may comprise a lower portion having a first end and a second end, wherein the first end is affixed to a frame of the terrain working vehicle; an upper portion having a first end and a second end; and at least one hinge joint coupling the lower portion second end to the upper portion first end such that the upper portion is movable relative to the lower portion. The operator protection apparatus may include at least one over-center linkage, the at least one over-center linkage comprising: a lower link assembly having a first end and a second end, the first end pivotably coupled to the lower portion at a lower pivot joint; an upper link assembly having a first end and a second end, the upper link assembly first end pivotably coupled to the lower link assembly second end forming a center pivot joint, and the upper link assembly second end pivotably coupled with the upper portion at an upper pivot joint. In one aspect, the over-center linkage is in a locked position when the center pivot joint is on a first side of a line extending between the lower pivot joint and the upper pivot joint and the center pivot joint is in an unlocked position on a second side of the line. The operator protection apparatus may also include at least one actuator coupled to the over-center linkage.

Yet another exemplary embodiment provides for a riding mower having an operator protection apparatus. The riding mower may comprise a frame; a mower deck coupled to the frame; and an operator protection apparatus. The apparatus may comprise: a lower portion comprising a first lower portion upright having a first upright first end and a first upright second end, and a second lower portion upright having a second upright first end and a second upright second end. The apparatus may additionally comprise an upper portion comprising a first upper portion member having a first member first end and a first member second end, a second upper portion member having a second member first end and a second member second end, and a transverse member disposed between the first member second end and the second member second end. The apparatus may also include a pair of hinge joints coupling the first upright second end to the first member first end and the second upright second end to the second member first end such that the upper portion is movable relative to the lower portion. Further, the apparatus comprises a first over-center linkage, the first over-center linkage comprising: a first lower link assembly having a first lower link first end and a first lower link second end, wherein the first lower link first end is pivotably coupled to the first lower portion upright at a first lower link pivot joint; a first upper link assembly having a first upper link first end and a first upper link second end, wherein the first upper link assembly first end is pivotably coupled to the first lower link assembly second end at a first center pivot joint. In one aspect, the first over-center linkage is in a locked position when the first center pivot joint is on a first side of a first line extending between the first lower link pivot joint and the first upper link pivot joint, and the first over-center linkage is in an unlocked position when the first center pivot joint is on a second side of the first line. The operator protection apparatus may also include a first actuator coupled to the first over-center linkage at a first actuator-over-center pivot joint and coupled to the first lower portion upright at a first actuator-upright pivot joint for moving the upper portion between locked position and the unlocked position. The riding mower may also include a controller for controlling one or more operations of the riding mower; and one or more sensors communicatively coupled to the controller.

FIG. 1 depicts an exemplary aspect of an operator protection apparatus 100 mounted on a riding mower 190, in accordance with aspects hereof. In some aspects, the riding mower may include a mower deck 191 coupled to the frame 192 and a controller 198. The riding mower 190 may also comprise a frame 192 having a frame first end 194 and a frame second end 196. In one aspect herein, a horizontal line 1-1 extending from the frame first end 194 to the frame second end 196 defines a horizontal plane, which may be referred to herein in order to describe locations and positions of various components of the operator protection apparatuses described herein. The mower 190 of FIG. 1 is exemplary in nature. It is contemplated that the operator protection apparatus of provided herein may be associated with any vehicle having an occupant. Nonlimiting examples of vehicles with which the operator protection apparatus may be associated include terrain working vehicles, lawn tractors, UTVs, ATVs, compact tractors, and loaders.

The operator protection apparatus 100 may include a lower portion 102 and an upper portion 110. In some aspects, the lower portion 102 may comprise a pair of mirror-image lower portion 102 uprights. Accordingly, the lower portion 102 may be described herein as comprising the pair of lower portion 102 uprights. The lower portion 102 may be affixed to or integrally formed with a frame of any number of vehicles. Similarly, the upper portion 110 may include a pair of mirror-image upper portion members and a transverse member affixed between the upper portion members.

Accordingly, the upper portion 110 may be described herein as comprising the upper portion members and the transverse member. However, as will be provided hereinafter, alternative configurations are contemplated while achieving the aspects provided for the operator protection apparatus 100.

Further, the operator protection apparatus 100 may comprise at least one hinge joint 120 for coupling the lower portion 102 to the upper portion 110 and at least one over-center linkage 140. The over-center linkage 140 may be pivotably coupled to the lower portion 102 and the upper portion 110. Further, the over-center linkage 140 may be movable between a locked and an unlocked position. In one example, when in the locked position, the over-center linkage 140 may provide a mechanical stop to prevent back-driving of the operator protection apparatus 100, in order to keep the operator protection apparatus 100 in a raised position.

Figure 2:
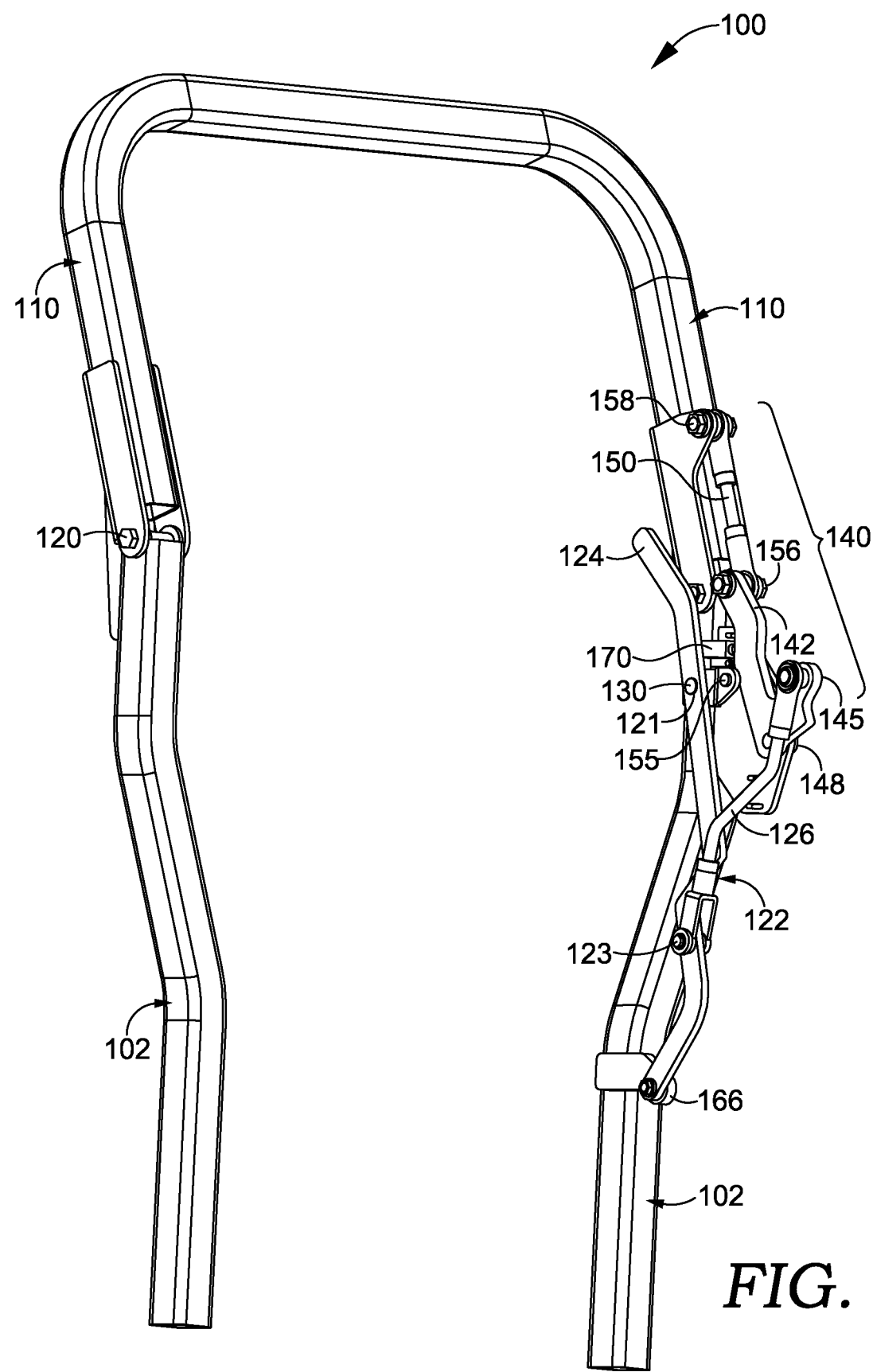
FIG. 2 depicts a perspective view of an operator protection apparatus having an over-center linkage in a raised position, in accordance with aspects hereof.

FIG. 2 depicts a perspective view of one embodiment of the operator protection apparatus 100 having at least one over-center linkage 140, in accordance with aspects hereof. The operator protection apparatus 100 may include a lower portion 102 and an upper portion 110. Additionally, the operator protection apparatus 100 may include at least one over-center linkage 140. In some aspects, the over-center linkage 140 may include a lower link assembly 142 pivotably coupled to the lower portion 102 at a lower pivot joint 148. Further, the over-center linkage 140 may include an upper link assembly 150 pivotably coupled to the lower link assembly 142 at a center pivot joint 156. Additionally, the upper link assembly 150 may be pivotably coupled with the upper portion 110 at an upper pivot joint 158. Any of the links, members, or other elements may be adjustable in orientation and/or length to achieve aspects provided herein. For example, the upper link assembly 150 may be an opposing threaded screw link allowing for a rotational movement to adjust the length of the link.

Further, the operator protection apparatus 100 may include a stop lug 155 for limiting movement of the over-center linkage 140 beyond the locked position. In one aspect, the stop lug 155 may be affixed to the lower portion 102 (for example via a bracket) such that the lower link assembly 142 contacts the stop lug 155 when the over-center linkage 140 is in the locked position. In other aspects, the stop lug 155 may be affixed to the upper portion 110. The stop lug 155 is one example of a mechanism for limiting movement of the over-center linkage 140 beyond the locked position. Other structures and mechanisms for limiting movement of the over-center linkage 140 may also be employed. In an additional aspect, the stop lug 155, or other stopping mechanism, may be associated with the over-center linkage 140. For example, the stop lug 155 may be affixed to the over-center linkage 140 such that the stop lug 155 contacts the surface of the lower portion 102 and/or the upper portion 110. Additionally, one or more pivot joints associated with the over-center linkage 140 (for example, lower pivot joint 148, upper pivot joint 158, and center pivot joint 156) may be limited pivot joints, such that the joints include a limiter for limiting rotation past the locked position.

Additionally, the operator protection apparatus 100 may include at least one actuator 122 coupled to the over-center linkage 140. The actuator 122 may generally operate to articulate the over-center linkage 140 between the locked position and the unlocked positon. In some aspects, once the actuator 122 has moved the over-center linkage 140 to the unlocked position, the actuator 122 may provide a force required to move the upper portion 110 to the lowered position and return the upper portion 110 to the a raised and/or locked position. Although shown here as a hand lever 124, the actuator 122 may be a powered actuator, such as an electric, pneumatic, hydraulic, or mechanical actuator. Several examples of actuators are described below, however any suitable mechanism for performing the actuation is considered within the scope of this disclosure.

Additionally, the apparatus may comprise at least one securing device 130 associated with the over-center linkage 140 and permanently affixed to the apparatus. In one aspect, the securing device 130 may include a projection for engaging a securing device engagement aperture 121 of the hand lever 124. In one example, the projection may be spring-loaded, such that when the projection is aligned with a securing device engagement aperture 121, the hand lever 124 is secured. Further, the securing device 130 may include a sensor for detecting an engagement of the securing device 130. In some aspects, the sensor may be integrated with the securing device 130, or may be associated with the securing device 130. Any number of securing devices may be suitable for securing the actuator 122. At a high level, the securing device 130 retains the actuator 122, such that the actuator 122 ensures the over-center linkage 140 remains in the locked position.

In one aspect, the operator protection apparatus 100 includes a position sensor 170. The position sensor 170 may be configured to detect one or more positions of the operator protection apparatus 100. For example, the sensor may be configured to detect when the operator protection apparatus 100 is in a locked position. In additional aspects, the position sensor 170 may be detect when the operator protection apparatus 100 is in the raised position, but is not in the locked position. In one aspect, a position sensor 170 may include a projection that is depressed when the over-center linkage 140 is in the locked position. Further, in some aspects of the position sensor 170 may be configured to communicate the one or more positions, for example to a controller 198 (described in more detail below). Accordingly, a time that the operator protection apparatus 100 is in each position of the one or more positions may be determined using the sensed information detected by the position sensor 170.

Figure 3:
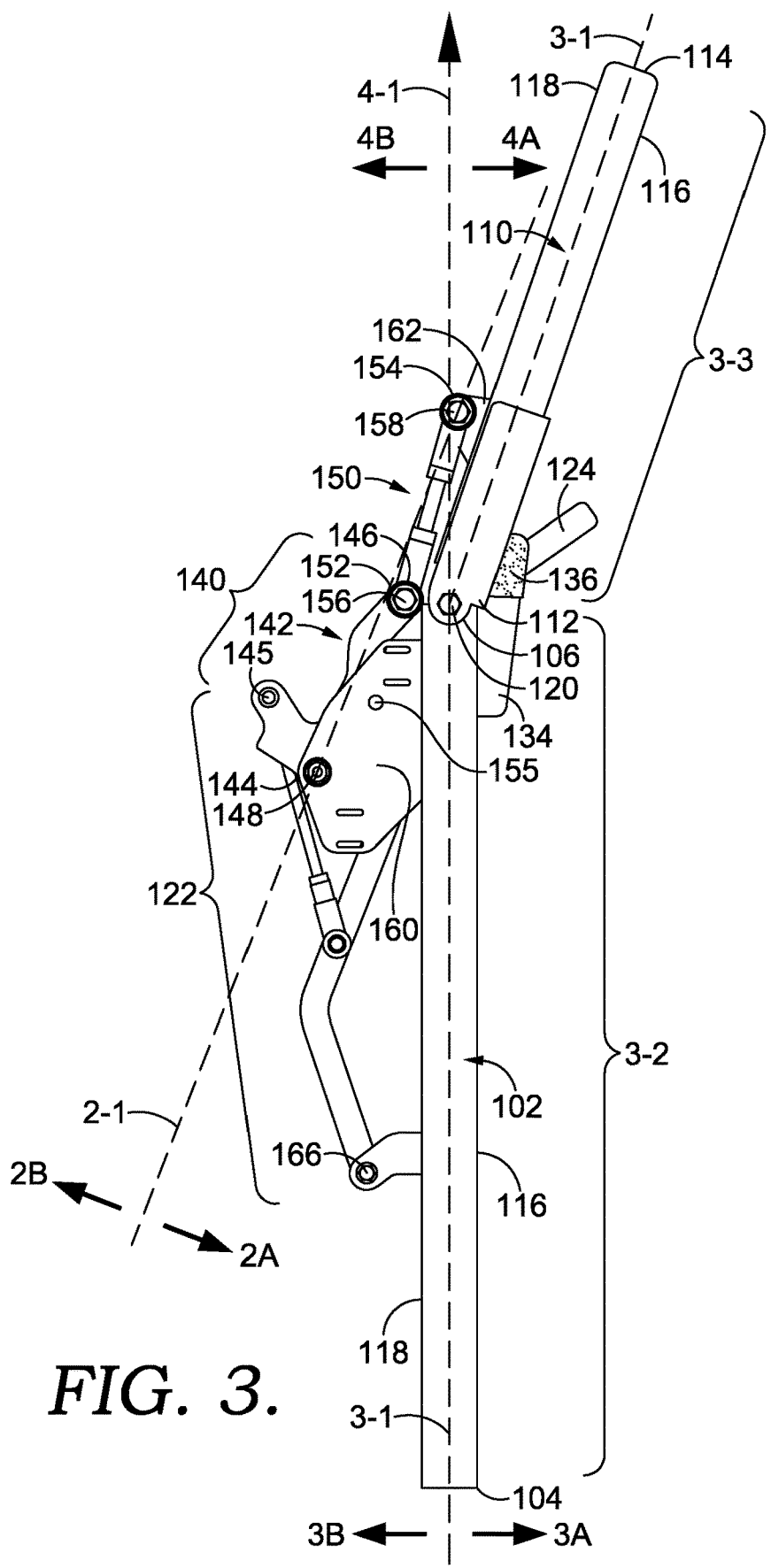
FIG. 3 depicts a side view of the operator protection apparatus of FIG. 2 in the raised position, in accordance with aspects hereof.

As shown in FIG. 3, the lower portion 102 may comprise a lower portion first end 104 and a lower portion second end 106. The lower portion first end 104 may be welded to (or fastened using any number of means), or may be integrally formed with a frame of a vehicle. Accordingly, the term "end," as used herein, does not necessarily indicate a point at which a given component terminates. For example, the lower portion first end 104 may be contiguous with the frame of the vehicle. The upper portion 110 may include an upper portion first end 112 and an upper portion second end 114. The operator protection apparatus 100 may also include at least one hinge joint 120, as described above. In one aspect, the at least one hinge joint 120 may couple the lower portion second end 106 to the upper portion first end 112, such that the upper portion 110 is movable relative to the lower portion 102.

The over-center linkage 140 may include the lower link assembly 142 having a lower link first end 144 and a lower link second end 146. The lower link first end may be pivotably coupled to the lower portion 102 at the lower pivot joint 148. Further, the over-center linkage 140 may include an upper link assembly 150 having an upper link first end 152 and an upper link second end 154. The upper link first end 152 may be pivotably coupled to the lower link second end 146 to form a center pivot joint 156. Additionally, the upper link assembly second end may be pivotably coupled with the upper portion 110 at an upper pivot joint 158.

Figure 5:
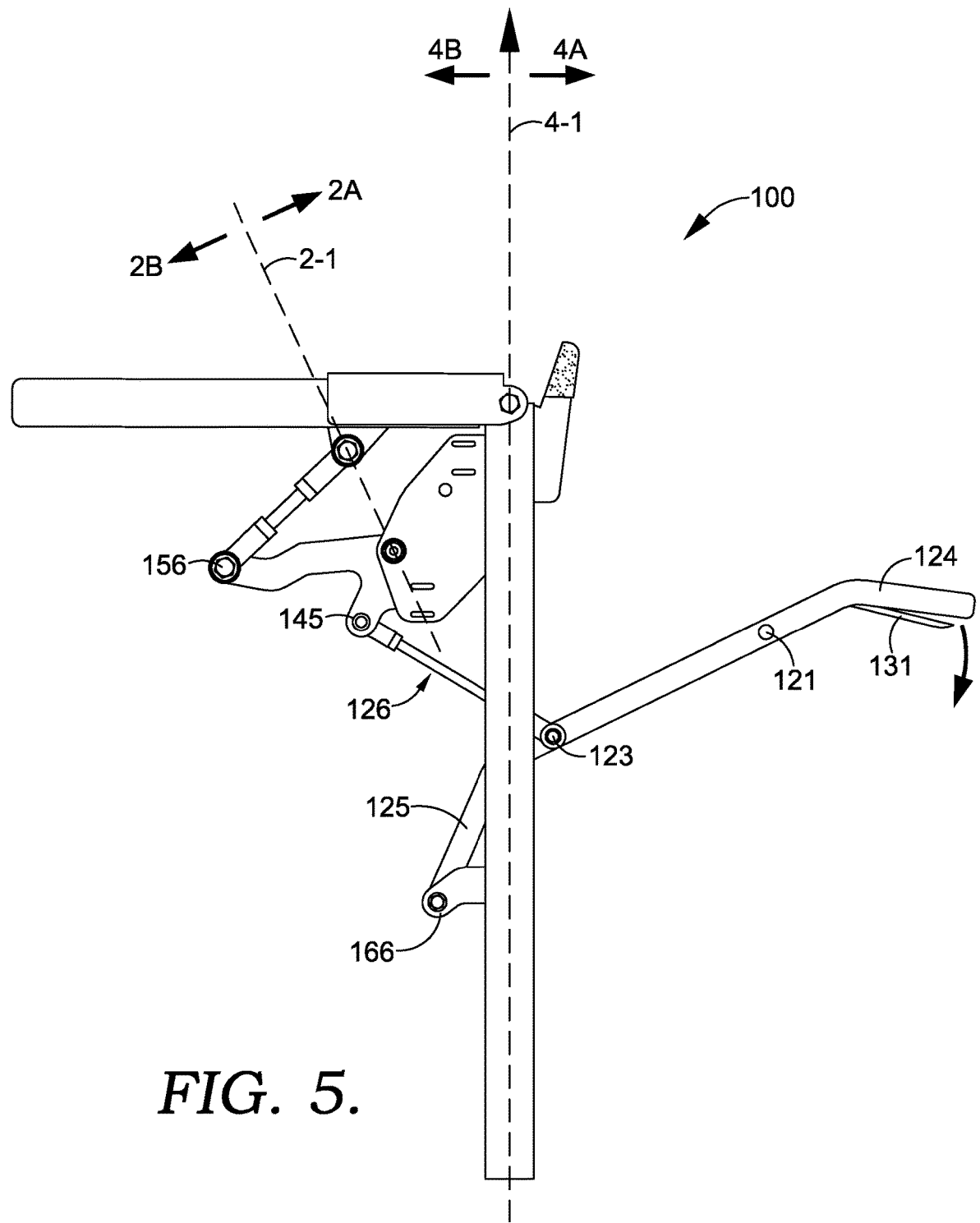
FIG. 5 depicts a perspective view of the operator protection apparatus of FIG. 2 in a lowered position, in accordance with aspects hereof.

Turning now to more particular aspects, the over-center linkage 140 may include a centerline 2-1 extending between the lower pivot joint 148 and the upper pivot joint 158. The centerline 2-1 may include a first side 2A and a second side 2B. The over-center linkage 140 may be in a locked position when the center pivot joint 156 is on the first side 2-1 of centerline 2-1. Accordingly, the over-center linkage 140 may be in an unlocked position (as shown in FIG. 5) when the center pivot joint 156 is on the second side 2B of the centerline 2-1. As can be appreciated, in alternative configurations the over-center linkage 140 may be oriented and positioned such that the over-center linkage 140 is configured to be in the locked position in a variety of directions. Such alternative configurations are considered within the scope of this disclosure.

Further, when the over-center linkage 140 is in the locked position, the over-center linkage 140 may provide a mechanical stop to prevent back-driving of the mechanism. In some aspects, the movement of the center pivot joint 156 in the direction of the first side may be limited, for example, such by the stop lug 155. In other aspects, the center pivot joint 156 may be limited by the lower portion 102 and the upper portion 110, or by a center pivot joint 156 that limits rotation in the direction of the first side.

The operator protection apparatus 100 may be described as having a midline 3-1. The midline 3-1 of the operator protection apparatus 100 may have a first midline line segment 3-2 extending from the lower portion first end 104 to the hinge joint 120 and a second midline line segment 3-3 extending from the hinge joint 120 to the upper portion second end 114. Accordingly, the midline 3-1 may define a midline first side 3A and a midline second side 3B. Further, a lower portion ray 4-1 may extend from the lower portion first end 104 through the hinge joint 120. Said another way, the lower portion ray 4-1 may be an extension of first midline line segment 3-2. Further, the lower portion ray 4-1 may have a lower portion ray first side 4A and a lower portion ray second side 4B. Accordingly, the operator protection apparatus 100 may be described as having first side 116 and a second side 118 opposite the front side 116. The first side 116 of the operator protection apparatus 100 may be oriented in the same direction as midline first side 3A, and the second side 118 may be oriented in the same direction as midline second side 3B.

In some aspects, the operator protection apparatus 100 may include a stop 134 associated with at least one of the upper portion 110 and the lower portion 102. The stop 134 limits a range of motion of the upper portion 110 in a radial direction toward the lower portion ray first side 4A. The stop 134 may be affixed to the operator protection apparatus 100 first side 118 proximate the upper portion second end 114, and extend, at least in part, beyond the upper portion second end 114. Accordingly, when the operator protection apparatus 100 is in a locked position, the upper portion may contact the stop 134. In some aspects, the stop 134 may include a bumper 136. The bumper 136 may be any suitable material for dampening contact forces with the stop 134, such as a polymer based material. Further, because the range of motion of the upper portion 110 is limited, a range of motion of the center pivot joint 156 of the over-center linkage 140 may also be limited, for example, by coming in contact with the lower portion 102 and/or the upper portion 110. Additionally, as discussed hereinabove, the stop lug 155, or other mechanism, may limit movement of the over-center linkage 140 beyond the locked position.

In some aspects, the lower link assembly 142 may be coupled to the lower portion 102 by a lower portion bracket 160 and the upper link assembly 150 may be coupled to the upper portion 110 by an upper portion bracket 162. The lower portion bracket 160 and upper portion bracket 162 may be welded (or fastened using any number of means), or may be integrally formed with the upper portion 110 and the lower portion 102. In some aspects, the lower portion bracket 160 and upper portion bracket 162 may each be offset from the lower portion 102 and the upper portion 110. For example, each of the lower portion bracket 160 and the upper portion bracket 162 may extend outwardly from the second side 118 of the operator protection apparatus 100. In some aspects, the lower portion bracket 160 may extend further outward from the second side 118 than the upper portion bracket 162. As a result, the lower pivot joint 148 may be positioned on the lower portion ray second side 4B and the upper pivot joint 158 may be positioned (at least in part) on the lower portion ray first side 4A. Accordingly, the over-center linkage 140 may provide a mechanical advantage for retaining the operator protection apparatus 100 in a locked position, in that the center pivot joint 156 is biased toward the lower portion ray 4-1 when the operator protection apparatus 100 is in a raised and/or locked position.

Figure 4:
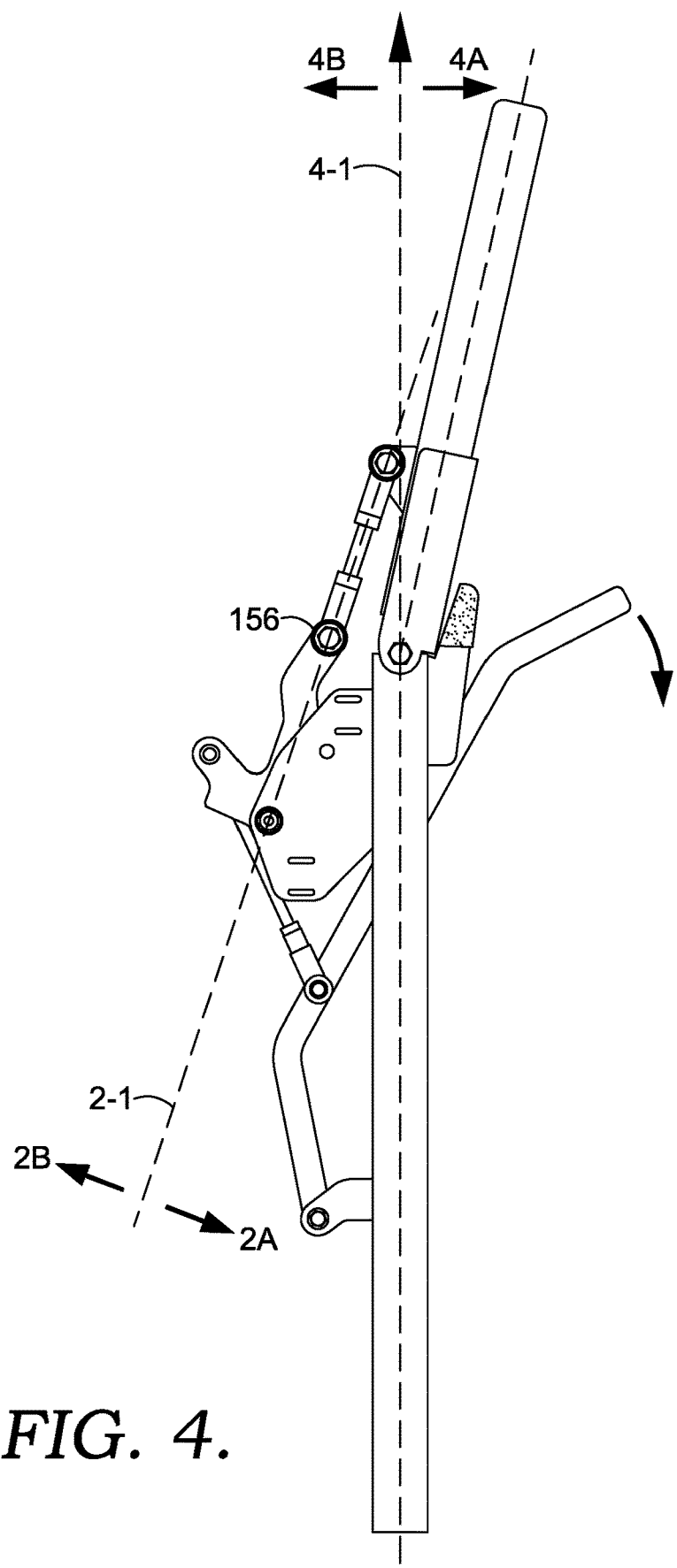
FIG. 4 depicts a side view of the operator protection apparatus of FIG. 2 in a top dead center position, in accordance with aspects hereof.

Turning now to FIG. 4, the over-center linkage 140 is shown in a top dead center position, in accordance with aspects hereof. The center pivot joint 156 may be positioned directly along centerline 2-1 when in the top dead center position. Said another way, the center pivot joint 156 is neither on the first side 2A, nor on the second side 2B of the centerline 2-1 when in the top dead center position. Accordingly, FIG. 4 depicts a break over point, or a point at which the over-center linkage 140 is no longer in the locked position. In one example, the over-center linkage may be moved to this position by the actuator 122, which supplies the force required to overcome the lock provided by the over-center linkage 140.

FIG. 5 depicts the operator protection apparatus 100 in a lowered position. As shown, the over-center linkage 140 is in the unlocked position, in that the center pivot joint 156 is on the second side 2B of the centerline 2-1. Additionally, the upper portion 110 is positioned on the lower portion ray second side 4B of lower portion ray 4-1. As described above, in one aspect, the actuator 122 comprises the hand lever 124. The hand lever 124 may include a hand lever pivot joint 123 coupled to a hand-lever actuator linkage 126 that extends from the hand lever 124 to an actuator-over-center pivot joint 145. Accordingly, a hand lever lower portion 125 may extend from a actuator-lower portion pivot joint 166 to the hand lever pivot joint 123. In some aspects, the hand lever 124 includes a trigger 131 that is configured to disengage the securing device 130, thereby allowing the operator protection apparatus 100 to be lowered.

Figure 7:
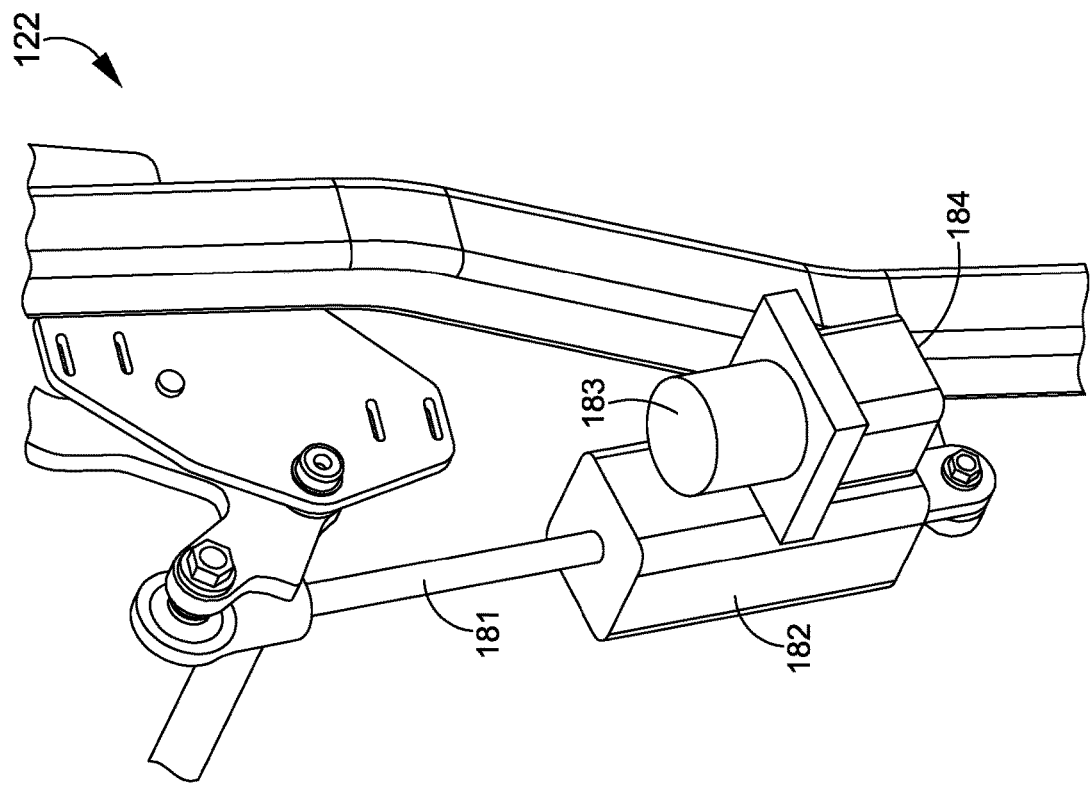
FIG. 7 depicts a perspective view of an exemplary electric-hydraulic actuator, in accordance with aspects hereof.
Figure 6:
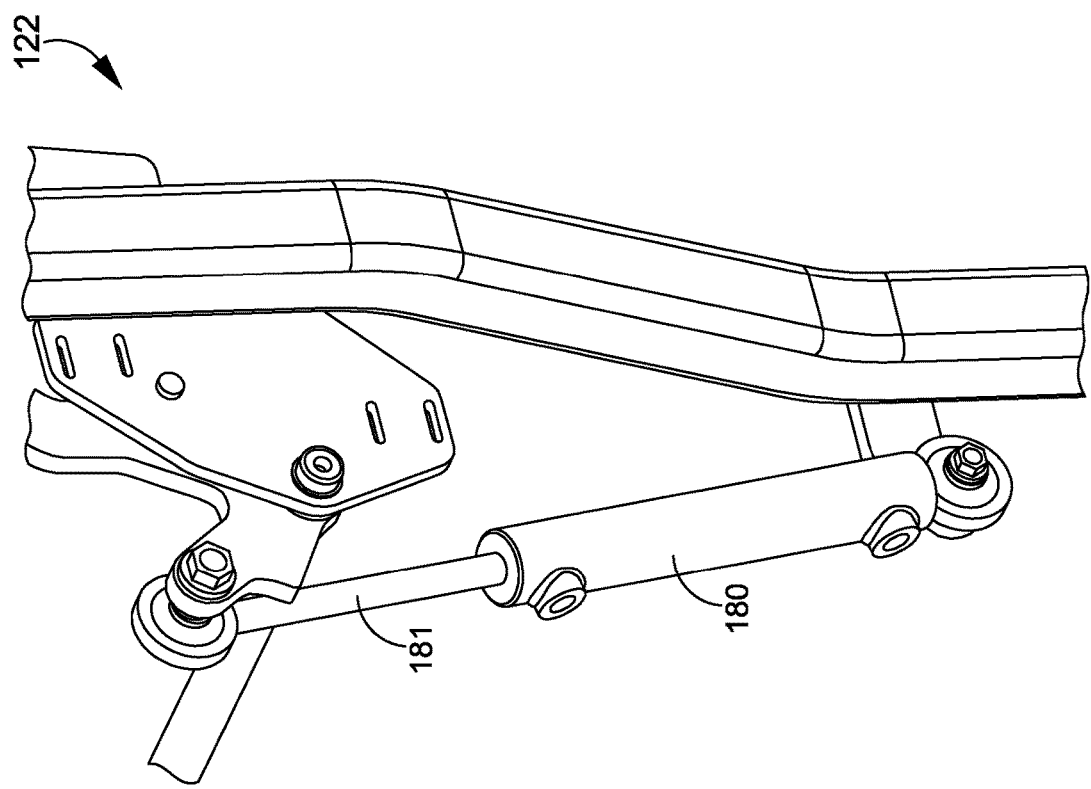
FIG. 6 depicts a perspective view of an exemplary powered actuator, in accordance with aspects hereof.

As mentioned above, any number of suitable actuators 340 may be employed in place of or in conjunction with the hand lever 124. For example, as depicted in FIG. 6, the actuator 122 may comprise a powered actuator 240, such as a hydraulic actuator 180. The operator protection apparatus 100 may be associated with a vehicle equipped with a hydraulic system. In one aspect, the hydraulic actuator may be powered by the hydraulic system of the vehicle. Additionally, as shown in FIG. 7, the actuator 122 may be an electric-hydraulic actuator 182. For example, the electric-hydraulic actuator may include an electric motor 183 that turns a pump 184. The electric-hydraulic actuator 182 may include a switch that turns the motor 183 on and off and controls the direction of the motor 183. The direction in which the motor 183 turns may determine whether a cylinder 181 of the actuator is extended for retracted. For example, when the motor 183 turns in a first direction, the pump 184 pumps fluid such that the cylinder 181 is extended. Accordingly, when the motor 183 turns in a second direction, opposite of the first direction, the fluid is pumped in an opposite direction such that the cylinder 181 is retracted.

Figure 9:
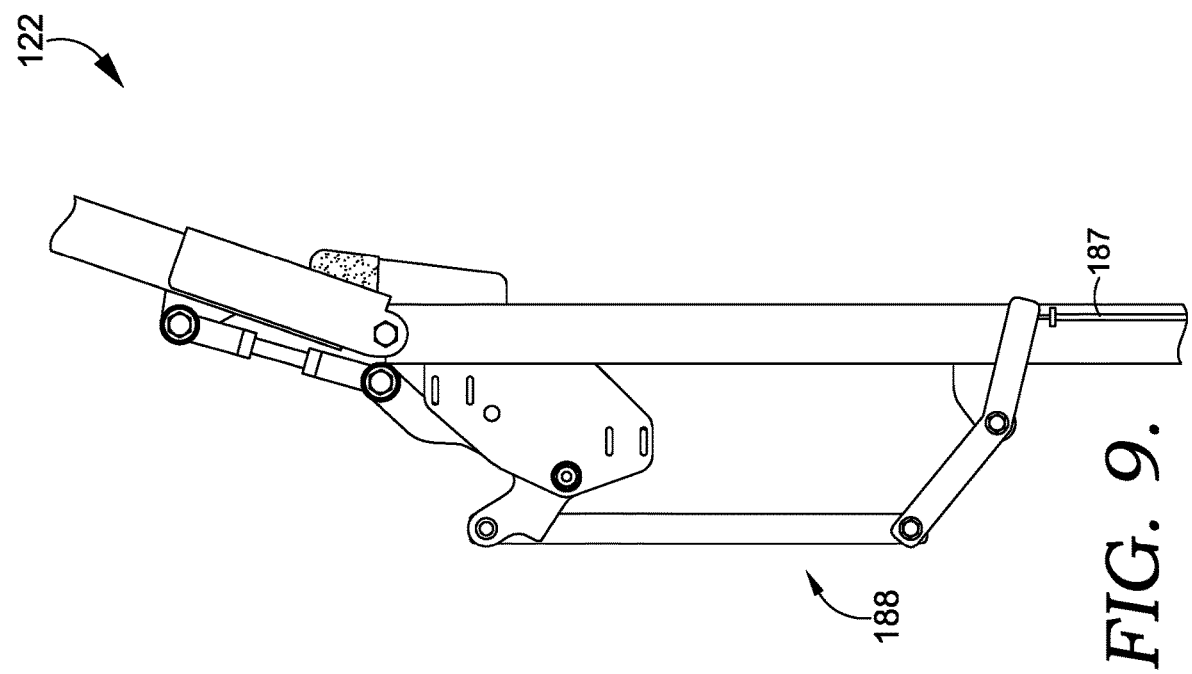
FIG. 9 depicts a perspective view of an mechanical actuator, in accordance with aspects hereof.
Figure 8:
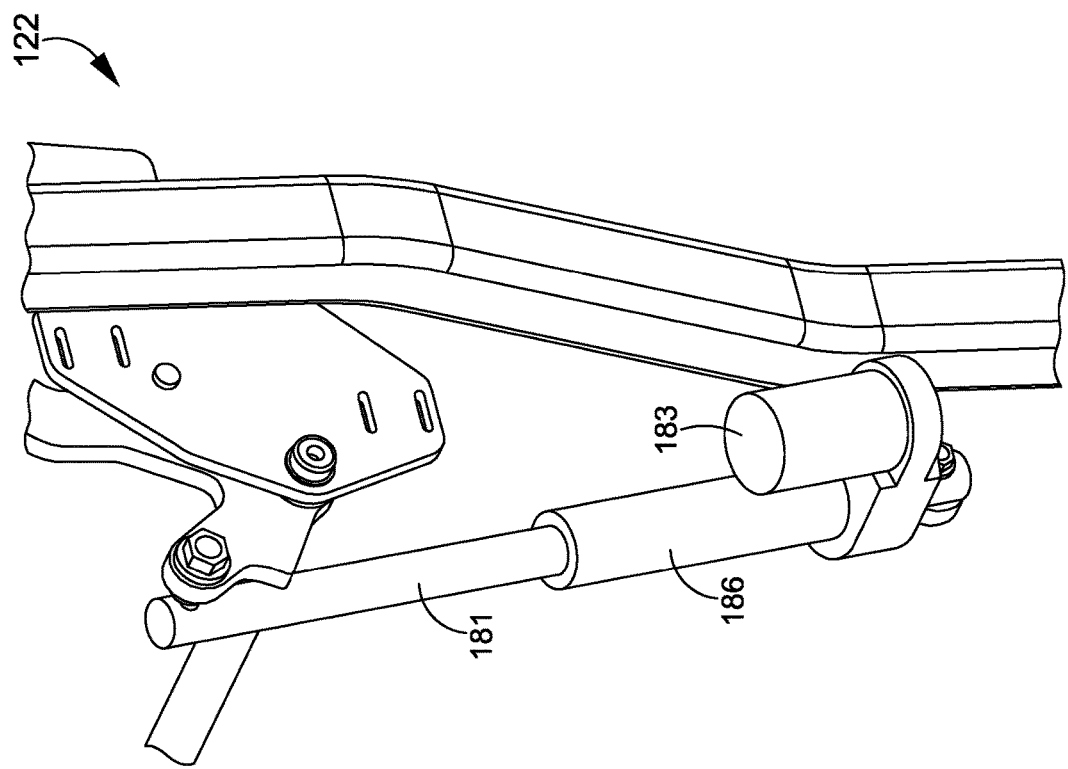
FIG. 8 depicts a perspective view of an exemplary electric actuator, in accordance with aspects hereof.

Further, as shown in FIG. 8, an electric-linear actuator 186 may be implemented. The electric-linear actuator 186 may include a motor 183 that turns a gear reduction set, which turns a screw thread. Accordingly, the cylinder 181 extends and retracts based on which direction the motor 183 turns. In an additional aspect, as shown in FIG. 9, the actuator may include a mechanical linkage 188. In one example, the mechanical linkage 188 may be connected to a foot pedal 128 (shown in FIG. 1) by a cable 187. The foot pedal 128 may have a first side and a second side that rotate about a pivot such that both sides of the foot pedal 128 may be depressed by an operator. In one aspect, when the first side of the pedal 128 is pushed the cable 187 may be extended, thereby urging the mechanical linkage 188 in a direction that disengages the over-center linkage 140. Accordingly, when the second side of the foot pedal 128 is depressed, the cable 187 may be retracted, thereby causing the mechanical linkage 188 to pull the over-center linkage 140 toward the raised position.

Figure 10:
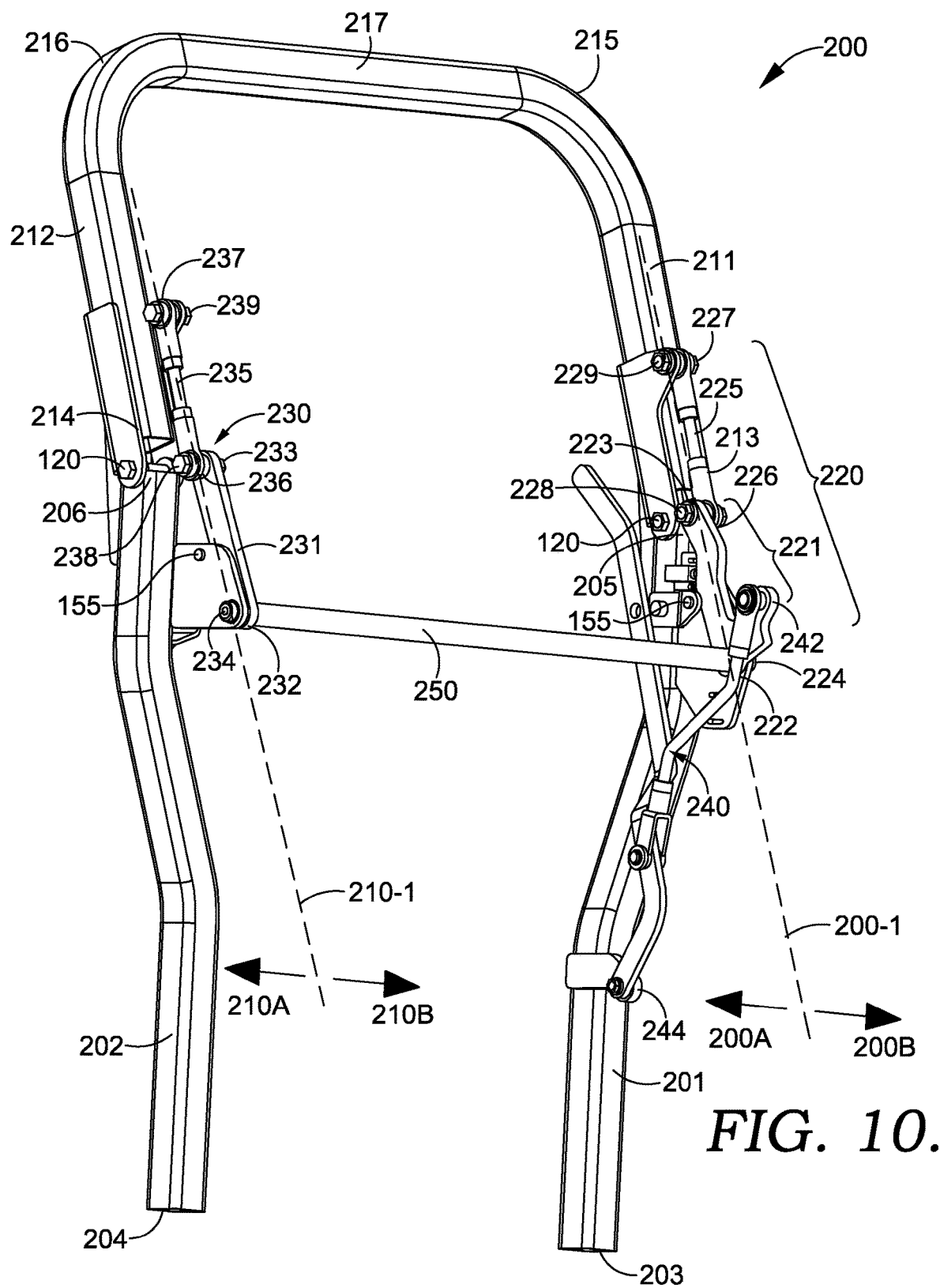
FIG. 10 depicts a perspective view of an operator protection apparatus having two over-center linkages in a raised position, in accordance with aspects hereof.

Turning now to FIG. 10, in another exemplary embodiment, an operator protection apparatus 200 having two over-center linkages is depicted. The operator protection apparatus 200 may include a lower portion 201 comprising a first lower portion upright 201 and a second lower portion upright 202. The first lower portion upright 201 may have a first upright first end 203 and a first upright second end 205. The second lower portion upright 202 may have a second upright first end 204 and a second upright second end 206. In one aspect, the first upright first end 203 and the second upright first end 204 may be affixed to a frame of a terrain working vehicle, for example, a riding mower.

Additionally, the upper portion 210 may comprise a first upper portion member 211 and a second upper portion member 212. The first upper portion member 211 may have a first member first end 213 and a first member second end 215. The second upper portion member 212 may have a second member first end 214 and a second member second end 216. Further, the upper portion 210 may comprise a transverse member 217 disposed between the first member second end 215 and the second member second end 216. While the first upper portion member 211 and the second upper portion member 212 are discussed as distinct members, it is contemplated that they form a continuous and contiguous assembly as a common component or assembly. Further, the operator protection apparatus may have a pair of hinge joints 120 coupling the first upright second end 205 to the first member first end 213 and the second upright second end 206 to the second member first end 214, such that the upper portion 210 is movable relative to the lower portion 201.

Additionally, in some aspects, the operator protection apparatus 200 may include a first over-center linkage 220. The first over-center linkage 220 may comprise a first lower link assembly 221 having a first lower link first end 222 and a first lower link second end 223. The first lower link first end 222 may be pivotably coupled to the first lower portion upright 201 at a first lower link pivot joint 224. The first over-center linkage 220 may also comprise a first upper link assembly 225 having a first upper link first end 226 and a first upper link second end 227. The first upper link assembly 225 first end may be pivotably coupled to the first lower link second end 223 at a first center pivot joint 228. Further, the first upper link second end 227 may be pivotably coupled to the first upper portion member 211 at a first upper pivot joint 229.

Further, in some aspects, the operator protection apparatus 200 comprises a second over-center linkage 230. The second over-center linkage 230 may comprise a second lower link assembly 231 having a second lower link first end 232 and a second lower link second end 233. The second lower link first end 232 may be pivotably coupled to the second lower portion upright 202 at a second lower link pivot joint 234. The second over-center linkage 230 may also comprise a second upper link assembly 235 having a second upper link first end 236 and a second upper link second end 237. The second upper link assembly 235 first end may be pivotably coupled to the second lower link second end 233 at a second center pivot joint 238. Further, the second upper link second end 237 may be pivotably coupled with the second upper portion member 212 at a second upper pivot joint 239.

Similar to the over-center linkage 140 described hereinabove, the first over-center linkage 220 may be in a locked position when the first center pivot joint 228 is on a first centerline first side 200A of a first centerline 200-1 extending between the first lower link pivot joint 224 and the first upper link pivot joint 229. Accordingly, the second over-center linkage 230 may be in a locked position when the second center pivot joint 238 is on a second centerline first side 210A of a second centerline 210-1 extending between the second lower link pivot joint 234 and the second upper pivot joint 239.

In one aspect, the operator protection apparatus 200 comprises a first actuator 240 for moving the first over-center linkage 220 between the locked position and an unlocked positon. The first actuator 240 may be coupled to the first over-center linkage 220 at a first actuator-over-center pivot joint 242 and coupled to the lower portion 201 of the upright at a first actuator-upright pivot joint 244. In some aspects, the apparatus includes a torque tube 250 (which may be referred to as a rod) affixed between the over-center linkages 220 and 230. The torque tube 250 may transfer the rotational force supplied by the actuator 240 from the first over-center linkage 220 to the second over-center linkage 230. As a result, the second over-center linkage 230 may be moved from the locked position to the unlocked position simultaneously with the first over-center linkage 220.

Figure 11:
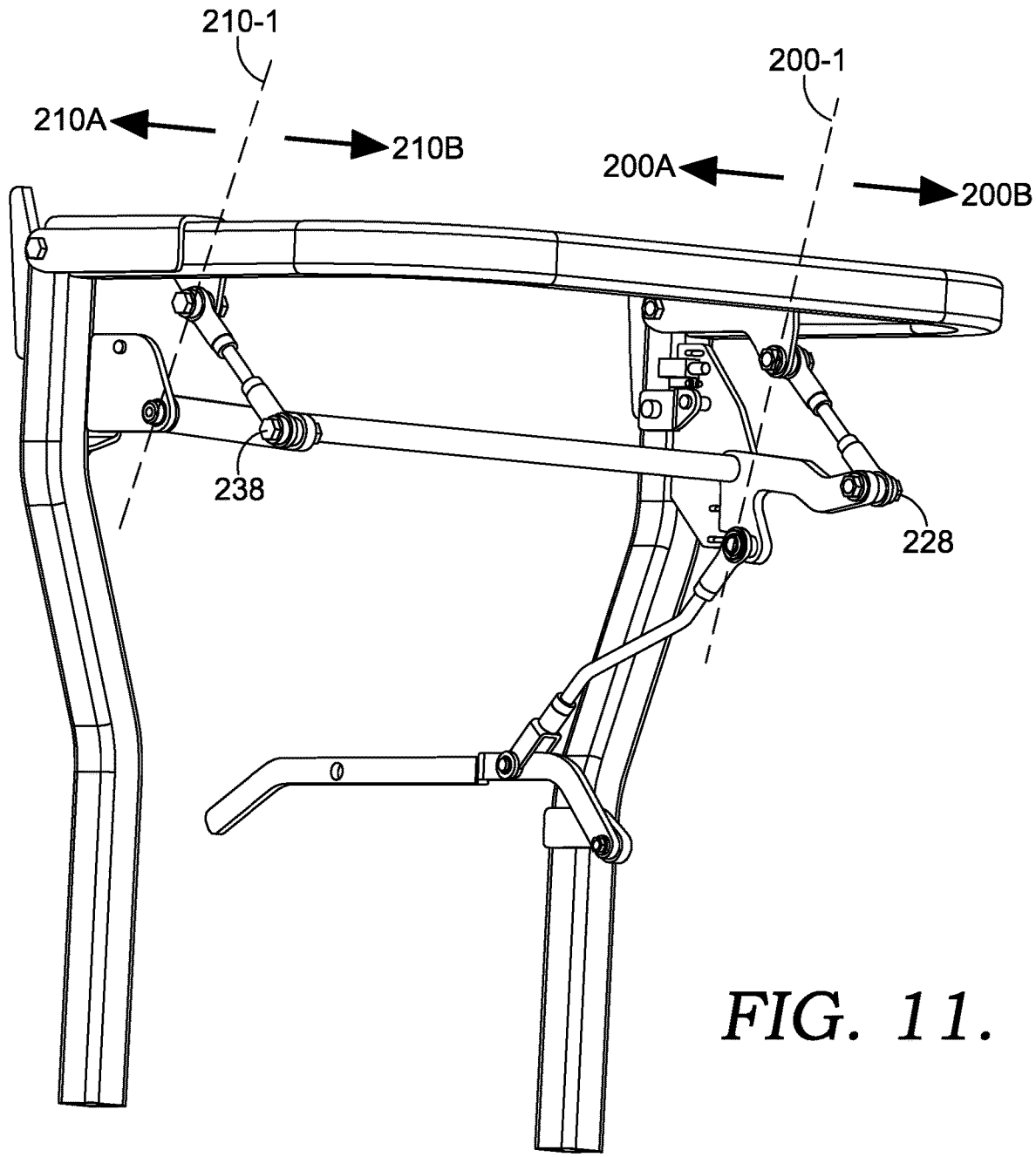
FIG. 11 depicts a perspective of the operator protection apparatus of FIG. 10 in a lowered position, in accordance with aspects hereof.

FIG. 11 depicts the operator protection apparatus 200 and an unlocked/lowered position, in accordance with aspects hereof. The first over-center linkage 220 may be in the unlocked position when the first center pivot joint 228 on a first centerline second side 200B of the first centerline 200-1. Accordingly, the second over-center linkage 230 is in the unlocked position when the second center pivot joint 238 on a second centerline second side 210B of the second centerline 210-1.

Figure 12:
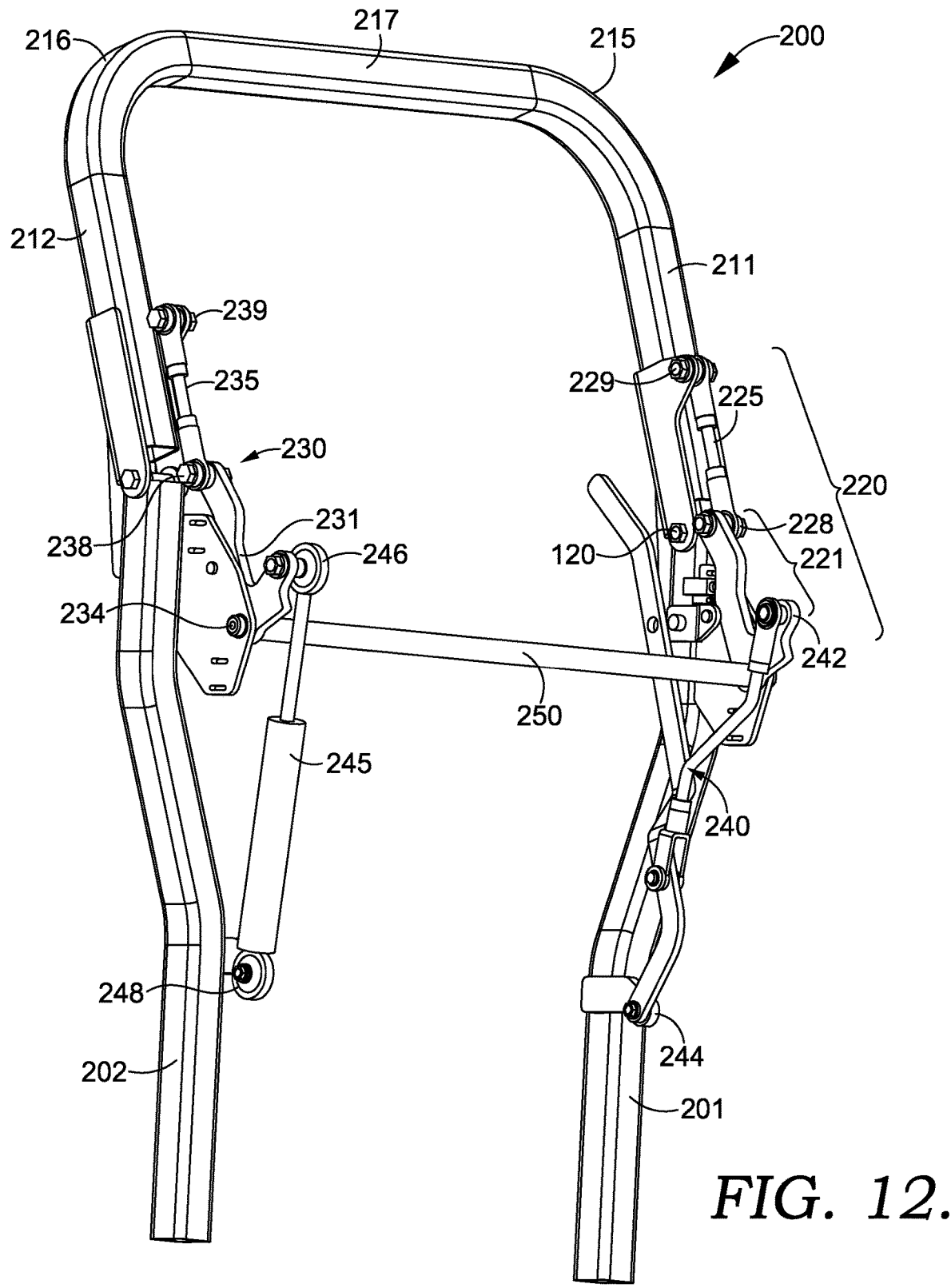
FIG. 12 depicts a perspective view of an operator protection apparatus with an assist in a raised position, in accordance with aspects hereof.

Turning now to FIG. 12, in one aspect, the operator protection apparatus 200 may comprise a gas cylinder 245 coupled to the second over-center linkage 230 at a second actuator-over-center pivot joint 246 and coupled to the second lower portion upright 202 at a second actuator-upright pivot joint 248, in accordance with aspects hereof. The gas cylinder 245 may function as a biasing mechanism or an assist for retaining the second over-center linkage 230 in the locked position. Additionally, the gas cylinder 245 may support and/or compensate for the weight of the upper portion 210 as the upper portion 210 rotates from the raised position to the lowered position. Although shown as a gas cylinder 245 in FIG. 12, other suitable mechanisms (e.g., coil spring, torsion spring, torsion bar) are considered within the scope of this disclosure.

Figure 13:
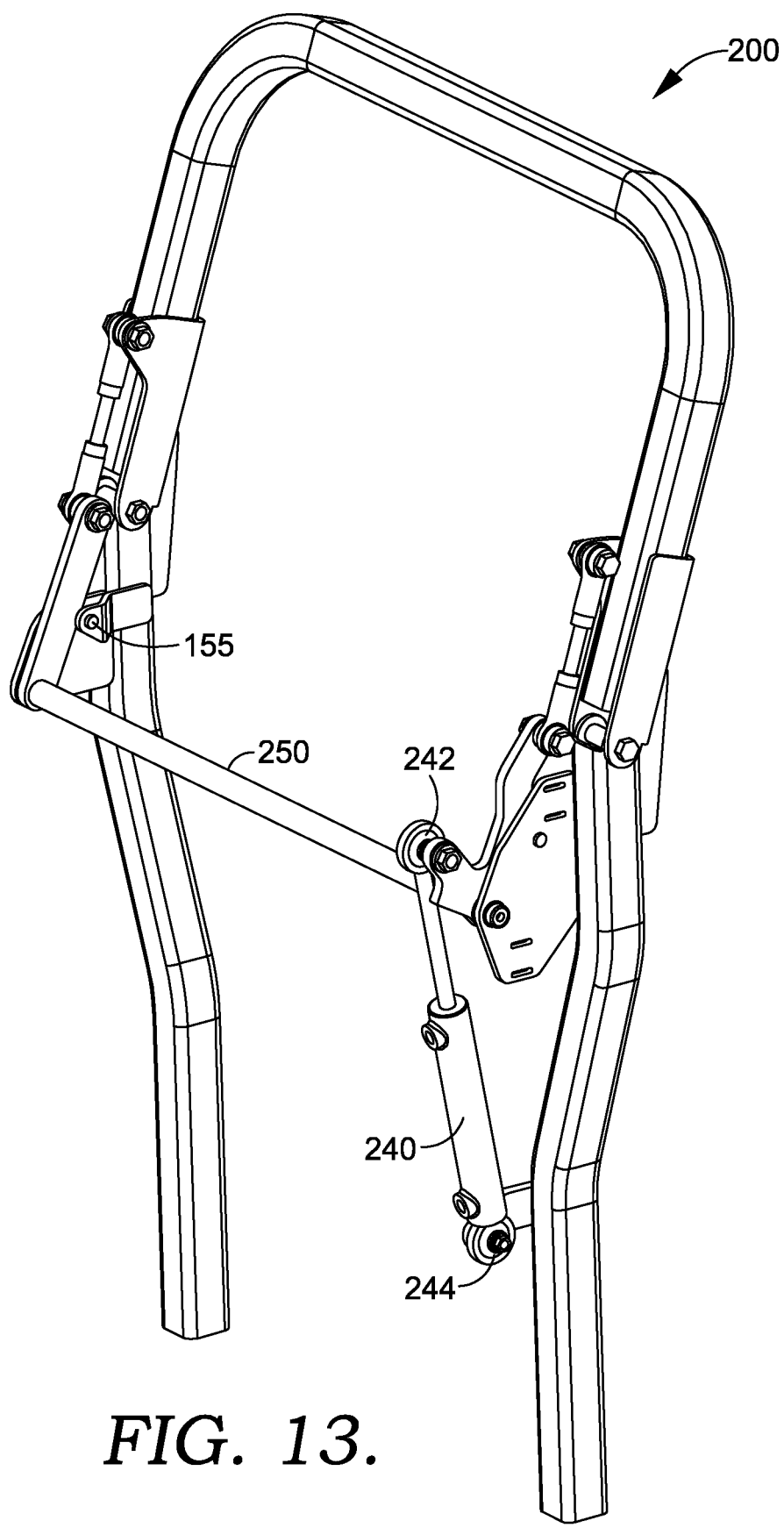
FIG. 13 depicts an alternative perspective view of an operator protection apparatus in a raised position, in accordance with aspects hereof.

Further, as shown in FIG. 13, the operator protection apparatus 200 may implement a powered actuator 240 in place of or in conjunction with any of the actuators contemplated herein. In a nonlimiting example, the powered actuator may be a linear actuator and may be electric, pneumatic, or hydraulic. In some aspects, the powered actuator may be coupled to the first over-center linkage 220 at a first actuator-over-center pivot joint 242 and coupled to the first lower portion upright 201 at a first actuator-upright pivot joint 244. In some aspects, the force provided by the powered actuator may apply a force to secure the operator protection apparatus 200 in the locked position.

Figure 14:
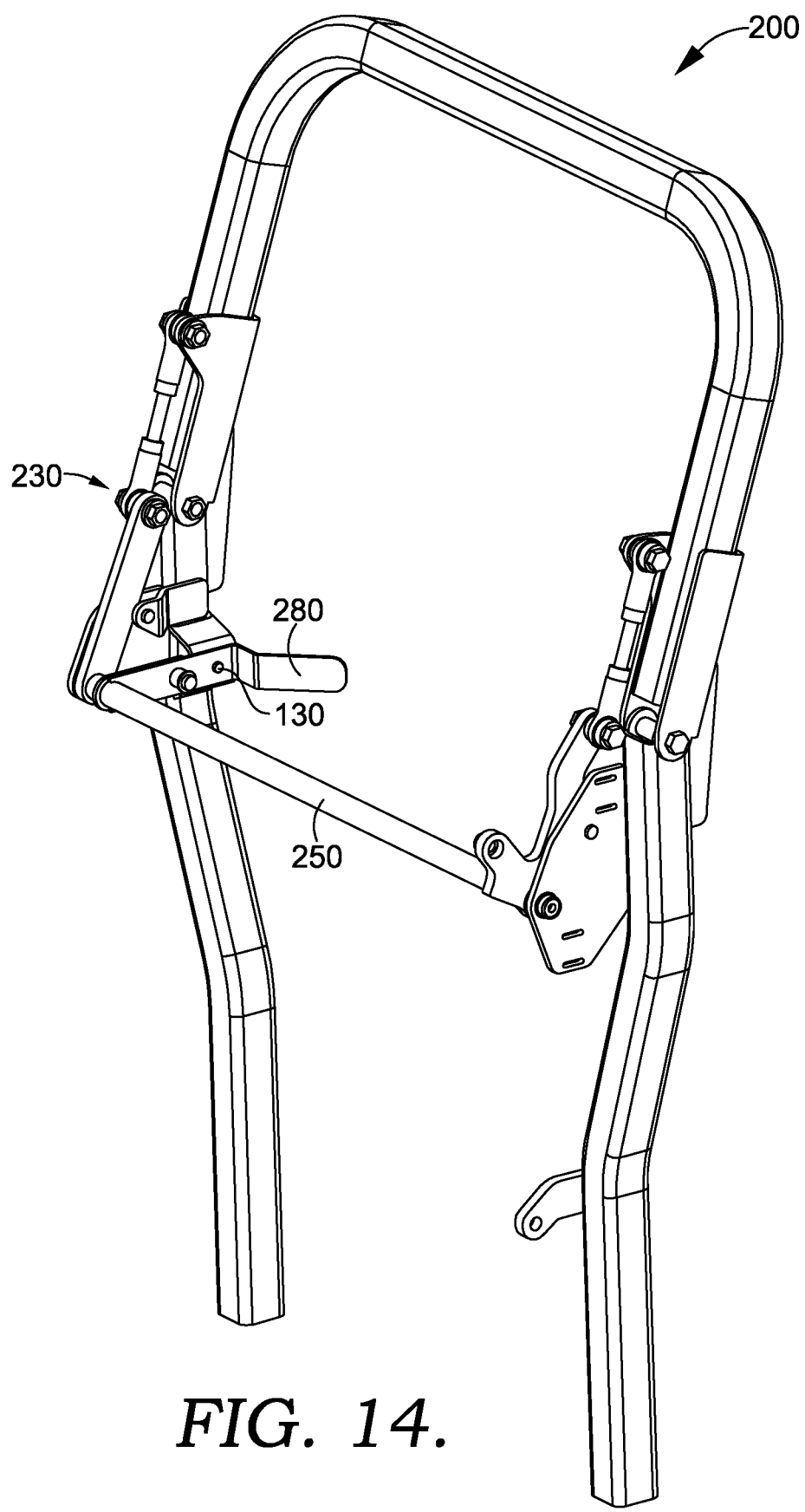
FIG. 14 depicts an alternative perspective view of an operator protection apparatus in a raised position, in accordance with aspects hereof.

Additionally, as shown in FIG. 14, the operator protection apparatus 200 may include a handle 280. The handle 280 may be affixed to the torque tube 250 and positioned such that the handle 280 engages a securing device 130 when the second over-center linkage 230 is in a locked position. Accordingly, the handle 280 may be disengaged from the securing device 130, thereby allowing the over-center linkage to the unlocked and the upper portion to be lowered. As can be appreciated, any of the actuators provided herein may be included on the operator protection apparatus 200 with the handle 280.

Figure 15:
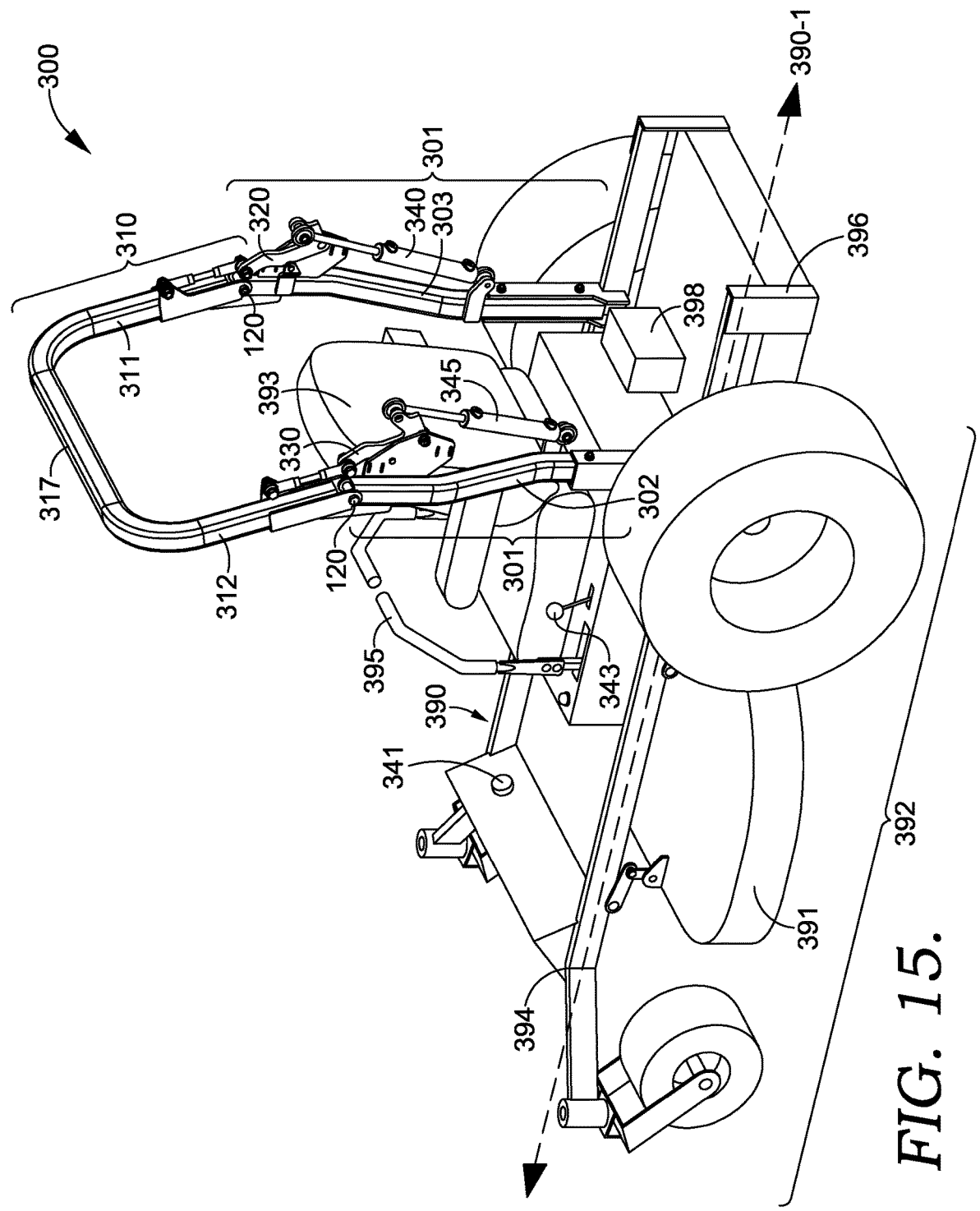
FIG. 15 depicts a riding mower having an operator protection apparatus affixed thereto in a raised position, in accordance with aspects hereof.

With reference now to FIG. 15, in yet another embodiment, an operator protection apparatus 300 having two powered actuators is provided. Accordingly, a first powered actuator 340 and a second powered actuator 345 may be configured to actuate simultaneously and with equal (or different) force. As depicted in FIG. 15, the operator protection apparatus 300 may be affixed to a frame 192 of a vehicle, such as frame 392 of riding mower 390. In some aspects, the riding mower 190 may include a mower deck 391 coupled to the frame 392 and a controller 398. Further, the riding mower 390 may include a seat 393. The frame 392 may include a frame first end 394 and a frame second end 396. In one aspect herein, a horizontal line 390-1 extending from the frame first end 394 to the frame second end 396 defines a horizontal plane, which may be referred to herein in order to describe locations and positions of various components of the operator protection apparatus 300.

The operator protection apparatus 300 may include a lower portion 301 comprising a first lower portion upright 303 and a second lower portion upright 302. Additionally, an upper portion 310 may comprise a transverse member 317 disposed between a first upper portion member 311 and a second upper portion member 312. Further, the operator protection apparatus may have a pair of hinge joints 120 coupling the first lower portion upright 303 to the first upper portion member 311 and the second lower portion upright 302 to the second upper portion member 312, such that the upper portion 310 is movable relative to the lower portion 301.

Additionally, in some aspects, the operator protection apparatus may include a first over-center linkage 320 and a second over-center linkage 330. The first over-center linkage 320 may be coupled to the first lower portion upright 303 and the first upper portion member 311, and the second over-center linkage 330 may be coupled to the second lower portion upright 302 and the second upper portion member 312.

The first powered actuator 340 may be coupled to the first lower portion upright 303 and the first over-center linkage 320. Further, the second powered actuator 345 may be coupled to the second lower portion upright 302 and the second over-center linkage 330. The operator protection apparatus 300 may include at least one input device for controlling the powered actuators 340 and 345. The input device is configured to control actuation of the powered actuators 340 and 345 simultaneously, as mentioned above. In some aspects, the input device may be a simple switch communicatively coupled directly to the powered actuators 340 and 345. In other aspects, the input device may be communicatively coupled to the controller 398, which may control the powered actuators 340 and 345.

In one aspect, the input device may be a foot button 341 that may be depressed by the foot of an operator to initiate actuation for both raising and lowering the upper portion 310. In another aspect, the input device may be a toggle switch 343. For example, holding the toggle switch 343 in a first direction may cause the actuators to lower the upper portion 310 until the switch is released. Additionally, holding the toggle switch 343 in a second direction may cause the actuators 340 and 345 to raise the upper portion 310. Alternatively, momentarily moving the toggle switch 343 in the second direction, rather than holding the toggle switch 343, may cause the actuators 340 and 345 to raise the upper portion to the locked position. Although described in the examples above, the input device may be implemented as any other suitable type of input device and at any other suitable location. For example, the input device may be associated with operator controls 395 such that the operator protection apparatus 300 may be controlled by an operator while the operator is using the operator controls 395.

Figure 16:
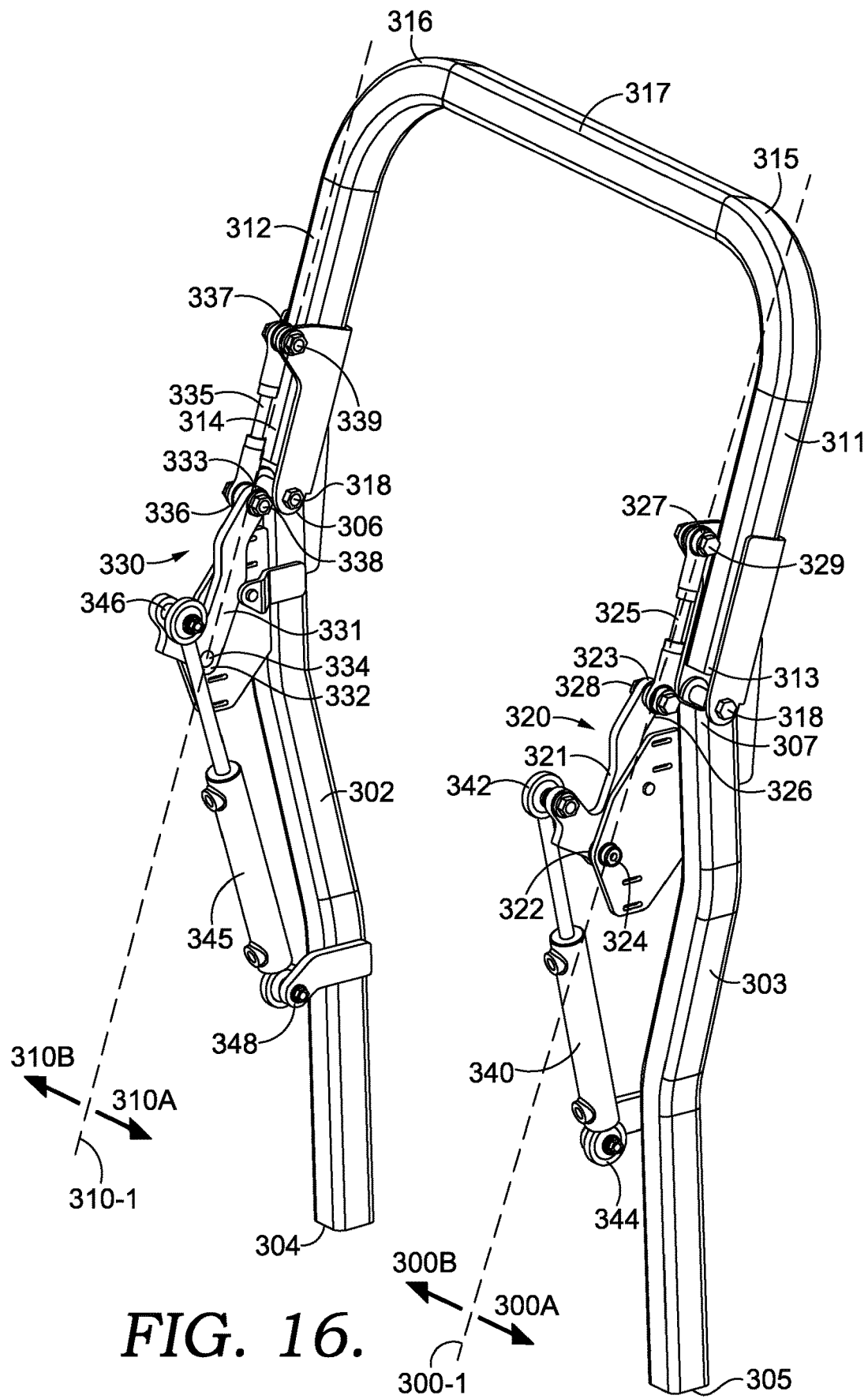
FIG. 16 depicts a perspective view of the operator protection apparatus of FIG. 15 in a raised position, in accordance with aspects hereof.

Turning now to FIG. 16, the first lower portion upright 303 may have a first upright first end 305 and a first upright second end 307. The second lower portion upright 302 may have a second upright first end 304 and a second upright second end 306. In one aspect, the first upright first end 305 and the second upright first end 304 may be affixed to a frame of a terrain working vehicle (for example riding mower 390). The first upper portion member 311 may have a first member first end 313 and a first member second end 315. The second upper portion member 312 may have a second member first end 314 and a second member second end 316.

The first over-center linkage 320 may comprise a first lower link assembly 321 having a first lower link first end 322 and a first lower link second end 323. The first lower link first end 322 may be pivotably coupled to the first lower portion upright 303 at a first lower link pivot joint 324. The first over-center linkage 320 may also comprise a first upper link assembly 325 having a first upper link first end 326 and a first upper link second end 327. The first upper link assembly 325 first end may be pivotably coupled to the first lower link second end 323 at a first center pivot joint 328. Further, the first upper link second end 327 may be pivotably coupled with the first upper portion member 311 at a first upper pivot joint 329. In one aspect, the first powered actuator 340 is coupled to the first over-center linkage 320 at a first actuator-over-center pivot joint 342 and coupled to the first lower portion upright 303 at a first actuator-upright pivot joint 344.

The operator protection apparatus 300 may comprise a second over-center linkage 330. The second over-center linkage 330 may comprise a second lower link assembly 331 having a second lower link first end 332 and a second lower link second end 333. The second lower link first end 332 may be pivotably coupled to the second lower portion upright 302 at a second lower link pivot joint 334. The second over-center linkage 330 may also comprise a second upper link assembly 335 having a second upper link first end 336 and a second upper link second end 337. The second upper link assembly 335 first end may be pivotably coupled to the second lower link second end 333 at a second center pivot joint 338. Further, the second upper link second end 337 may be pivotably coupled with the second upper portion member 312 at a second upper pivot joint 339. The second powered actuator 345 may be coupled to the second over-center linkage 330 at a second actuator-over-center pivot joint 346 and coupled to the second lower portion upright 302 at a second actuator-upright pivot joint 348.

The first over-center linkage 320 may be in a locked position when the first center pivot joint 328 is on a first centerline first side 300A of a first centerline 300-1 extending between the first lower link pivot joint 324 and the first upper pivot joint 329. The second over-center linkage 330 may be in a locked position when the second center pivot joint 338 is on a second centerline first side 310A of a second centerline 310-1 extending between the second lower link pivot joint 334 and the second upper pivot joint 339.

Figure 17:
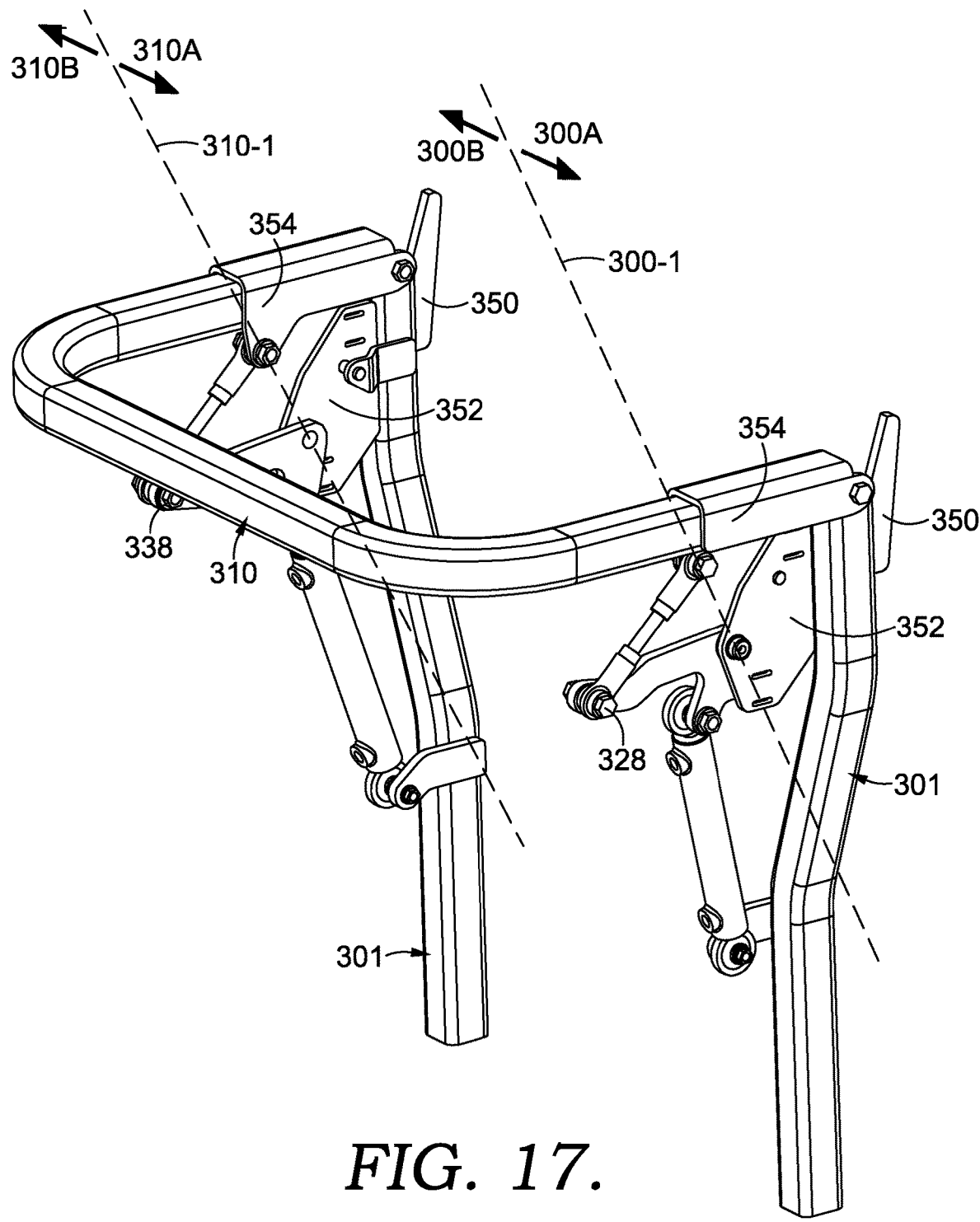
FIG. 17 depicts a perspective view of the operator protection apparatus of FIG. 15 in a lowered position, in accordance with aspects hereof.

Turning now to FIG. 17, the first over-center linkage 320 may be in an unlocked position when the first center pivot joint 328 is on a first centerline second side 300B of the first centerline 300-1. Accordingly, the second over-center linkage 330 is in an unlocked position when the second center pivot joint 338 is on a second centerline second side 310B of the second centerline 310-1. Additionally, similar to the embodiments described hereinabove, the operator protection apparatus 300 may include one or more stops 350 that limit a range of motion of the upper portion 310 relative to the lower portion 301. Further, the operator protection apparatus 300 may include a pair of lower portion brackets 352 and a pair of upper portion brackets 354 for coupling the first over-center linkage 320 and the second over-center linkage 330 to the lower portion 301 and the upper portion 310.

Figure 18:
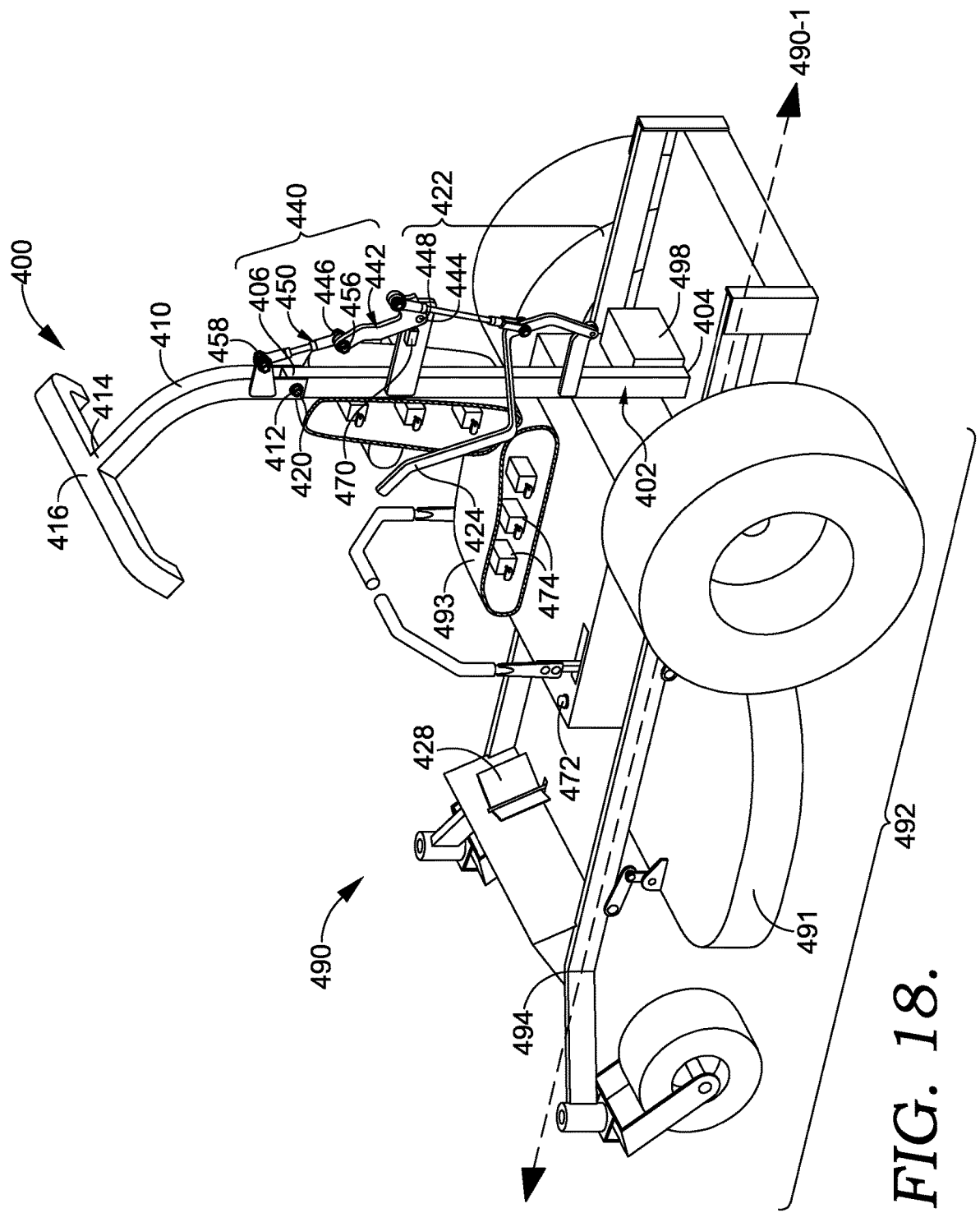
FIG. 18 depicts a riding mower having an alternative operator protection apparatus affixed thereto in a raised position, in accordance with aspects hereof.

In an additional embodiment, as depicted in FIG. 18, an operator protection apparatus 400 may be affixed to a frame of a vehicle, such as frame 492 of riding mower 490. In some aspects, the riding mower may include a mower deck 491 coupled to the frame 492 and a controller 498. Further, the riding mower 490 may include a seat 493. The riding mower may comprise, a frame 492 having a frame first end 494 and a frame second end 496. In one aspect herein, a horizontal line 490-1 extending from the frame first end 494 to the frame second end 496 defines a horizontal plane, which may be referred to herein in order to describe locations and positions of various components of the operator protection apparatus 400.

The operator protection apparatus 400 may include a lower portion 402 comprising a lower portion first end 404 and a lower portion second end 406. Additionally, the operator protection apparatus 400 may include an upper portion 410 comprising a single upper portion member having an upper portion first end 412 and an upper portion second end 414. The upper portion 410 may include a cross member 416 affixed to the upper portion second end 414. Further, the operator protection apparatus 400 may have a hinge joint 420 coupling the lower portion second end 406 to the upper portion first end 412, such that the upper portion 410 is movable relative to the lower portion 402.

Additionally, in some aspects, the operator protection apparatus may include an over-center linkage 440 coupled the lower portion 402 and the upper portion 410. In some aspects, the over-center linkage 440 may include a lower link assembly 442 having a lower link first end 444 and a lower link second end 446 pivotably coupled to the lower portion 402 at a lower pivot joint 448. Further, the over-center linkage 440 may include an upper link assembly 450 pivotably coupled to the lower link assembly 442 at a center pivot joint 456. The lower link first end may be pivotably coupled to the lower portion 402 at the lower pivot joint 448. Additionally, the upper link assembly 450 may be pivotably coupled with the upper portion 410 at an upper pivot joint 458. The lower link assembly first end may be pivotably coupled to the lower portion 402 at the lower pivot joint 448. Further, the over-center linkage 440 may include an upper link assembly 450 having an upper link first end 452 and an upper link second end 454. The upper link first end 452 may be pivotably coupled to the lower link second end 446 to at the center pivot joint 456. Additionally, the upper link assembly second end may be pivotably coupled with the upper portion 410 at an upper pivot joint 458.

Additionally, the operator protection apparatus 400 may include an actuator 422 coupled to the lower portion 402 and the over-center linkage 440. In one aspect, the actuator may comprise a hand lever 424, although any of the actuators contemplated herein may be used. For example, similar to the riding mower depicted in FIG. 1, the riding mower 490 may include a foot pedal 428. The foot pedal 428 may have a first side and a second side that rotate about a pivot such that both sides of the pedal may be pushed by an operator and may be associated with a mechanical actuator, as described hereinabove.

The operator protection apparatus 400 may also include a position sensor 470. Further, the operator protection apparatus 400 may be coupled to one or more indicators. The one or more indicators may provide a warning or a notification that a position of the operator protection apparatus 400 should be changed, or is in an unlocked position. For example, a visual indicator 472, which may be a light, may provide a visual indication that the operator protection apparatus 400 should be in the locked position. Additionally, one or more tactile indicators 474 may be employed to notify or warn the operator of a condition related to the operator protection apparatus 400. Further, the one or more indicators may include an audio indicator (although not shown here, the audio indicator may be associated with the controller 498).

Turning now to a general discussion of each of the embodiments described hereinabove, a variety of additional features may be implemented with each of the embodiments. Additionally, some of the features described hereinabove may include variations, which may be applicable to each of the embodiments described herein. For example, although the over-center linkages described hereinabove and depicted in the figures may provide an advantageous configuration, other configurations should be considered within the scope of this disclosure. For example, it is contemplated that an over-center linkage could be positioned such that it is affixed to either an interior surface or an exterior surface of an operator protection apparatus.

Additionally, the hinge joints described hereinabove may alternatively be described as including the over-center linkages. Said another way, a hinge joint that includes an over-center linkage for locking an operator protection system has been contemplated and should be considered within the scope of this disclosure. Additionally, it should be appreciated that the features of the various embodiments described herein may be incorporated with one another.

In another aspect, an operator protection apparatus may be provided without an actuator. In one aspect, a grip or other member may extend from the a center pivot joint of at least one over-center linkage. Accordingly, the over-center linkage may be unlocked without employing an actuator. In another aspect, a rod may extend between center pivot joints of two over-center linkages. The rod may be manually moved between the locked and unlocked position.

Further, the one or more sensors described hereinabove may include any number of sensors associated with a vehicle and/or the operator protection apparatus. In some aspects, the operator protection apparatus may include logic that is integrated with the apparatus or is configured for integration with a controller, or other computing device associated with the vehicle. Accordingly, an operator protection apparatus may receive sensor data from a variety of sensors. For example, a vehicle may include a tilt sensor configured to detect a tilt of the vehicle, for example in a controller (e.g. controller 198, 298, 398, or 498). In another aspect, the tilt sensor may be provided and included with the operator protection apparatus. Additionally, the operator protection apparatus may be configured to receive sensor data from a seatbelt sensor associated with the vehicle including, for example, whether the seatbelt is buckled or unbuckled.

The sensed data obtained from different sensors may be used by the operator protection apparatus logic to make a number of determinations. For example, the sensor data may be used to determine that the operator protection apparatus is in a lowered position, and the seatbelt is engaged. In this scenario, the operator protection apparatus may cause the controller to disengage the mower blades. In another aspect, the sensed data may be used to determine that the operator protection apparatus is in a raised position and the seatbelt is disengaged. In this example, similar to the previous scenario, the operator protection apparatus may communicate a command to the controller to disengage the blades. In additional aspects, the operator protection apparatus may activate one or more indicators (e.g., a visual indicator 472 and a tactile indicators 474) or warning signals, based on the sensor data. For example, the sensor data may be used to activate audio, visual, or tactile indicators for alerting an operator of the vehicle that a state of the vehicle or the operator protection apparatus should be changed.

Lever-Actuated Operator Protection Apparatus

In accordance with other aspects of this invention, a lever-actuated operator protection apparatus is described herein. The lever-actuated operator protection apparatus may be affixed to a terrain working vehicle, for example a riding mower, and may include a manually-operable lever that is positioned to be accessible from the seat of the riding mower. As a result, the lever-actuated operator protection apparatus may be moved between raised and lowered positions by an operator in a seated position on the riding mower.

As discussed above, traditional operator protection apparatuses often required that an operator leave the seat of the vehicle in order to manually raise and lower the top portion of the operator protection apparatuses. In contrast to traditional operator protection apparatuses, the lever-actuated operator protection apparatuses described herein provide a manually-powered mechanism for raising and lowering operator protection apparatuses without leaving the seat of the vehicle.

Figure 19:
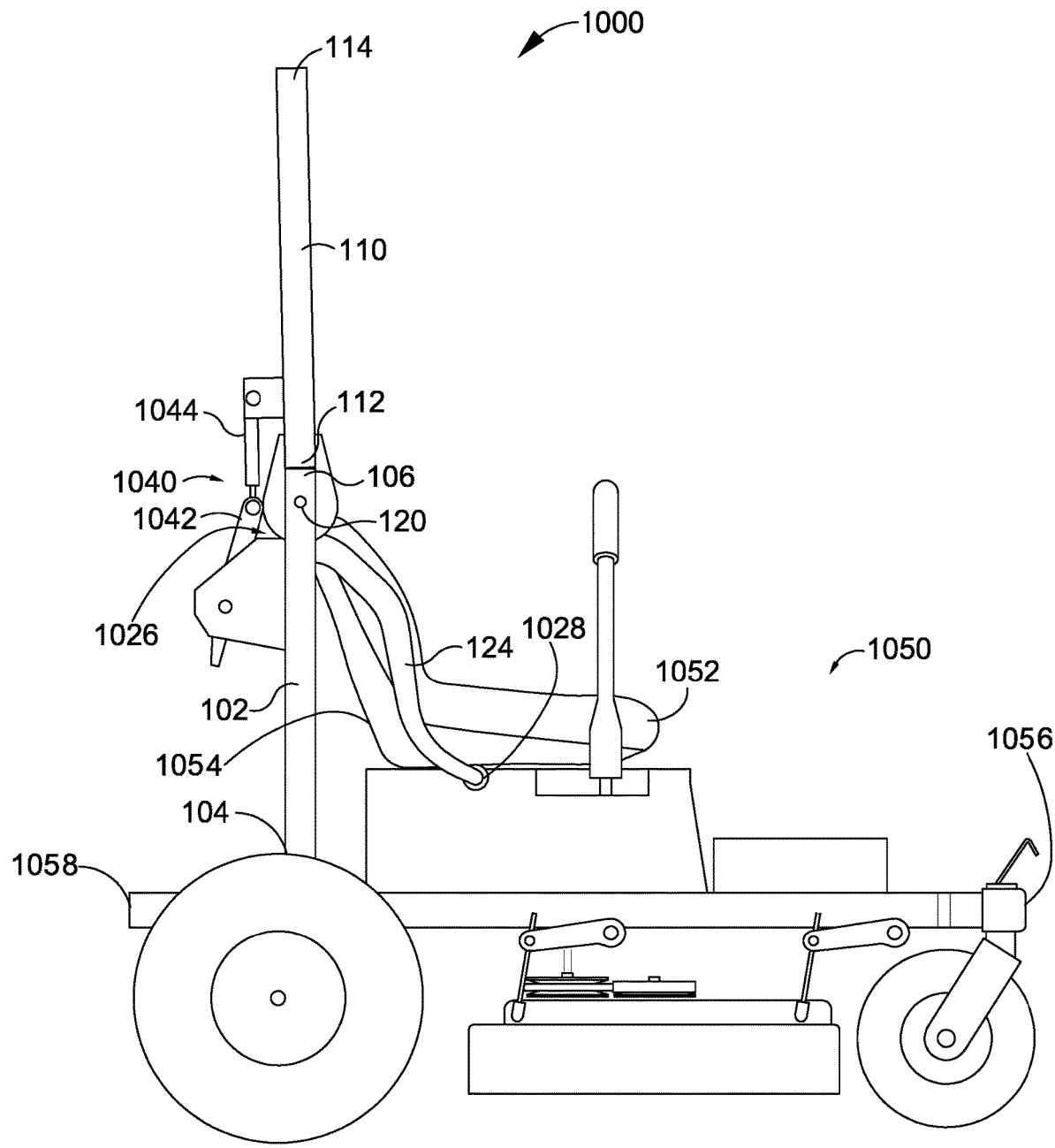
FIG. 19 depicts a side view of a terrain working vehicle with a lever-actuated operator protection apparatus, in accordance with aspects hereof.

Turning now to FIG. 19, an exemplary lever-actuated operator protection apparatus 1000 with a lever 1024 is depicted on an exemplary terrain working vehicle 1050 (in this case, a riding mower). The lever-actuated operator protection apparatus 1000 includes a lower portion 102 with a lower portion first end 104, which may be affixed to a frame of a terrain working vehicle 1050, and a lower portion second end 106. The lever-actuated operator protection apparatus 1000 also includes an upper portion 110 having an upper portion first end 112 and an upper portion second end 114. Additionally, the lever-actuated operator protection apparatus 1000 includes at least one hinge joint 120 rotatably coupling the lower portion second end 106 and the upper portion first end 112. Accordingly, the upper portion 110 is movable relative to the lower portion 102 between a raised position (depicted, e.g., in FIGS. 19 and 20) and a lowered position (depicted, e.g., in FIGS. 21 and 22), for example, by rotating the upper portion 110 about the hinge joint 120. The structure of the lower portion 102, the upper portion 110, and the hinge joint 120 are described in detail hereinabove, for example, with reference to FIG. 3, and as such, will not be repeated in full here.

Aspects hereof may be described using directional terminology. For example, the terms "horizontal" and "horizontally" as used herein refer to direction and describe an orientation generally parallel to the surface of the earth or a longitudinal direction. Accordingly, the terms "vertical" and "vertically" as used herein refer to a direction perpendicular to, or more perpendicular than parallel to, horizontal. Additionally, relative location terminology will be utilized herein. For example, the term "proximate" is intended to mean on, about, near, by, next to, at, and the like. Therefore, when a feature is proximate another feature, it is close in proximity, but not necessarily exactly at the described location, in some aspects.

Further, terminology relating to relative positions of various features of the embodiments described is also used herein. Accordingly, the terms "forward," and "forward of" should be interpreted according to the figures. For example, with respect to FIGS. 19-26, if hypothetical feature A is "forward of" hypothetical feature B, then hypothetical feature A is nearer a front end 1056 of the terrain working vehicle 1050 (as depicted in FIGS. 19 and 22) than hypothetical feature B. Conversely, if hypothetical feature A is "rearward of" hypothetical feature B, then hypothetical feature A is nearer a rear end 1058 of the terrain working vehicle 1050 (as depicted in FIGS. 19 and 22) than hypothetical feature B. Further, the term "above" refers to a feature that is nearer the upper portion second end 114 (as depicted in FIG. 19), as compared to another feature. Similarly, the term "below" refers to a feature that is nearer the lower portion first end 104 (as depicted in FIG. 19), as compared to another feature. Accordingly, even where a terrain working vehicle is not depicted in the figures, relative positions of features should be interpreted as described above, unless specifically indicated otherwise.

Returning once again to FIG. 19, the lever 1024 is generally operable to provide a force to move the upper portion 110 between the raised position and the lowered position. The lever 1024, which may be a hand lever, includes a lever first end 1026 and a lever second end 1028. The lever first end 1026 may be coupled with the lever-actuated operator protection apparatus 1000 at any suitable location, as will be described in more detail below. The lever second end 1028 is generally positioned such that the lever second end 1028 is accessible from a seat 1052 of the terrain working vehicle 1050 when the upper portion is in each of the raised and lowered positions.

For example, the lever second end 1028 may be positioned forward of the hinge joint 120, forward of a rearmost portion of a seatback 1054 of the seat 1052, or proximate a bottom portion of the seat 1052, when the upper portion 110 is in a raised position. Accordingly, the lever 1024 is effective to move the upper portion 110 between the raised position and the lowered position, for example, when force is applied to the lever second end 1028.

In some aspects, the lever-actuated operator protection apparatus 1000 includes a lever linkage 1040 having a lever linkage first link 1042 coupled with the lower portion 102 and a lever linkage second link 1044 coupled with the upper portion 110. The a lever linkage first link 1042 and the lever linkage second link 1044 may be pivotably coupled at a lever linkage pivot joint 1048. In some aspects, the lever linkage 1040 may be an over-center linkage, or other type of mechanical linkage. Further, in some aspects, the lever first end 1026 may be coupled with the lever-actuated operator protection apparatus 1000 at, or via, the lever linkage 1040. However, it should be appreciated that the lever-actuated operator protection apparatus 1000 is not limited to embodiments having the lever linkage 1040, an over-center linkage, or any other type of linkage.

Figure 20:
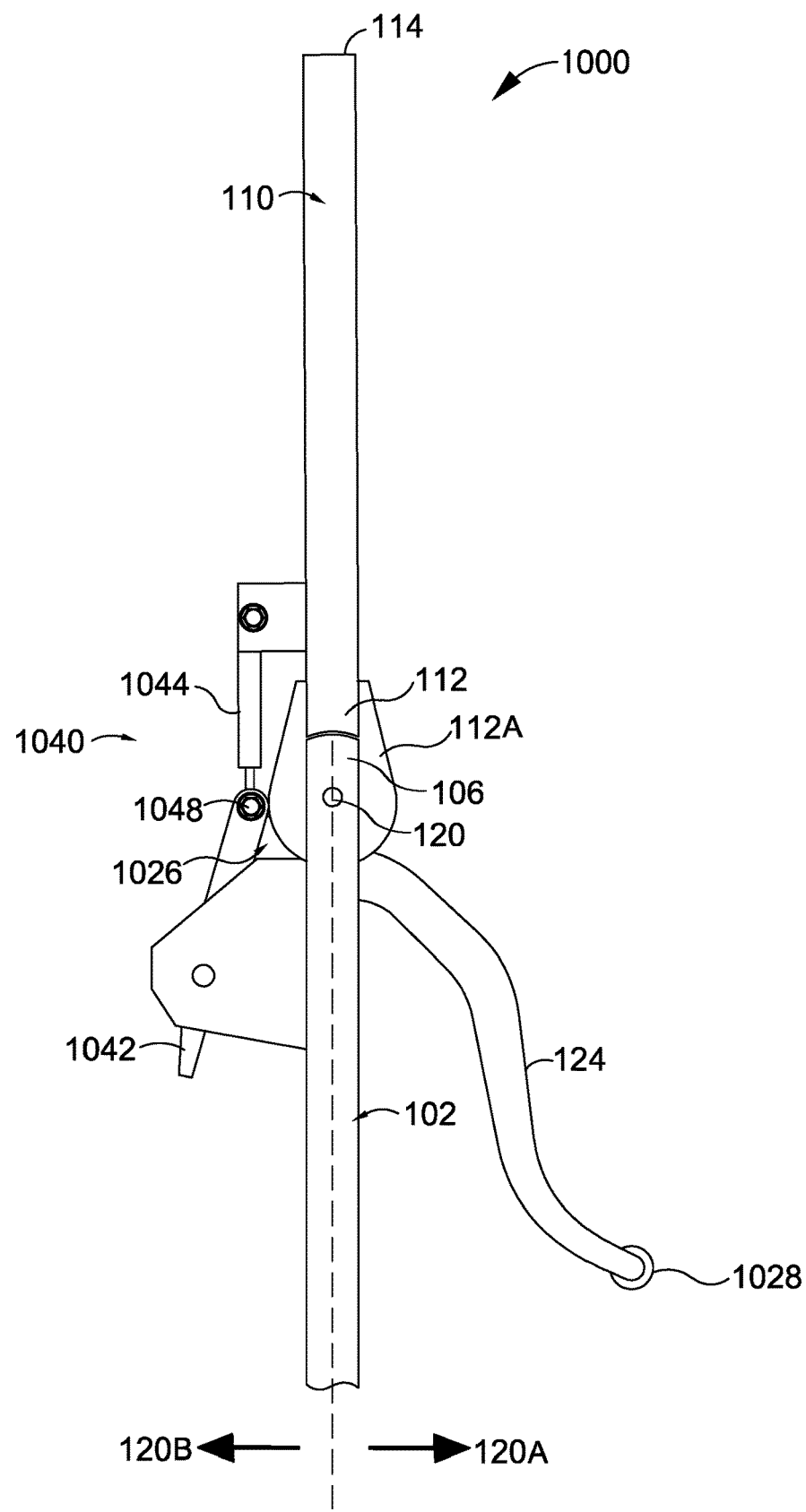
FIG. 20 depicts a side view of the lever-actuated operator protection apparatus of FIG. 19, in a raised position, in accordance with aspects hereof.

Turning now to FIG. 20, the lever-actuated operator protection apparatus 1000 is depicted with the upper portion 110 in the raised position. As mentioned above, the lever second end 1028 may be positioned forward of the hinge joint 120, in the direction indicated by arrow 120A, when the upper portion 110 is in the raised position. Arrow 120A generally indicates a direction oriented toward the front end of the terrain working vehicle (indicated as reference numeral 1056 in FIG. 19). Accordingly, the lever second end 1028 is positioned proximate a seat of a terrain working vehicle to which the lever-actuated operator protection apparatus 1000 is attached, when the upper portion 110 is in the raised position.

In some aspects, the upper portion first end 112 may include an upper portion first end bracket 112A. The upper portion first end bracket 112A may be mated with the lower portion second end 106 such that the upper portion 110 is rotatable about the hinge joint 120 relative to the lower portion 102.

Figure 21:
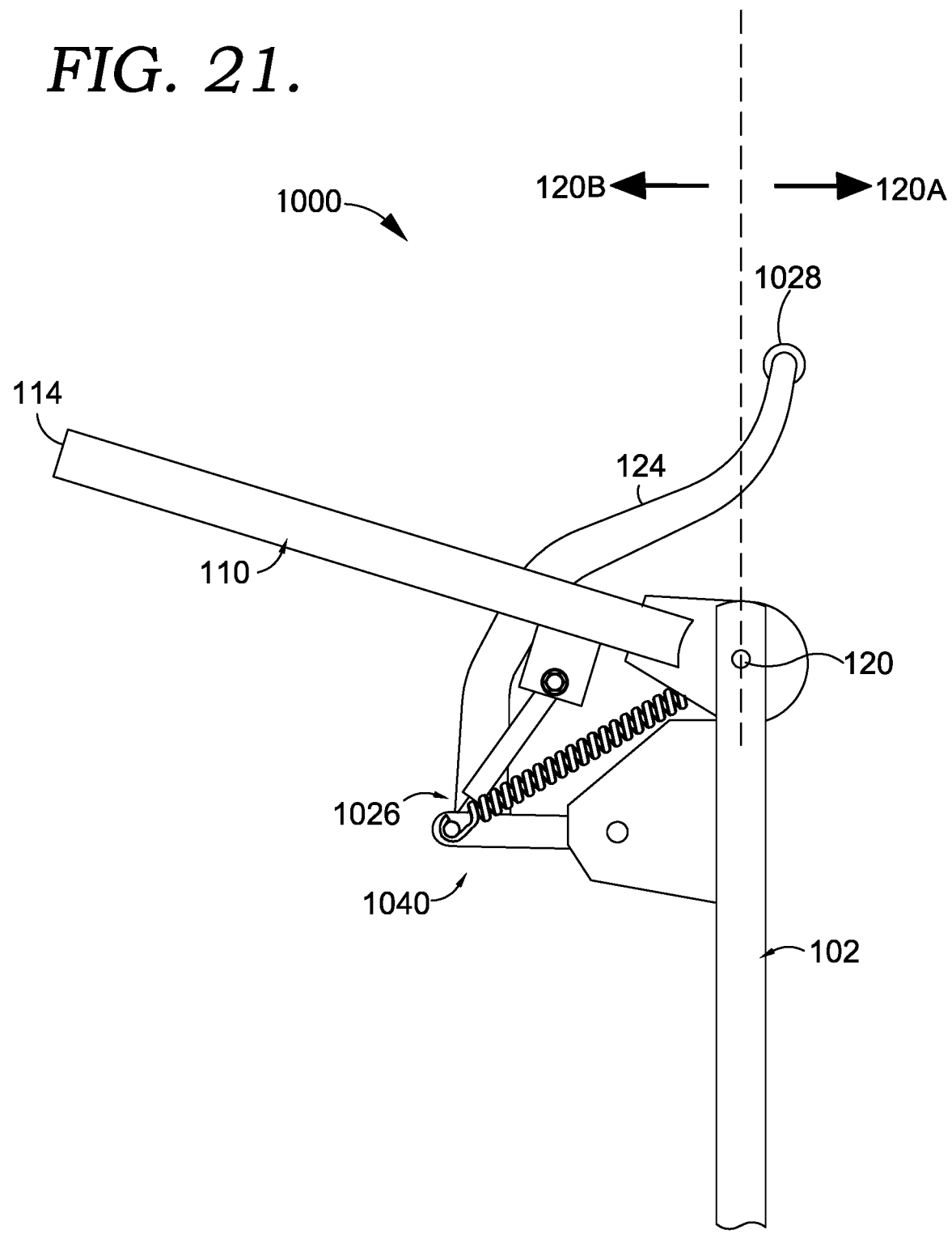
FIG. 21 depicts a side view of the lever-actuated operator protection apparatus of FIGS. 19 and 20, in a lowered position, in accordance with aspects hereof.
Figure 22:
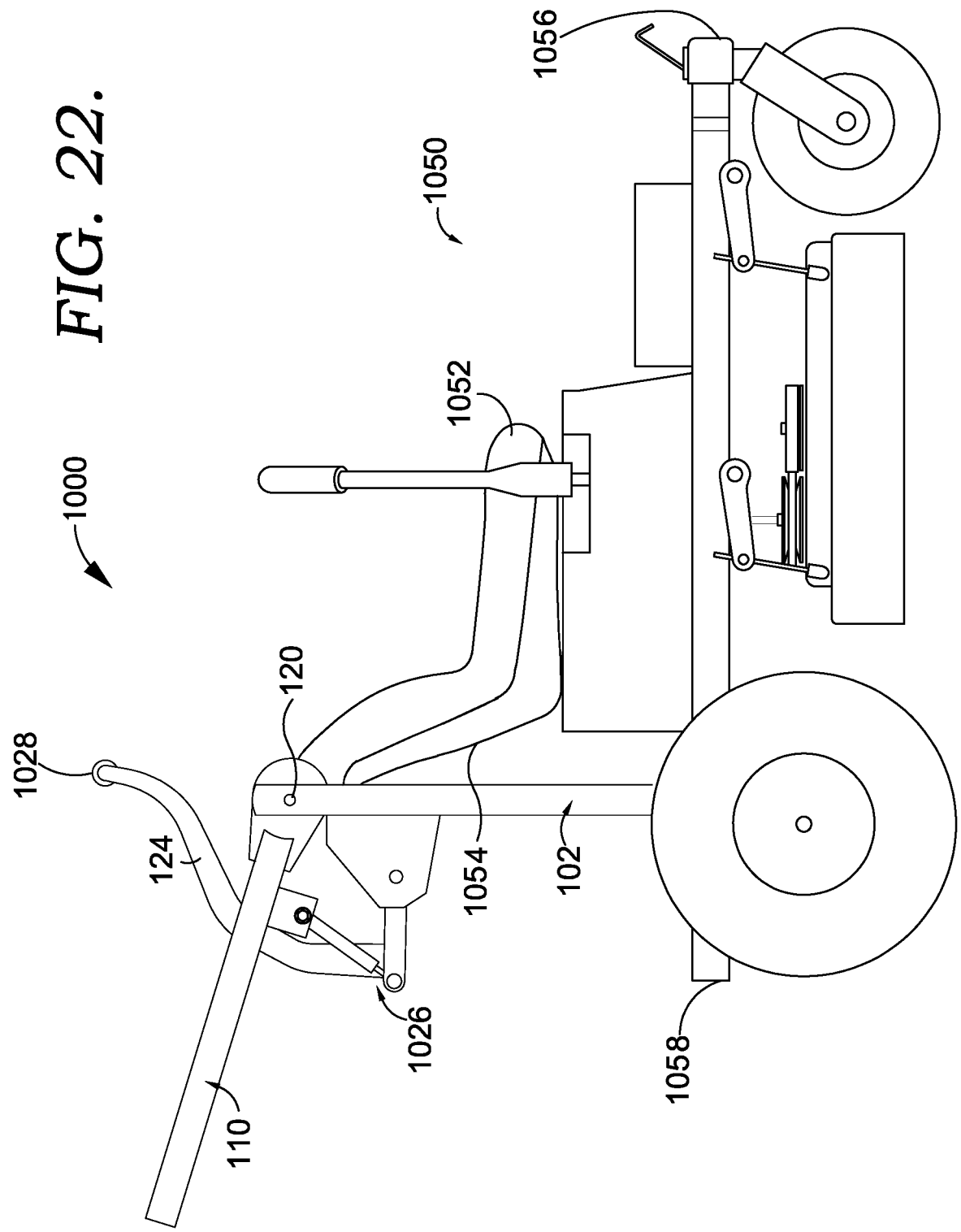
FIG. 22 depicts a side view of the terrain working vehicle with the lever-actuated operator protection apparatus of FIG. 19, in the lowered position, in accordance with aspects hereof.

FIG. 21 depicts the lever-actuated operator protection apparatus 1000 of FIG. 20, with the upper portion 110 in the lowered position. In operation, when a force is received via the lever 1024 (e.g., at the lever second end 1028), the lever 1024 is effective to rotate the upper portion 110 about the hinge joint 120. For example, as depicted here, the upper portion second end 114 has been moved in a counterclockwise direction as compared to the position shown in FIG. 20. In some aspects, the lever-actuated operator protection apparatus 1000 may include a return spring 1110 that counteracts, at least in part, a weight of the upper portion 110 and biases the upper portion 110 toward the raised position. The return spring 1110 may be coupled with the hinge joint 120 (or lower portion 102) and the lever linkage pivot joint 1048 (or other location on the lever linkage 1040). In this exemplary aspect, the return spring 1110 provides a force in a direction of a force required to return the upper portion 110 to the raised position. The return spring 1110 depicted here provides one exemplary type of mechanism that may be used, but, it should be appreciated that any number of suitable mechanisms or structures may be employed to assist with returning the upper portion 110 to the raised position. For example, additional return/lift-assist mechanisms are discussed hereinabove with reference to FIG. 12, and below with reference to FIG. 26. However, the return/lift-assist mechanisms depicted in the figures are not intended to be limiting. Rather, any type of suitable mechanism that provides a force that facilitates rotation of the upper portion 110 from the lowered position toward the raised position is considered within the scope of this disclosure.

In some aspects, the lever second end 1028 may remain forward of the hinge joint 120 when the upper portion 110 is in the lowered position, as indicated by arrow 120A. In other aspects, the lever second end 1028 may be positioned rearward of the hinge joint 120 when the upper portion 110 is in the lowered position, in the direction indicated by arrow 120B.

However, it should be appreciated that the lever-actuated operator protection apparatus 1000 is configured such that the lever second end 1028 remains accessible from a an operator position, such as a seat, of a terrain working vehicle when the upper portion 110 is in the lowered position. For example, as shown in FIG. 22, the lever second end 1028 may be positioned forward of, or approximately aligned with, a rearmost portion of the seatback 1054 of the terrain working vehicle 1050, when the upper portion 110 is in the lowered position. As such, the lever second end 1028 remains accessible from the seat 1052 when the upper portion 110 is in the lowered position so that the upper portion 110 may be returned to the raised position from the seat 1052.

Figure 23:
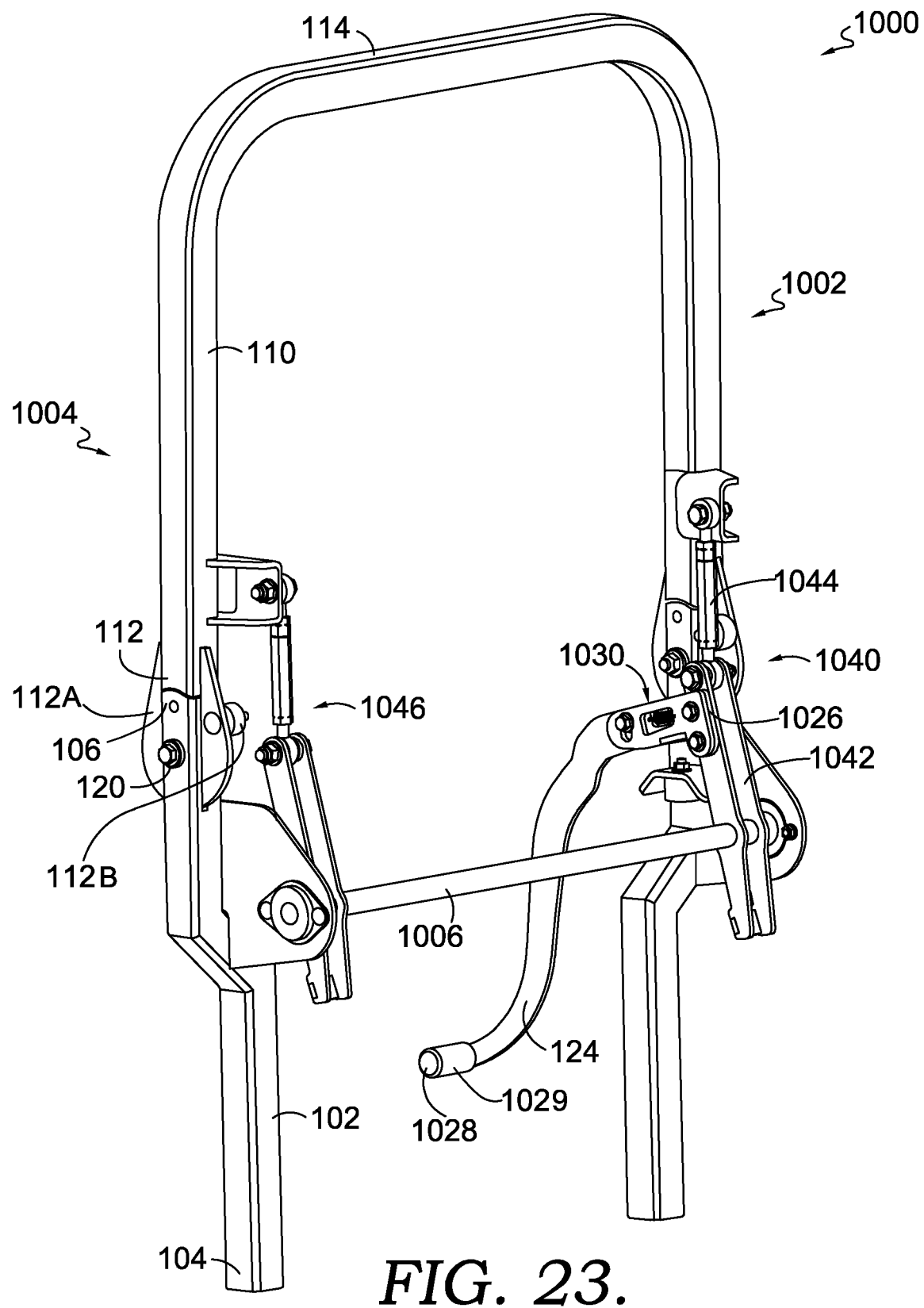
FIG. 23 depicts a perspective view of the lever-actuated operator protection apparatus of FIGS. 19-22, in the raised position, in accordance with aspects hereof.

FIG. 23 depicts a perspective view of the lever-actuated operator protection apparatus 1000 shown in FIGS. 19-22, in the raised position. The lever-actuated operator protection apparatus 1000 may include an operator protection apparatus first side 1002 and an operator protection apparatus second side 1004. The operator protection apparatus second side 1004 is generally laterally spaced apart from the operator protection apparatus first side 1002.

Additionally, FIG. 23 depicts a first lever linkage 1040 coupled with the upper portion 110 and the lower portion 102 at the operator protection apparatus first side 1002, and a second lever linkage 1046 coupled with the upper portion 110 and the lower portion 102 at the operator protection apparatus second side 1004. As mentioned above, the lever first end 1026 may be coupled with the first lever linkage 1040, for example, at the lever linkage first link 1042. Additionally, the lever 1024 may include a grip 1029 proximate the lever second end 1028. In some aspects, the lever linkage 1040 may provide a mechanical advantage for moving the upper portion 110 between the raised and lowered positions, and for retaining the upper portion 110 in the raised position. Accordingly, in some aspects, the lever 1024 acts on the lever linkage 1040 to move the upper portion 110 between a raised and lowered positions.

However, it should be appreciated that the lever 1024 may be coupled with the lever-actuated operator protection apparatus 1000 at any suitable position, for example, directly with the upper portion 110, or with a torque tube, such as torque member 1006. As shown here, the torque member 1006 may be coupled with the first lever linkage 1040 and coupled with the second lever linkage 1046. In other aspects, the torque member 1006 may be directly coupled with the operator protection apparatus first side 1002 and the operator protection apparatus second side 1004.

In some embodiments, the lever-actuated operator protection apparatus 1000 may include a latching mechanism 1030. The latching mechanism 1030 may be coupled with the lever 1024, for example, proximate the lever first end 1026. The latching mechanism 1030 will be discussed in more detail below with respect to FIGS. 24 and 25, but in general, the latching mechanism 1030 is biased toward an engaged position to provide securement of lever 1024 to retain the upper portion 110 in the raised position.

Although some exemplary aspects of rotatably coupling the upper portion 110 and the lower portion 102 are depicted in the figures, any suitable mechanism for doing so is considered within the scope of this disclosure. In the exemplary aspect depicted in FIG. 23, the upper portion first end bracket 112A may comprise a relatively flat structure that is fitted within a channel or cutout formed within the lower portion second end 106, and held in place by the hinge joint 120. In some aspects, the upper portion first end bracket 112A may include a motion-limiting stop 112B, which limits a range of motion of the upper portion 110. The motion-limiting stop 112B may be adjustable throughout a range of positions to accommodate different types of terrain working vehicles. In some aspects, the motion limiting stop may include a suitable material for dampening contact forces, such as a polymer based material.

Figure 24:
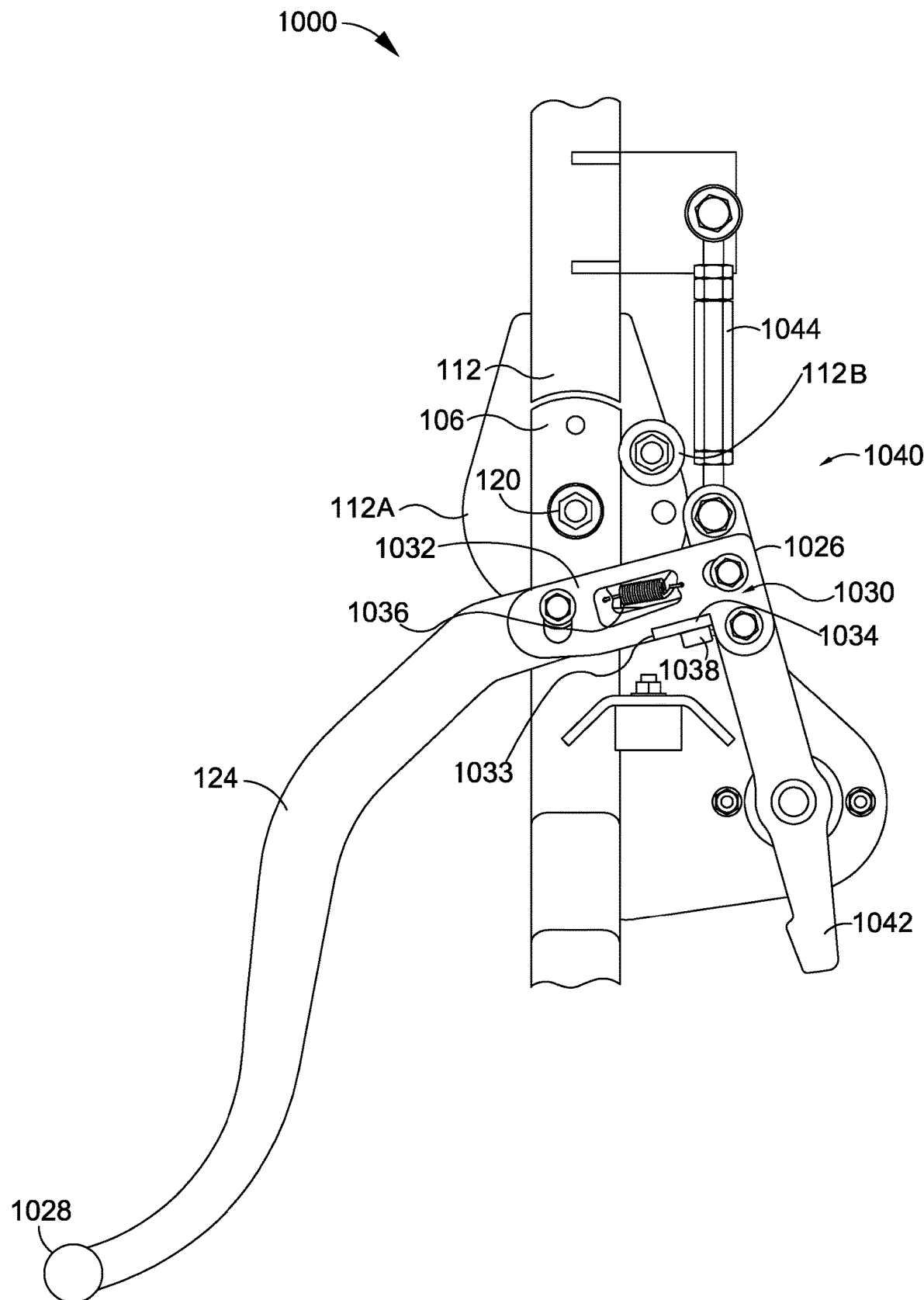
FIG. 24 depicts a close-up side view of the lever-actuated operator protection apparatus depicted in FIG. 23, the lever-actuated operator protection apparatus having a latching mechanism, in an engaged position, in accordance with aspects hereof.

Turning now to FIG. 24, a close-up side view of the lever-actuated operator protection apparatus 1000 of FIG. 23 is depicted. The latching mechanism 1030 is shown in more detail here, in an engaged position, and may include a latch 1032 and a catch 1034. In some aspects, the latch 1032 may be coupled with and adjacent to the lever first end 1026, and the catch 1034 may be coupled with the lower portion 102. As can be appreciated, the lower portion 102 is substantially static relative to the vehicle/equipment to which it is attached. Accordingly, the catch 1034 may provide an anchor point for limiting movement of the lever 1024 (and the upper portion 110) relative to the lower portion 102. In some aspects, the latching mechanism 1030 comprises a biasing mechanism 1036 that biases the latch 1032 toward an engaged position, in which the latch 1032 maintains contact with the catch 1034. For example, the latch 1032 may include a lip 1033 that engages the catch 1034. The lip 1033 may overhang or overlap the catch 1034 in the engaged position, such that the lip 1033 is contiguous to (or substantially contiguous to) the catch 1034. The exemplary biasing mechanism 1036 depicted here provides tension between the latch 1032 and the lever 1024, thereby inhibiting movement of the latch 1032 from the engaged position to a disengaged position. Although the biasing mechanism 1036 is depicted in the figures as a spring, any suitable mechanism or material is considered within the scope of this disclosure.

The latching mechanism 1030 may also include a latch sensor 1038 operably coupled with the latching mechanism 1030 to detect a position (e.g., engaged or disengaged) of the latching mechanism 1030 and/or the lever-actuated operator protection apparatus 1000. In some aspects, the latch sensor 1038 may be a switch, which is depressed when the latch 1032 is engaged. The latch sensor 1038 may be communicatively coupled with a controller (or other computing device) of a terrain working vehicle or associated with the lever-actuated operator protection apparatus 1000. The latch sensor 1038 (and/or the controller/computing device) may also be communicatively coupled with one or more indicators, such as indicator lights, audible indicators, tactile indicators, and the like. A detailed discussion of sensors and indicators, which is applicable to latch sensor 1038, is included hereinabove with reference to FIG. 18, and, as such, will not be repeated in full here.

Figure 25:
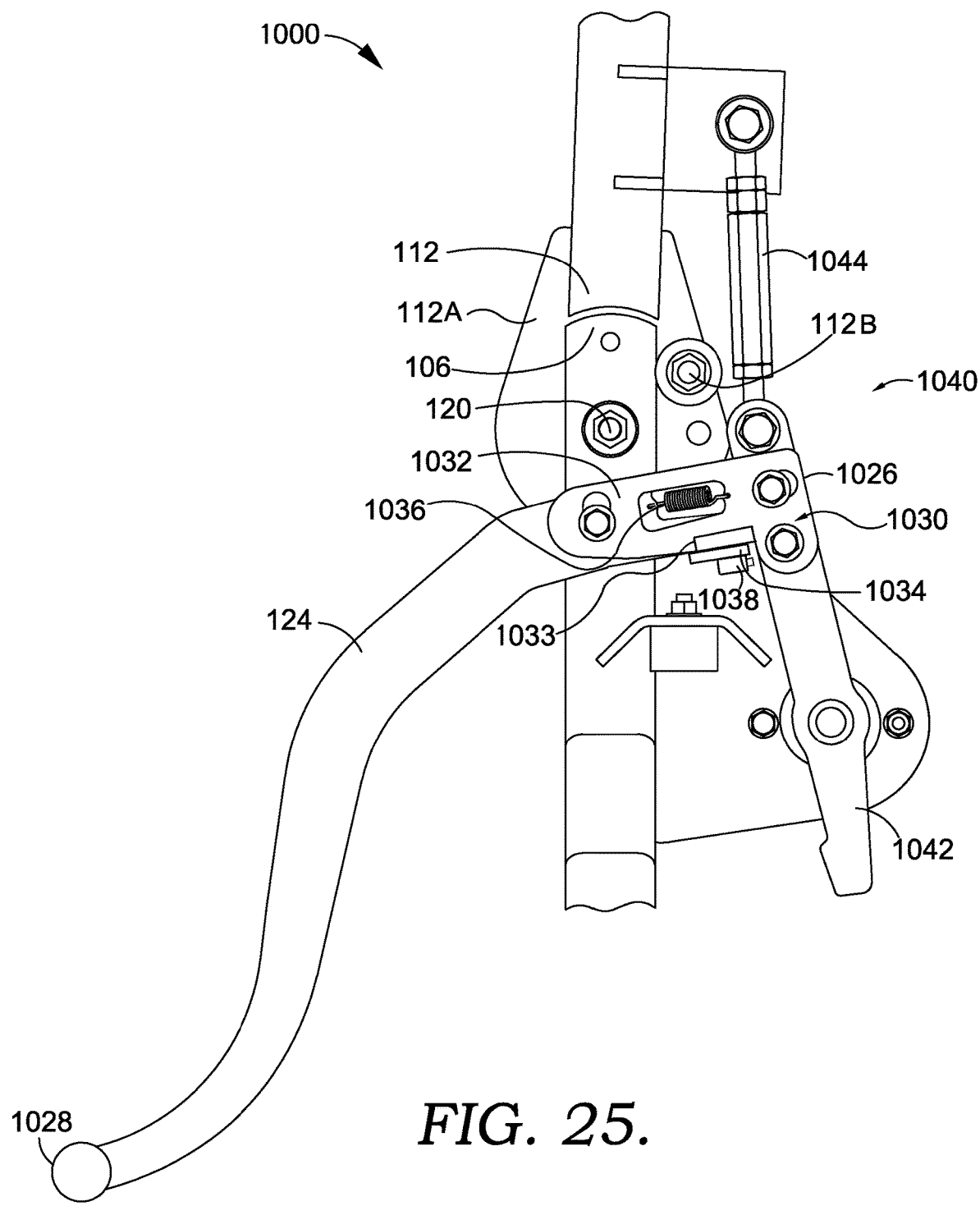
FIG. 25 depicts a close-up side view of the lever-actuated operator protection apparatus of FIG. 24, having the latching mechanism, in a disengaged position, in accordance with aspects hereof.

Turning now to FIG. 25, the latching mechanism 1030 is depicted in the disengaged position. When the lever 1024 is moved with sufficient force to overcome the tension between the latch 1032 and the lever 1024 provided by the biasing mechanism 1036, the lip 1033 is raised above the catch 1034. Accordingly, in operation, the lever 1024 is effective to move the latch 1032 from the engaged position to the disengaged position as the lever 1024 moves the upper portion 110 from the raised position toward the lowered position. For example, as compared to FIG. 24, the lever 1024 has been rotated in a clockwise direction, moving the lip 1033 vertically above the catch 1034, thereby allowing the upper portion 110 to rotate rearward toward the lowered position. It should be appreciated that although the lip 1033 is referred to as vertically above the catch 1034 in the disengaged position, a portion of the lip 1033 may remain in contact with a top surface of the catch 1034. In the exemplary aspect depicted in FIG. 25, the latch sensor 1038 (e.g., a switch) is no longer depressed when lip 1033 is moved vertically above the catch 1034, which causes the latch sensor 1038 to detect that the latch 1032 is disengaged.

Figure 26:
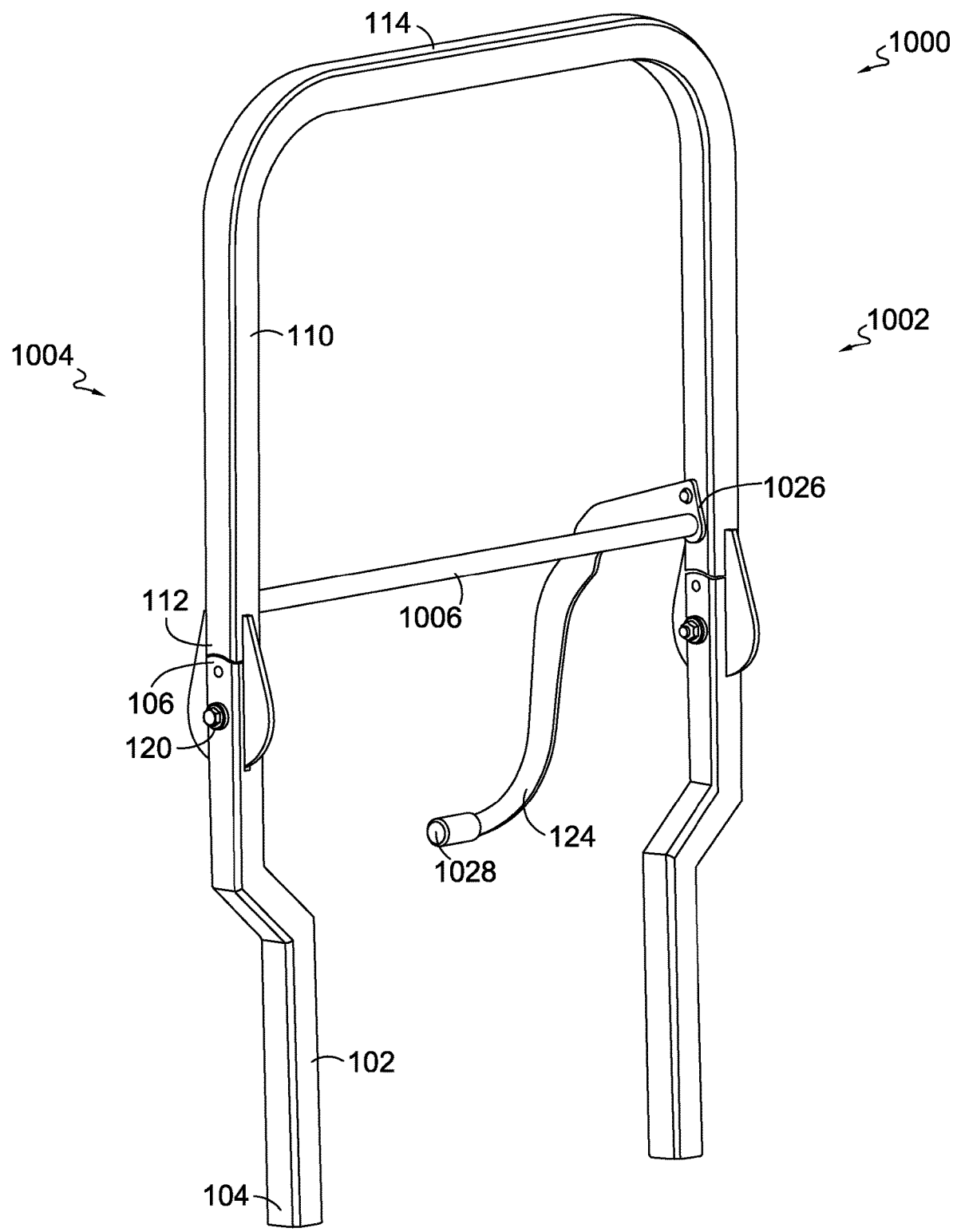
FIG. 26 depicts an alternative perspective view of additional aspects of the lever-actuated operator protection apparatus, in the lowered position, in accordance with aspects hereof.

FIG. 26 depicts additional aspects of the lever-actuated operator protection apparatus 1000. For example, in some aspects, the lever-actuated operator protection apparatus 1000 may not include a lever linkage. Further, in other aspects, the torque member 1006 may be directly coupled with the operator protection apparatus first side 1002 and the operator protection apparatus second side 1004. Additionally, the lever 1024 may be coupled with the lever-actuated operator protection apparatus 1000 at the torque member 1006. The torque member 1006 distributes and/or transmits torque applied via the lever 1024 to each of the operator protection apparatus first side 1002 and the operator protection apparatus second side 1004. In this case, the lever 1024 is effective to transmit a rotational force to the torque member 1006, thereby facilitating movement of the upper portion 110 between the raised and lowered positions. The torque member 1006 may be a tube, a rod, a shaft, or any other suitable structure for transferring force between the operator protection apparatus first side 1002 and the operator protection apparatus second side 1004.

As shown in FIG. 26, the torque member 1006 may be positioned at any suitable location, for example, coaxially with the hinge joint 120. Additionally, the lever-actuated operator protection apparatus 1000 may include a variety of return/lift-assist mechanisms that facilitate rotation of the upper portion 110 from the lowered position toward the raised position. In one exemplary aspect, the lever-actuated operator protection apparatus 1000 may include a torque member torsion spring 1112 that is fitted about the torque member 1006. The torque member torsion spring 1112 may be affixed to the torque member 1006 (e.g., via a clamp) and the lower portion 102 (e.g., via a bracket at the operator protection apparatus second side 1004). The torque member torsion spring 1112 may be fixed relative to the lower portion 102 such that the torque member torsion spring 1112 applies a rotational force 1118 to the torque member 1006. Accordingly, the torque member torsion spring 1112 provides a rotational force that decreases an amount of force required by the lever 1024 to move the upper portion 110 to the raised position. Additionally, the torque member torsion spring 1112 may be surrounded by a cover 1116 (shown here in a cutaway view to show the torque member torsion spring 1112) such that the torque member torsion spring 1112 is enclosed within the cover 1116.

In another exemplary aspect, the lever-actuated operator protection apparatus 1000 may include a hinge joint torsion spring 1114 coupled about the hinge joint 120 and having opposing ends affixed to the lower portion 102 and the upper portion 110. Accordingly, the hinge joint torsion spring 1114 may provide a force that coincides with rotation of the upper portion 110 about the hinge joint 120 toward the raised position.

It should be appreciated that the return/lift-assist mechanisms depicted in the figures (e.g., FIGS. 12, 21, and 26) are exemplary only and are not intended to be limiting. Rather any suitable mechanism (e.g., tension, compression, helical, rotary, and coil springs, counter weights, gas cylinders, and the like) that aids in moving the upper portion 110 between the lowered and raised position is considered within the scope of this disclosure. Additionally, the return/lift-assist mechanisms may provide a dampening effect that support at least a portion of the weight of the upper portion 110 as the upper portion 110 moves toward the lowered position. Accordingly, the return/lift-assist mechanisms lessen an amount of force that an operator must apply to the lever 1024 to both raise and lower the upper portion 110. Further, such return/lift-assist mechanisms are not limited to the locations for positions depicted in the figures. Instead, the return/lift-assist mechanisms may be coupled with the lever-actuated operator protection apparatus 1000 at any suitable location to counteract the weight of the upper portion 110 and/or assist in actuating the lever 1024 to move the upper portion between the raised and lowered positions.

Control System for Terrain Working Vehicle

In accordance with other aspects of this invention, a control system for a terrain working vehicle having an operator protection apparatus is described herein. At a high level, the control system is configured to control one or more operations of a terrain working vehicle and may be configured to be included with any terrain working vehicle contemplated herein. Generally, the control system may include multiple, individual components that can be communicatively coupled, integrated, and/or associated with various components of a terrain working vehicle. Moreover, at least some of the components of the control system may be configured to collect sensor data related to components of the terrain working vehicle, to receive inputs from activated switches of the terrain working vehicle, and to provide indicators when the terrain working vehicle and/or components thereof are in specified conditions. Further, the control system may include logic and may be configured to instruct or cease operations based on data and/or inputs related to components of the terrain working vehicle.

Figure 27:
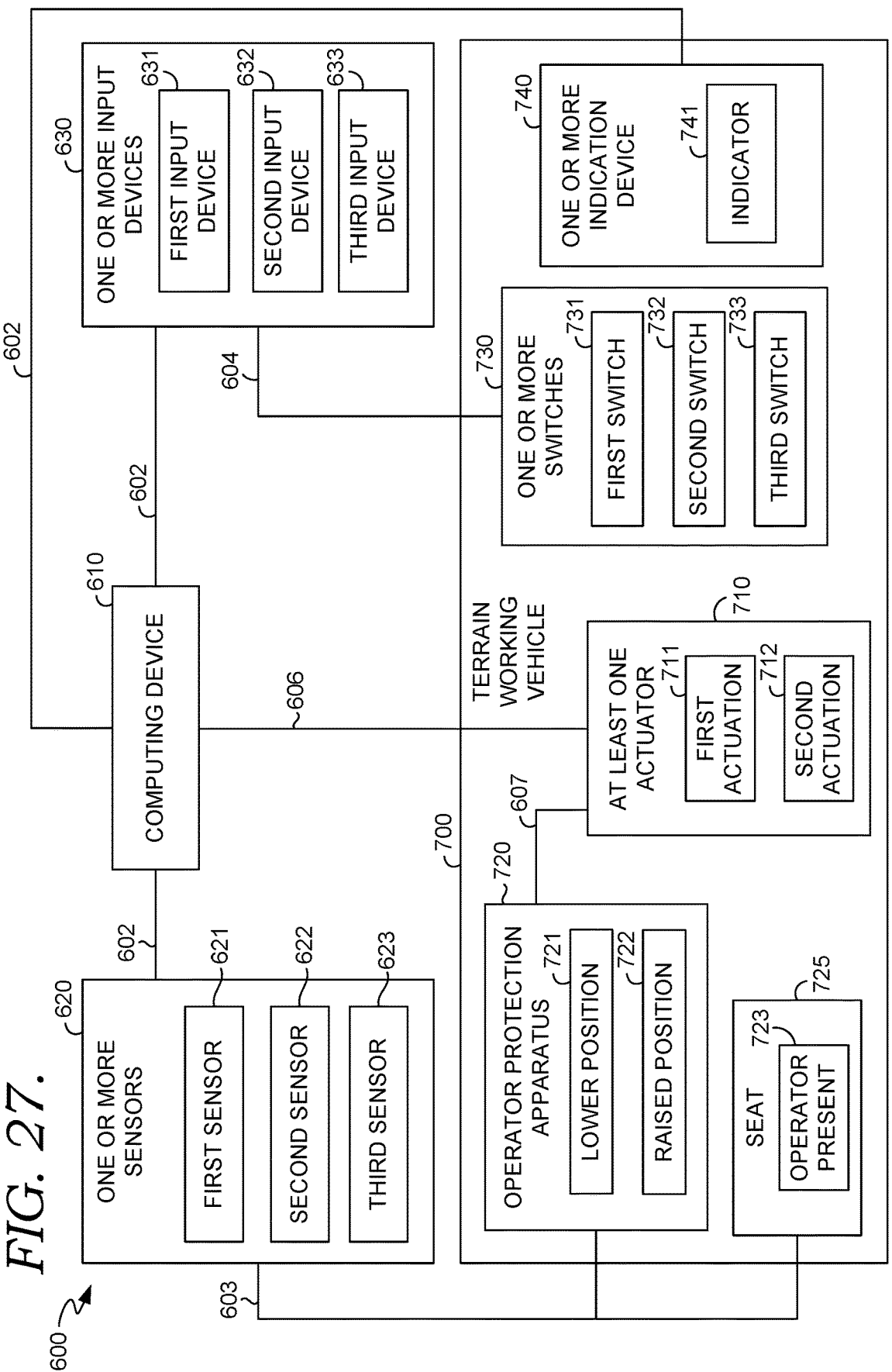
FIG. 27 is a system diagram of components of a control system for a terrain working vehicle with an operator protection apparatus, in accordance with aspects hereof.

FIG. 27 is a schematic diagram of an example control system illustratively depicting components of a control system 600 for a terrain working vehicle 700. As shown, the control system 600 comprises a computing device 610, one or more sensors 620, one or more input devices 630, and one or more indication devices 640. The computing device 610 is communicatively coupled with each of the one or more sensors 620, the one or more input devices 630, and the one or more indication devices 640. The communicative coupling of these components is illustrated in FIG. 27 by lines 602, and the components are communicatively coupled such that data, information, and/or inputs may be transmitted to and from the computing device 610 and each of the one or more sensors, input devices, and indication devices 620, 630, 640. In one aspect, the communicative coupling 602 may occur via wires extending from the computing device 610 to each of the one or more sensors, input devices, and indication devices 620, 630, 640. In other aspects, the communicative coupling 602 may occur wirelessly, and in this aspect, the computing device 610, the one or more sensors 620, the one or more input devices 630, and the one or more indication devices 640 may each include a wireless component that is configured to facilitate Wi-Fi®, Bluetooth® communications, GIS communications, and other near-field communications.

Staying with FIG. 27, the terrain working vehicle 700 is depicted as including at least one actuator 710, an operator protection apparatus 720, a seat 725, one or more switches 730, and an indicator 740 (discussed in more detail below). Moreover, the operator protection apparatus 720 is moveable to and between a lowered position 721 and a raised position 722, and the at least one actuator 710 is configured to provide a first actuation 711 (e.g., a downward movement) and a second actuation 712 (e.g., an upward movement). Further, the at least one actuator 710 is operably coupled to the operator protection apparatus 720, which is illustratively represented by line 607, and is configured such that the first actuation 711 moves the operator protection apparatus 720 to and into the lowered position 721 and the second actuation 712 moves the operator protection apparatus 720 to and into the raised position 722.

Returning to discussion of the control system 600, aspects herein contemplate that the control system 600 is configured to be integrated with the terrain working 700 such that the one or more sensors 620 and the one or more input devices 630 are each associated with a component of the terrain working vehicle 700. Such aspects further contemplate that the one or more sensors 620 are each configured to detect, collect, and/or sense data from an associated component and to be engaged or disengaged based on conditions related to an associated component. Similarly, the one or more input devices 630 are each configured to be engaged when an associated switch is activated and disengaged when an associated switch is deactivated.

In more detailed aspects, the one or more sensors 620 may include a first sensor 621, a second sensor 622, and a third sensor 623 that are connected to a respective component of the terrain working vehicle 700, which is illustratively represented by line 603. As shown in FIG. 27, the first and second sensors 621, 622 are associated with an operator protection apparatus 720, and the third sensor 623 is associated with the seat 725. The first sensor 621 is configured to detect, collect, and/or sense data related to the raised position 722 of the operator protection apparatus 720 and is further configured to be engaged when the operator protection apparatus 720 in the raised position 722 and to be disengaged when the operator protection apparatus 720 is in any other position. Comparatively, the second sensor 622 is configured to detect, collect, and/or sense data related to the lowered position 721 of the operator protection apparatus 720 and is further configured to be engaged when the operator protection apparatus 720 in the lowered position 721 and disengaged when the operator protection apparatus 720 is in any other position. Additionally, the third sensor 623 is configured to detect, collect, and/or sense data related to an operator presence in the seat 725 and is also configured to be engaged when an operator is seated in the seat 725 and disengaged when the operator is not detected in the seat 725.

Continuing, the one or more input devices 630 include a first input device 631, a second input device 632, and a third input device 633 that are connected to a respective switch of the one or more switches 730 by line 604, which represent associations between the one or more input devices 630 and the one or more switches 730. In such aspects, the first input device 631 is associated with a first switch 731, the second input device 632 is associated with a second switch 732, and the third input device 633 is associated with a third switch 733. Moreover, each of the first, second and third input devices 631, 632, 633 are configured to be engaged when each of the first, second, and third switches 731, 732, 733 is respectively activated and are configured to be disengaged when each of the first, second, and third switches 731, 732, 733 is respectively deactivated.

Further aspects herein contemplate that each of the one or more sensors 620 are configured to transmit sensor data to the computing device 610, and likewise, each of the one or more input devices 630 are configured to transmit inputs to the computing device 610. In more detailed, related aspects, it is contemplated that, when engaged, the first sensor 621 communicates to the computing device 610 that the operator protection apparatus 720 is in the raised position 722, and when disengaged, the first sensor 621 communicates to the computing device 610 that the operator protection apparatus 720 is in a position other than the raised position 722. Similarly, the second sensor 622 communicates to the computing device 610 that the operator protection apparatus 720 is in the lowered position 721 when the second sensor 622 is engaged and communicates to the computing device 610 that the operator protection apparatus 720 is in a position other than the lowered position 721 when the second sensor 622 is disengaged. Moreover, when the third sensor 623 is engaged, it communicates to the computing device 610 that an operator is seated in the seat 725, and when disengaged, the third sensor 623 communicates to the computing device 610 that the operator is not present in the seat 725. Further, when the first, second and third input devices 631, 632, 633 are engaged through a respective activation of the first, second, and third switches 731, 732, 733, each of the first, second and third input devices 631, 632, 633 respectively transmits an input to the computing device 610. Conversely, when the first, second, and third input devices 631, 632, 633 are disengaged (i.e., deactivation of the first, second, and third switches 731, 732, 733), no input is transmitted to the computing device 610 by the first, second, and third input devices 631, 632, 633.

In further aspects still, the one or more indication devices 640 are configured to provide indicators for alerting an operator when the terrain working 700 and/or components thereof satisfy specified conditions. Such aspects, contemplate that the computing device 610 may instruct each of the one or more indication devices 640 to provide the indicator 740 (e.g., an audible alarm) based on sensor data and/or inputs received from the one or more sensors 620 and/or the one or more input devices 630. Moreover, each of the one or more indication devices 640 may be associated with and may provide the indicator 740. In one example, the one or more indication devices 640 includes an audio indication device that is associated with an indicator including an audio output. Staying with this example, when the terrain working vehicle 700 and/or components thereof satisfy specified conditions (e.g., a position of the operator protection apparatus 720), the computing device 610 instructs the audio indication device to provide an associated indicator, and in turn, an audio output (e.g., a beeping sound) is generated to alert the operator of the specified conditions of the terrain working vehicle and/or components thereof (e.g., the operator protection apparatus 720 is in a position other than the raised position 722).

As previously discussed, aspects hereof contemplate that the control system 600 is configured to control one or more operations of the terrain working vehicle 700. In such aspects, the computing device 610 is configured to receive sensor data from the one or more sensors 620, to receive inputs from the one or more input devices 630, and to provide indicators via the one or more indication devices 640. Moreover, the computing device 610 includes a logic that uses the sensor data and/or inputs received from the one or more sensors 620 and/or the one or more input devices 630 to make a number of determinations related to various operations of the terrain working vehicle 700. Further, such determinations may involve the computing device 610 instructing or ceasing an operation of one or more components of the terrain working 700 (discussed in more detail below).

Related aspects herein contemplate that the computing device 610 may be communicatively coupled to the terrain working vehicle 700 and/or components thereof. In FIG. 27, the computing device 610 is connected to the at least one actuator 710 by line 606, which represents a communicative coupling of the computing device 610 to the at least one actuator 710. In these aspects, the computing device 610 is configured to instruct or cease actuation of the at least one actuator 710, which is configured to move the operator protection apparatus 720 to and between the lowered and raised positions 721, 722. Thus, the computing device 610 is configured to effectuate movement of the operator protection apparatus 720 by instructing or ceasing an actuation of the at least one actuator 710.

In more detailed aspects, the at least one actuator 710 includes the first actuation 711, which moves the operator protection apparatus 720 toward and into the lowered position 721 and also includes the second actuation 712 that moves the operator protection apparatus 720 toward and into the raised position 722. Such aspects further contemplate that the computing device 610 is configured to instruct or cease the first and second actuations 711, 712, and in turn, the computing device 610 may effectuate movement of the operator protection apparatus 720 toward and into the lowered and raised positions 721, 722. Further, the computing device 610 may make a determination to effectuate movement of the operator protection apparatus 720 by using the logic and the sensor data and/or inputs received from the one or more sensors 620 and/or the one or more input devices 630. For instance, when the first sensor 621 is disengaged, the first sensor 621 communicates to the computing device 610 that the operator protection apparatus 720 is in a position other than the raised position 722, and based on this sensor data and the logic, the computing device 610 instructs the second actuation 712 of the at least one actuator 710, thereby effectuating movement of the operator protection apparatus 720 toward and into the raised position 722.

As previously mentioned, the control system 600 may be configured to be included with any of the terrain working vehicles contemplated herein, and the components of the control system 600 may be coupled or attached to the terrain working vehicle at a variety of different locations. In some aspects, the computing device 610, the one or more sensors 620, the one or more input devices 630, and/or the one or more indication devices 640 are configured to be coupled or attached to the terrain working at locations that are suitable for both communicative coupling and transferring a certain sensor data, inputs, and indications. Moreover, the control system 600 may comprise any number and/or combination of individual components discussed herein, which may be associated with a variety of different components of the terrain vehicles contemplated herein. As such, aspects hereof contemplate that the computing device 610, the one or more sensors 620, the one or more input devices 630, and/or the one or more indication devices 640 may be modified for integration and may be implemented as another type or variation suitable for a particular terrain working vehicle and/or components thereof.

In accordance with aspects herein, non-limiting examples of other types or variations of components of the control system 600 that may be implemented include: the computing device 610 may be implemented as the controller 198, 298, 398, or 498; any of the one or more sensors 620 (e.g., the first, second, and third sensors 621, 622, 623) may be implemented as the one or more sensors 170, the position sensor 170 or 470, the tilt sensor, the latch sensor 1038; any of the one or more input devices 630 (e.g., the first, second and third input devices 631, 632, 633) may be implemented as the foot button 341, the toggle switch 343, or the foot pedal 428; and any of the one or more indicators 640 may be implemented as the visual indicator 472 or the tactile indicators 474.

Aspects herein also contemplate that the terrain working vehicle 700 and the components thereof may be modified and implemented as other types or variations suitable for a control system and components thereof. Non-limiting examples of other types or variations of terrain working vehicles and/or components thereof include: the terrain working vehicle 700 may be implemented as lawn tractors, UTVs, ATVs, compact tractors, loaders, and the riding mower 190, 390, or 490; the operator protection apparatus 720 may be implemented as the operator protection apparatus 100, 200, 300, or 400; the at least one actuator 710 may be implemented as the actuator 122, 240, 245, 340, 345, or 440; the seat 725 may be implemented as the seat 393 or 493; any of the one or more switches 730 (e.g., the first, second, and third switches 731, 732, 733) may be implemented as the foot button 341, the toggle switch 343, the foot pedal 428, or the operator controls 395; and the indicator 740 may be implemented as indicator lights, audible indicators (e.g., speakers), or tactile indicators.

Figure 28:
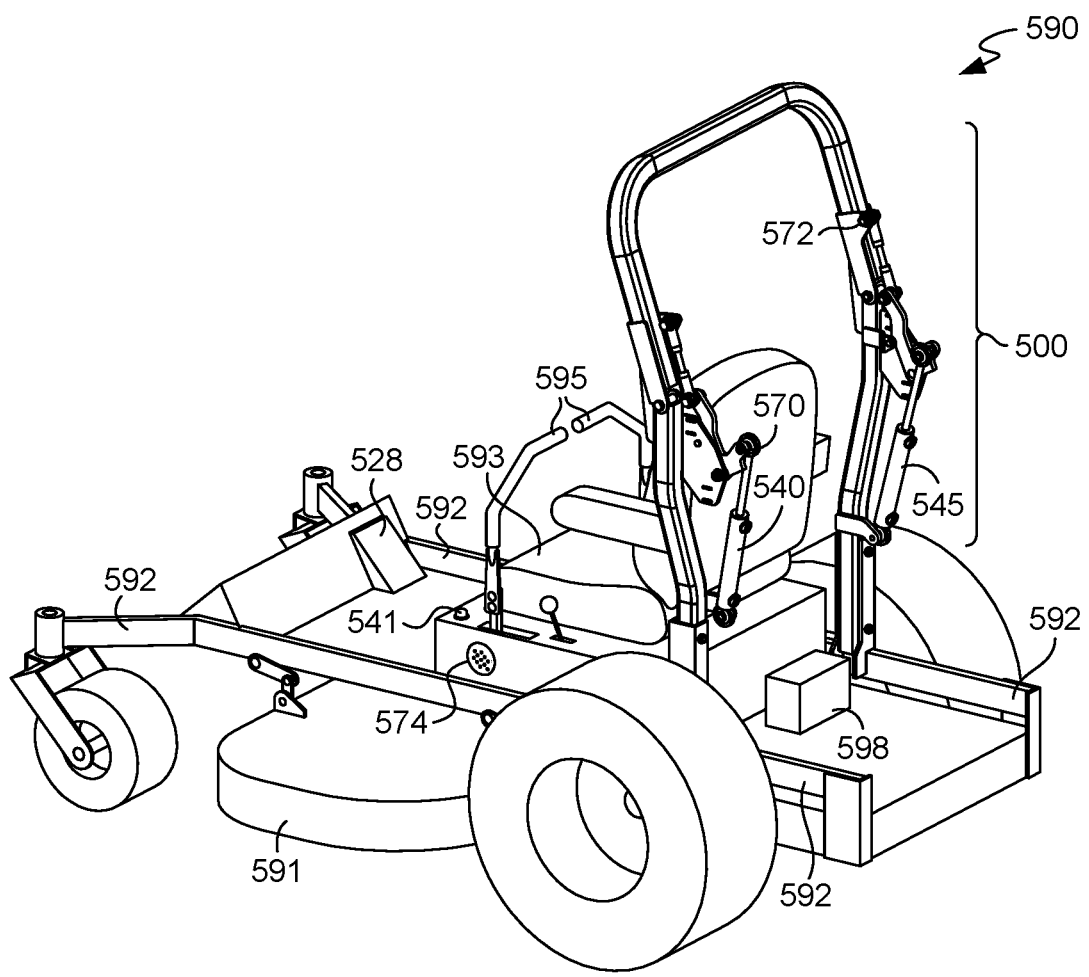
FIG. 28 depicts a riding mower having an operator protection apparatus in a raised position and including a control system for controlling one or more operations of the riding mower, in accordance with aspects hereof.
Figure 29:
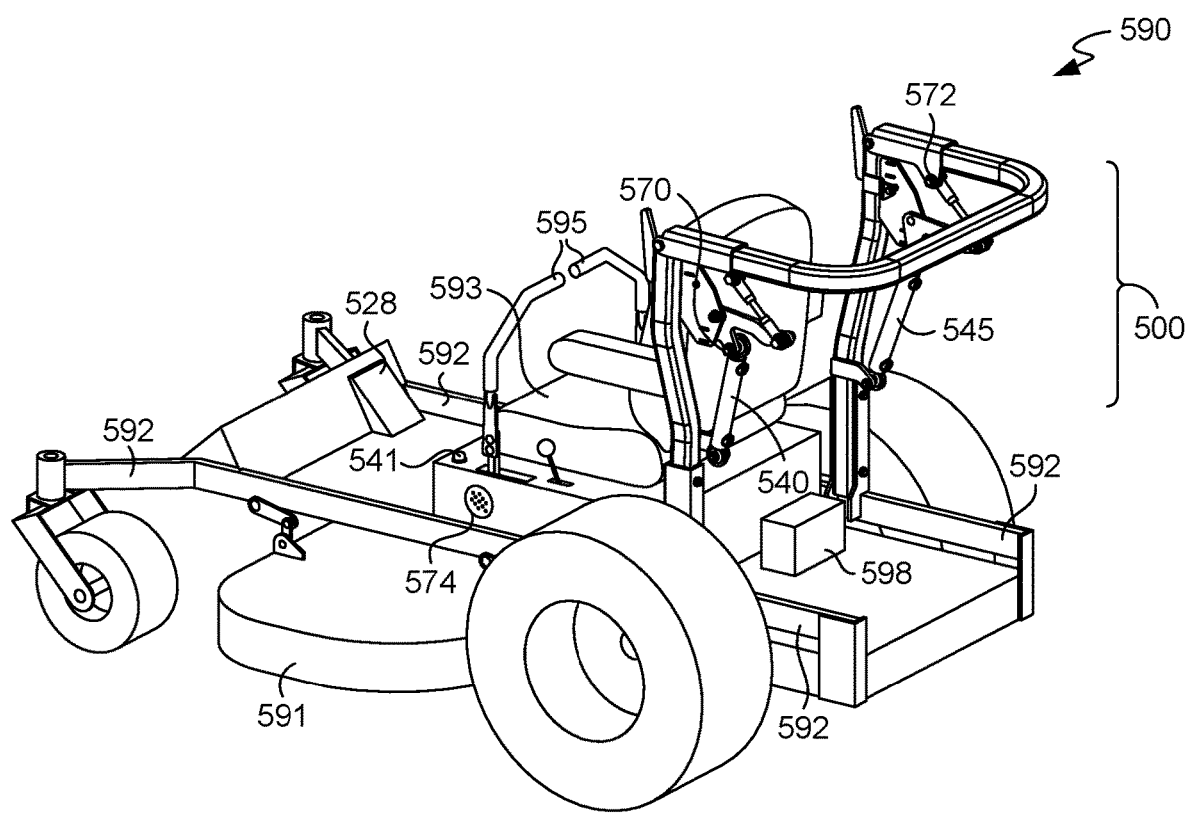
FIG. 29 depicts the riding mower of FIG. 28 with the operator protection apparatus in a lowered position, in accordance with aspects hereof.

Turning now to FIGS. 28 and 29, an example of a control system integrated with a terrain working vehicle having an operator protection apparatus is depicted. As shown, the terrain working vehicle is depicted as a riding mower 590 having an operator protection apparatus 500 that is movable to and between a raised position (depicted in FIG. 28) and a lowered position (depicted in FIG. 29). Both the riding mower 590 and the operator protection apparatus 500 may include any number and/or combinations of aspects related to terrain working vehicles and operator protection apparatuses discussed herein, and because detailed discussions of these aspects, which are applicable to the riding mower 590 and the operator protection apparatus 500, are included herein above, such discussions will not be repeated in full here. Notwithstanding, certain aspects of the riding mower 590 and the operator protection apparatus 500 are nevertheless identified in FIGS. 28 and 29 and are discussed in detail as such aspects are associated with and/or related to of the control system. Moreover, because many of these aspects of the riding mower 590 and the operator protection apparatus 500 are tied to various functionalities of the control system, such aspects are discussed immediately below and prior to detailed discussions of the control system and aspects thereof.

As shown in FIGS. 28 and 29, the riding mower 590 includes a mower deck 591 and a seat 593 that are both coupled to a frame 592 and also includes a pedal 528, a button 541, an audio indication device 574, and operator controls 595 that are each included in the riding mower 590 and/or coupled to the frame 592 at locations proximate to an operator of the riding mower 590, when the operator is seated in the seat 593. The operator protection apparatus 500 is mounted on the riding mower 590 and includes a first actuator 540 and a second actuator 545 that are operably coupled with and configured to effectuate movement of the operator protection apparatus 500 to and between the raised and lowered positions based on instructions (described in more detail below). When the operator protection apparatus is in a position other than the raised position, the first and second actuators 540, 545 are configured to provide a force required to move the operator protection apparatus 500 toward and into the raised position, and similarly, the first and second actuator 540, 545 are further configured to provide a force required to move the operator protection apparatus 500 toward and into the lowered position when the operator protection apparatus 500 is in a position other than the lowered position.

Although the operator protection apparatus 500 is depicted in FIGS. 28 and 29 with two actuators that are configured effectuate a same direction of movement, in other aspects, it is contemplated the operator protection apparatus 500 may include two actuators that are each configured to effectuate movement in a single, different direction. (i.e., a first actuator configured to provide a first force required to move the operator protection apparatus 500 toward and into the raised position and a second actuator configured to provide a second force required to move the operator protection apparatus 500 toward and into the lowered position). In such aspects, only one of said actuators is operated at a time. In another aspect, it is contemplated that the operator protection apparatus 500 may include a single actuator that is configured to effectuate movement in at least two directions (i.e., at least one actuator configured to provide forces required to move the operator protection apparatus 500 toward and into both the raised and lowered positions.) In other aspects still, the first actuator 540, the second actuator 545, or both may include the hydraulic actuator 180, the electric-hydraulic actuator 182, or the electric-linear actuator 186.

Continuing, the riding mower 590 further includes a computing device 598 that is coupled to the riding mower 590 proximate the mower deck 591 and behind the seat 592. Although not identified in FIGS. 28 and 29, the computing device 598 is communicatively coupled with a first, second, and third input device (not identified), a third sensor (not identified), and an indication device (e.g., illustrated as the audio indication device 574), each of which are respectively associated with the pedal 528, the operator controls 595, the button 541, the seat 593, and the audio indication device 574. In addition, the computing device 598 is communicatively coupled with a first sensor 570 and a second sensor 572 that are associated with the operator protection apparatus 500 and are coupled proximate thereto. Even though many of the foregoing components and their respective coupling with the computing device 598 are not visible in FIGS. 28 and 29, the computing device 598, the first, second, and third inputs, the first sensor, 570, the second sensor 572, the third sensor, and the indication device collectively form a control system for the riding mower 590.

Aspects herein further contemplate that the computing device 598 is configured to receive sensor data from the first sensor 570, the second sensor 572, the third sensor, to receive inputs from the first, second, and third input devices, and to instruct the indication device to provide an indicator. In related aspects, the first and second sensors 570, 572 are configured to collect and communicate to the computing device 598 sensor data related to the operator protection apparatus 500, and the third sensor is configured to collect and communicate to the computing device 598 sensor data related to the seat 593. Such aspects also contemplate that the first input device is configured to transmit an input to the computing device 598 while an associated switch (e.g., the pedal 528) is activated (e.g., depressed), the second input device is configured to transmit an input to the computing device 598 while an associated switch (e.g., the operator controls 595) is activated, and the third input device is configured to transmit an input to the computing device 598 while an associated switch (e.g., the button 541) is activated. In one aspect, the button 541 is a start button and is configured such that an initial downward pressing or depression moves the button 541 to a position that activates an associated switch, which, in turn, energizes the riding mower 590 (e.g., starts the mower). Continuing with this aspect, the button 541 is further configured such that a subsequent downward pressing or depression moves the button 541 to a position that deactivates the associated switch, which, in turn, unenergizes the riding mower 590 (e.g., turns the mower off).

In more detailed aspects, the first sensor 570 and the second sensor 572 are configured to detect a position of the operator protections apparatus 500. Specifically, the first sensor 570 is configured such that the first sensor 570 is engaged when the operator protection apparatus 500 is in the raised position and disengaged when the operator protection apparatus 500 is positioned in any position other than the raised position. Similarly, the second sensor 572 is configured to be engaged when the operator protection apparatus 500 is in the lowered position and disengaged when the operator protection apparatus 500 is any position besides the lowered position. In some aspects, the first sensor 570 may include a projection that is depressed when the operator protection apparatus 500 is the raised position, and similarly, the second sensor 572 may include a projection that is depressed when the operator protection apparatus 500 is the lowered position. In such aspects, a depressed projection may close an electrical switch, and the respective first sensor 570 or second sensor 572 may detect passage of an electrical signal through a circuit completed by closing the electrical switch associated with the depressed projection. Continuing with these aspects, the first and second sensors 570, 572 may be engaged when a respective projection is depressed and disengaged when the respective projection is not depressed. In other aspects, the first and second sensors 570, 572 may be configured to communicate and/or transmit sensed data to the computing device 598 when engaged and/or disengaged that may be used by the logic to determine a position of the operator protection apparatus 500.

In other aspects, the third sensor may be configured to detect a presence of an operator in the seat 593 in a manner that is similar to how the first and second sensors 570, 572 detect a position of the operator protection apparatus 500. As such, the third sensor may be positioned at a location of the riding mower 590 such that the third sensor is engaged when the operator is seated in the seat 593 and is disengaged when the operator is not seated. In one aspect, the third sensor may include a projection that is depressed by a weight of the operator when seated in the seat 593 and that is not depressed in an absence of the weight of the operator. Moreover, the third sensor may be configured to be engaged when the projection is depressed and to be otherwise disengaged, and further, the third sensor may be configured to communicate and/or transmit sensed data to the computing device 598 when engaged and/or disengaged and that sensed data may be used by the logic to determine a position of the operator protection apparatus 500. In some aspects, the third sensor may comprise an electrical circuit with a switch that is closed when the operator is seated in the seat 573 and open when the operator is not seated in the seat 573. In these aspects, the sensed data of the third sensor may comprise an electrical signal that is communicated or not communicated through the electrical circuit.

Additional aspects herein contemplate that the first input device may be configured to be engaged while the pedal 528 is depressed towards the mower deck 591 and to be disengaged while the pedal 528 is not being depressed or during an absence of any depression of the pedal 528. In such aspects, the pedal 528 is configured to operate as a switch and thus, may be a first switch associated with the first input device. In other aspects, the pedal 528 itself is not a switch but is associated with a first switch that is activated while the pedal 528 is depressed towards the mower deck 591 and deactivated while the pedal 528 is not being depressed. Such aspects contemplate that the first input device is engaged while the first switch is activated and disengaged while the first switch is deactivated. In other aspects, the first input device may be configured to transmit an input to the computing device 598 while engaged and cease transmittance of the input while disengaged. Moreover, the logic may use the input or absence of the input to make a determination for controlling an operation of the riding mower 590.

In further aspects, the second input device may be configured in a manner similar to that of the first input device, but may be associated with a different component of the riding mower 590. As such, the second input device may be configured to be engaged while the operator controls 595 are in a drive position and disengaged while the operator controls 595 are in a position other than the drive position (e.g., a park position). In these aspects, the operator controls 595 are configured to operate as a switch and thus, there may be a second switch associated with the second input device. In other aspects, the operator controls 595 are not themselves a switch but are associated with a second switch that is activated while the operator controls 595 are in the drive position and deactivated when the operator controls 595 are not in the drive position. Such aspects contemplate that the second input device is engaged while the second switch is activated and disengaged while the second switch is deactivated. Additional aspects contemplate that the second input device may be configured to transmit an input to the computing device 598 while engaged and cease transmittance of the input while disengaged and further contemplate that the logic may use the input or absence of an input to make a determination for controlling an operation of the riding mower 590.

In even further aspects, the third input device may be configured in a manner similar to that of the first and second input devices, but may be associated with the button 541. Thus, the third input device may be configured to be engaged while the button 541 is depressed and disengaged while the button 541 is not being depressed or during an absence of any depression of the button 541. In such aspects, the button 541 is configured to operate as a switch and may be a third switch associated with the third input device. Other aspects contemplate that the button 541 itself is not a switch but is be associated with a third switch that is activated while the button 541 is depressed and deactivated while the button 541 is not being depressed. These aspects also contemplate that the third input device is engaged while the third switch is activated and disengaged while the third switch is deactivated. Additional aspects contemplate that the third input device may be configured to transmit an input to the computing device 598 while engaged and cease transmittance of the input while disengaged and further contemplate that the logic may use the input or absence of an input to make a determination for controlling an operation of the riding mower 590.

In even further aspects still, the indication device is configured to provide an indicator for alerting an operator when the riding mower 590 is in a specified condition. Such aspects, contemplate that the computing device 598 may instruct the indication device to provide an indicator based on sensor data and/or inputs received from the first, second, and third inputs, the first sensor, 570, the second sensor 572, and/or the third sensor. The indication device may be associated with and may provide an indicator, and in one aspect, the indication device may be the audio indication device 574, which is associated with an indicator that includes an audio output. Moreover, when the riding mower 590 and/or components thereof satisfy specified conditions, the computing device 598 instructs the audio indication device 574 to provide the associated indicator, resulting in a generation of an audio output. Further, when the riding mower 590 is no longer in the specified conditions, the computing device 598 ceases to instruct the audio indication device 574 and the associated indicator is not provided, thereby terminating or ceasing a generation of the audio output.

In one example, a specified condition of the riding mower 590 is the operator protection apparatus 500 being in a position other than the raised position, and in such condition, the computing device 598 would instruct the audio indication device 574 to provide the audio output (e.g., beeping sound) while the operator protection apparatus 500 is not in the raised position and ceases to instruct the audio indication device 574 when the operator protection apparatus 500 is in the raised position. Stated more simply, a beeping sound is generated when the operator protection apparatus 500 is in not in the raised position, and the beeping sound stops or is not generated while the operator protection apparatus 500 is in the raised position.

As mentioned, aspects herein contemplate that the computing device 598 is configured to control one or more operations of the riding mower 590, and in such aspects, the computing device 598 instructs and ceases the one or more operations based on sensed data and/or inputs received by the first sensor 570, the second sensor 572, the third sensor, and/or the first, second, and third input devices to make a number of determinations in connection with controlling various operations of the riding mower 590. These aspects also contemplate that the computing device 598 is communicatively coupled to and/or integrated with one or more components of the riding mower 590 and is configured to instruct and cease operations involving the one or more components. In one such aspect, the computing device 598 is communicatively coupled to the first and second actuators 540, 545 and is configured to instruct and cease actuation for moving the operator protection apparatus 500. Further, the computing device 598 may instruct and cease a first actuation and a second actuation for moving the operator protection apparatus 500 in a downward direction and an upward direction, respectively.

Continuing with these aspects, the computing device 598 is configured to control one or more operations of the riding mower 590 in accordance with the logic. Generally, the logic is configured such that the computing device 598 instructs and ceases an operation when one or more components of the riding mower 598 is in a specified condition, which in turn, is reflected by a condition of an associated switch and/or component of the control system. Further, the logic is configured to determine such a condition from sensor data and/or inputs being received by the computing device 598. More specific aspects of the logic are better explained by way of example and thus, are discussed in the following with reference to FIG. 30.

Figure 30:
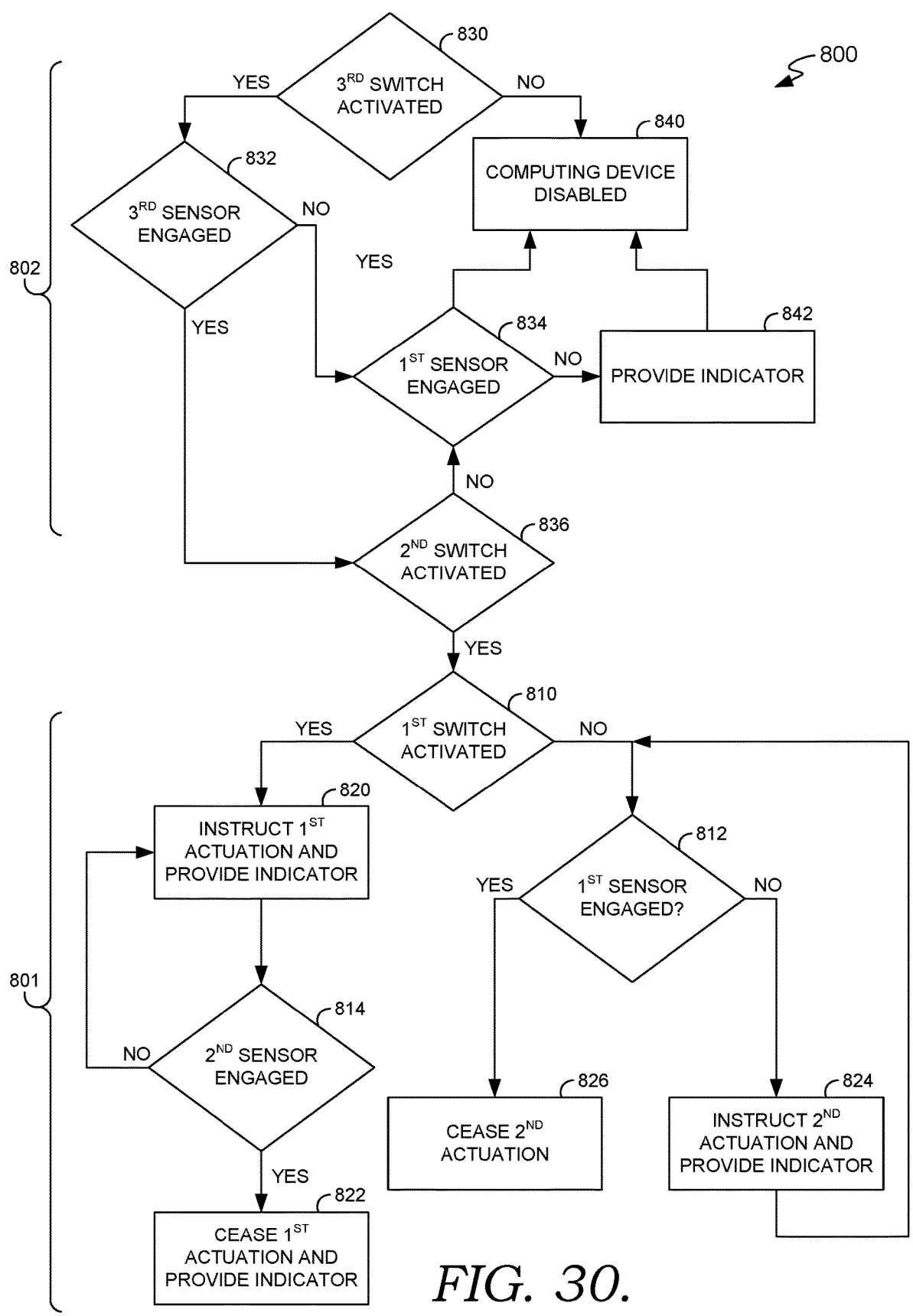
FIG. 30 is a flow diagram of a logic used by a control system for controlling one or more operations of a terrain working vehicle with an operator protection apparatus, in accordance with aspects hereof.

FIG. 30 depicts a flow diagram 800 representing a logic used by a control system for controlling one or more operations of a terrain working vehicle. To aid in explanation, the flow diagram 800 will be described with general reference to aspects of the riding mower 590 and the control system previously described in connection with FIGS. 28 and 29, however, the following description may be applied to any type of terrain working vehicle. As shown in FIG. 30, the logic includes a first logic 801 and a second logic 802. The first logic 801 begins at a block 810, which represents a condition of a first switch (e.g., activated or deactivated), and each connector extending from the block 810 indicates a progression of the first logic 801 while the first switch is in a respective condition. As such, when the first switch is activated, the first logic 801 progresses to a block 820 and alternatively, progresses to a block 812 when the first switch is deactivated.

The block 820 represents that the computing device instructs a first actuation of the operator protection apparatus (e.g., moving the operator protection apparatus 500 downward towards the lowered position) and provides an indicator (e.g., beeping sound) while the first switch is activated (e.g., the pedal 528 is depressed). Next, while the computing device instructs the operations represented by the block 820, the first logic progresses to a block 814, which represents detecting a condition of a second sensor (e.g., engaged or disengaged), and each connector arrow extending away from the block 814 indicates a progression of the first logic 801 when the second sensor is in a respective condition. When the second sensor is disengaged (e.g., the operator protection apparatus 500 is in a position other than the lowered positioned), the first logic 801 returns to the block 820, and consequently, the computing device continues instructing the first actuation of the operator protection apparatus and providing the indicator. When the second sensor is engaged (e.g., when the operator protection apparatus 500 has reached the lowered position), the first logic 801 progresses to a block 822, which represents that the computing device ceases the first actuation. Thus, when the second sensor is engaged, the computing device ceases the first actuation.

As an example, when the foregoing phase of the first logic 801 is implemented in the riding mower 590, while the pedal 528 is depressed (i.e., the first switch is activated), the computing device 598 instructs the first actuation, and the first and second actuators 540, 545 move the operator protection apparatus 500 downward. The operator protection apparatus 500 continues to be moved downward until reaching or being moved into the lowered position, at which point, the second sensor 572 is engaged. When the second sensor 572 is engaged, the computing device 598 ceases the first actuation, and the first and second actuators 540, 545 stop moving the operator protection apparatus 500. All the while, the computing device 598 instructs the audio indicator 574 to provide the audio output, and a beeping sound is made.

So long as the first switch is activated (e.g., the pedal 528 is depressed), the operator protection apparatus will continue to be moved towards the lowered position or held in the lowered position upon arrival. Once the first switch is deactivated (e.g., the pedal 528 is not depressed), however, the first logic proceeds from block 810 to block 812 to determine if operator protection apparatus needs to be moved to the raised position, as described below.

At block 812, a condition of a first sensor is represented (e.g., engaged or disengaged), and when the first sensor is disengaged (e.g., the operator protection apparatus 500 is in a position other than the raised positioned), the computing device instructs a second actuation of the operator protection apparatus (e.g., moving the operator protection apparatus 500 upward towards the raised position) and provides an indicator (e.g., beeping sound), as represented by a block 824. When the first sensor is disengaged (e.g., the operator protection apparatus 500 is in a position other than the raised positioned) and the first switch remains deactivated, the first logic 801 returns to the block 812, and consequently, the computing device continues instructing the second actuation of the operator protection apparatus and providing the indicator.

Once the operator protection apparatus reaches the raised position and the first sensor is engaged, the first logic 801 proceeds to a block 826 that represents that the computing device ceases the second actuation. Thus, when the first sensor is engaged (e.g., the operation protection apparatus 500 is in the raised position), the computing device ceases the second actuation.

In an example of the foregoing phase of the first logic 801 being implemented in the riding mower 590, while the pedal 528 is not depressed (i.e., the first switch is deactivated) and the operator protection apparatus 500 is not in the raised position, the computing device 598 instructs the second actuation, and the first and second actuators 540, 545 move the operator protection apparatus 500 upward. In addition, the computing device 598 instructs the audio indication device 574 to provide the audio output, and a beeping sound is made when the operator protection apparatus 500 is not in the raised position. The computing device 598 continues to instruct the second actuation and the audio indication device 574 until the operator protection apparatus 500 is moved into the raised position, at which point the first sensor 570 is engaged. When the first sensor 570 is engaged, the computing device 598 ceases the second actuation and ceases to instruct the audio indication device 574, and the first and second actuators 540, 545 stop moving the operator protection apparatus 500 and the beeping sound stops or is no longer made.

Moving now to the second logic 802, a block 830 represents a condition of a third switch (e.g., activated or deactivated), and two connector arrows extend from the block 830 in different directions to represent a progression of the second logic 802 while the third switch is in a respective condition. As shown in FIG. 30, while the third switch is activated, the second logic 802 progresses to a block 832 and alternatively, progresses to a block 840 while the third switch is deactivated. The block 840 represents that computing device is disabled from instructing and ceasing operations while the third switch is deactivated (e.g., the button 541 is deactivated and the riding mower 590 is unenergized). In these aspects, the third switch may be configured to energize and unenergize a terrain working vehicle while the third switch is activated and deactivated, respectively. Such aspects contemplate that the third switch may be a start button (e.g., the button 541) or a keyed ignition that is configured to be activated while a key is received and deactivated while the key is removed.

As an example, when the foregoing phase of the second logic 802 is implemented in the riding mower 590, while the button 541 is not been depressed (i.e., the third switch is deactivated), a switch associated with the button 541 is deactivated and the riding mower 590 is unenergized (e.g., turned off). Consequently, the computing device 598 is disabled from instructing the first and second actuations and the audio indication device 574, and the first and second actuators 540, 545 do not move the operator protection apparatus 500 and the beeping sound is not made.

Continuing with FIG. 30, the block 832 represents a condition of a third sensor (e.g., engaged or disengaged), and each connector arrow extending away from the block 832 indicates a progression of the second logic 802 when the third sensor is in a respective condition. When the third sensor is disengaged (e.g., an operator is not present in the seat 573), the second logic progresses to a block 834, which represents a condition of the first sensor. Then, when the first sensor is engaged (e.g., the operator protection apparatus 500 is in the raised position), the second logic 802 progresses to the block 840, and the computing device is disabled from instructing and ceasing operations. When the first sensor is disengaged (e.g., the operator protection apparatus 500 is in a position other than the raised positioned), the second logic 802 progresses to a block 842, which represents that the computing device provides an indicator and then, progresses to the block 840. As such, when the first sensor is disengaged, the computing device provides the indicator but is disable from instructing and ceasing other operations.

As an example, when the foregoing phase of the second logic 802 is implemented in the riding mower 590, when an operator is not present in the seat 573 (i.e., the third sensor is disengaged), the computing device 598 is disabled from instructing the first and second actuations, and the first and second actuators 540, 545 do not move the operator protection apparatus 500. Stated another way, the operator protection apparatus 500 is held in a current position when the operator is not present in the seat 573. In addition, when the operator protection apparatus 500 is in a position other than the raised position, the computing device 598 instructs the audio indicator 574 to provide the audio output, and a beeping sound is made.

Returning to the block 832, when the third sensor is engaged (e.g., the operator is present in the seat 573), the second logic progress to a block 836, which represents a condition of a second switch (e.g., activated or deactivated), and each connector arrow extending away from the block 836 indicates a progression of the second logic 802 while the second switch is in a respective condition. While the second switch is deactivated (e.g., the operator controls 595 are in a position other than a drive position, such as a park position) the second logic 802 progresses to the block 834 and then, progresses from the block 832 in the manner discussed above. While the second switch is activated (e.g., the operator controls 595 are in a drive position), the second logic 802 progresses to the block 810, and the first logic 801 is implemented.

In an example of the foregoing phase of the second logic 802 being implemented in the riding mower 590, when the operator is present in the seat 573 (i.e., the third sensor is engaged) and while the operator controls 595 are in the drive position (i.e., the second switch is activated), the operator protection apparatus 500 moves in the manner discussed in the previous examples when the pedal 528 is or is not depressed.

Figure 31:
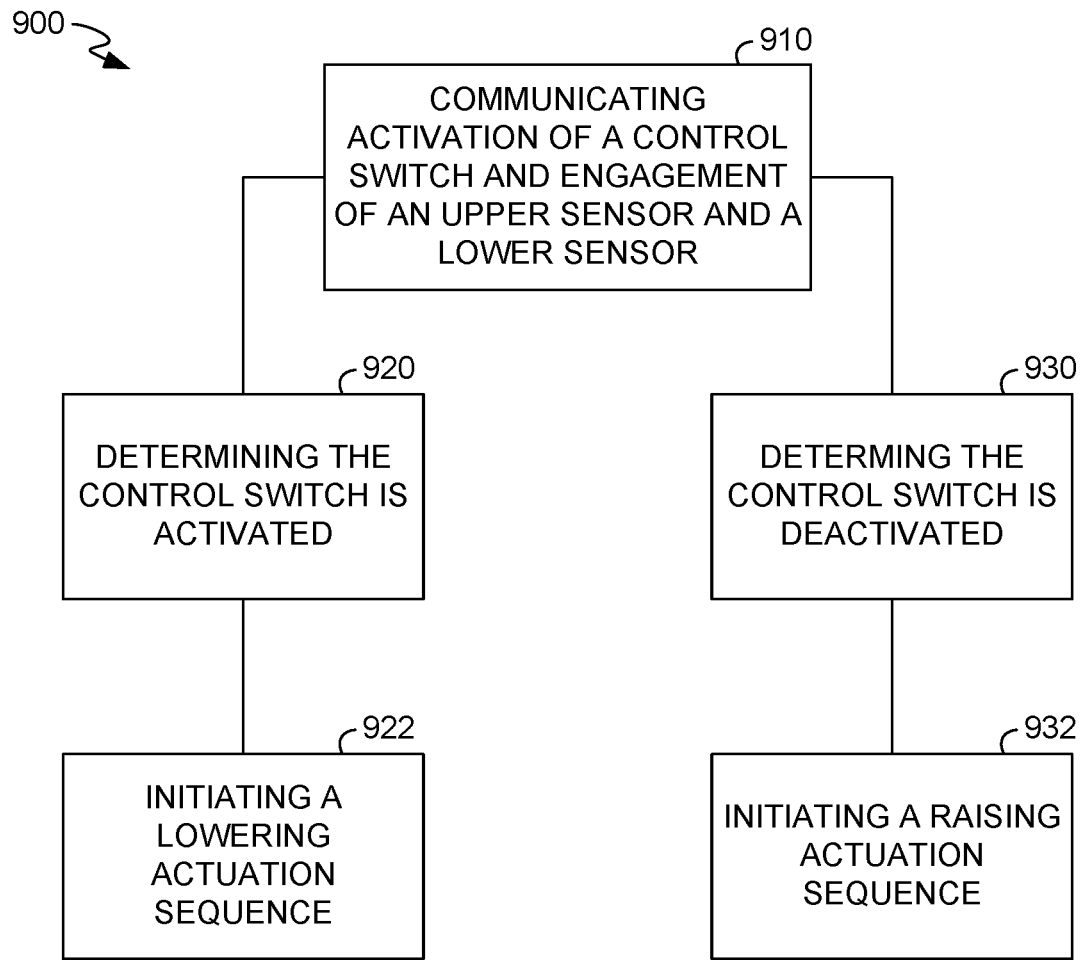
FIG. 31 is a flow diagram of a method for controlling one or more operations of a terrain working vehicle having an operator protection apparatus, in accordance with aspects hereof.

Turning now to FIG. 31, a flow diagram 900 representing a method for controlling one or more operations of a terrain working vehicle having an operator protection apparatus is depicted, in accordance with aspects hereof. To aid in explanation, the flow diagram 900 will be described with general reference to aspects of the riding mower 590 and the control system previously described in connection with FIGS. 28 and 29, however, this method may be implemented on any type of terrain working vehicle contemplated herein. At a block 910, an activation of a control switch and an engagement of an upper sensor and a lower sensor are communicated to a computing device. The control switch may be associated with an input device, and in some aspects, the control switch may be configured to operate as an input device. The upper and lower sensors are associated with an operator protection apparatus, and an engagement of the upper and lower sensors corresponds to a position of the operator protection apparatus. Next, the control switch is determined to be activated or deactivated, as depicted at a block 920 and a block 930, respectively. Upon making a determination that the control switch is activated, a lowering actuation sequence is initiated, which is depicted at a block 922. The lowering actuation sequence may comprise the computing device instructing an actuator to move the operator protection apparatus in a down direction while the control switch is activated and when the lower sensor is disengaged and ceasing instructing the actuator to move the operator protection apparatus in the down direction while the control switch is activated and when the lower sensor is engaged. The lowering actuation sequence may further comprises providing an indicator when the lower sensor is disengaged.

Returning the block 930, upon making a determination that the control switch is deactivated, a raising actuation sequence is initiated as depicted at a block 932. The raising actuation sequence may comprise the computing device instructing the actuator to move the operator protection apparatus in an up direction while the control switch is deactivated and when the upper sensor is disengaged and ceasing instructing the actuator to move the operator protection apparatus in the up direction while the control switch is deactivated and when the upper sensor is engaged. In addition, the raising actuation sequence may also comprise providing the indicator when the upper sensor is disengaged and ceasing providing the indicator when the upper sensor is engaged.

Figure 32:
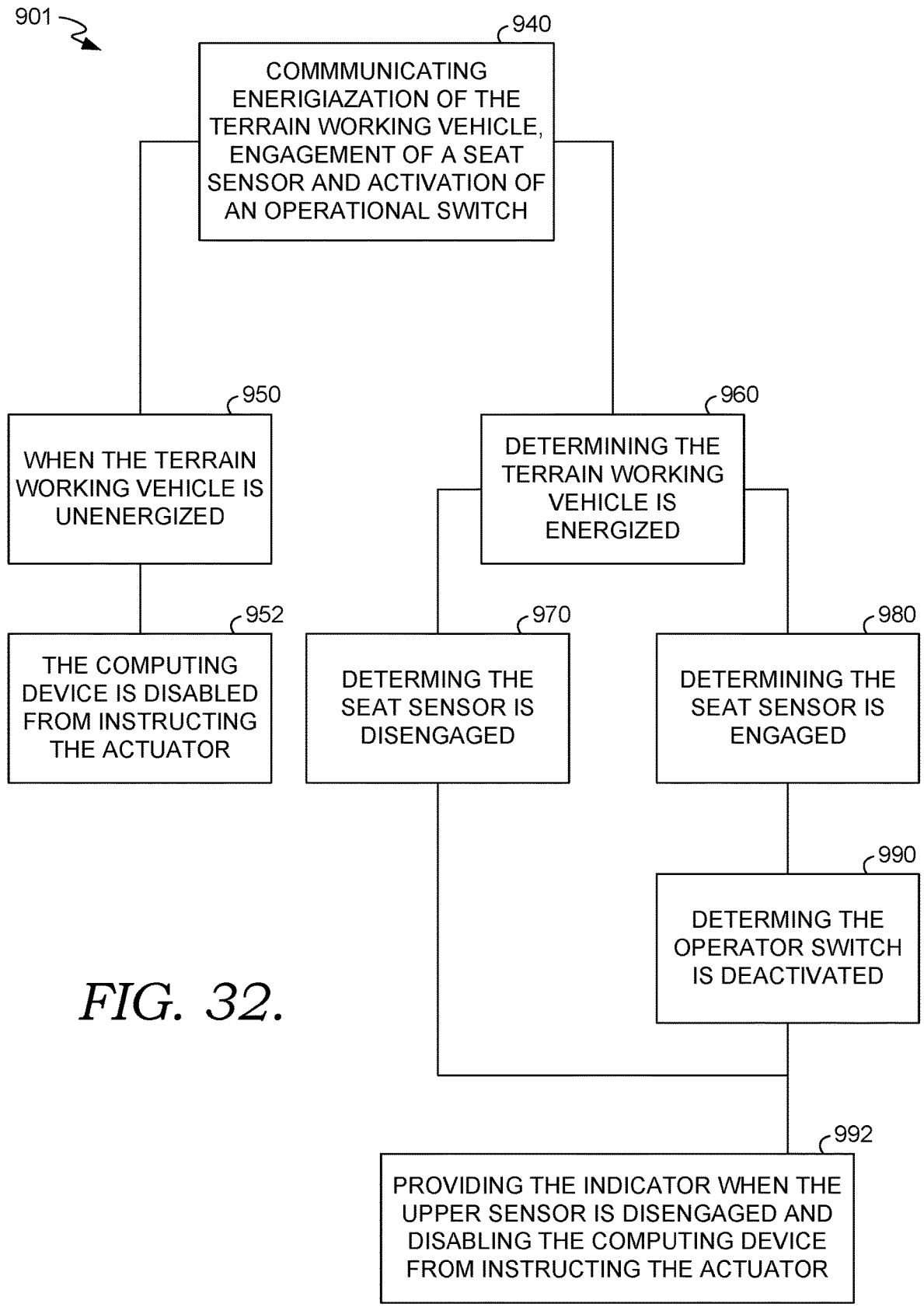
FIG. 32 is a flow diagram of additional steps of the method for controlling one or more operations of a terrain working vehicle having an operator protection apparatus, in accordance with aspects hereof.

Turning now to FIG. 32, a flow diagram 901 representing additional steps of the method for controlling one or more operations of a terrain working vehicle having an operator protection apparatus is depicted, in accordance with aspects hereof. At a block 940, an energization of the terrain working vehicle, an engagement of a seat sensor, and an activation of an operation switch are communicated to a computing device. Next, the terrain working vehicle is unenergized or determined to be energized, as depicted at a block 950 and a block 960, respectively. When the terrain working vehicle is unenergized, the computing device is disabled from instructing the actuator to move the operator protection apparatus, which is depicted at a block 952.

Returning to the block 960, upon making a determination that the terrain working vehicle is energized, the seat sensor is determined to be disengaged or engaged, as depicted at a block 970 and a block 980, respectively. Upon making a determination that the seat sensor is disengaged, the indicator is provided and the computing device is disabled from instructing the actuator to move the operator protection apparatus, which is depicted at a block 992. For example, in the riding mower 590, when an operator is not present the seat 573, the operator protection apparatus 500 is held in a current position and the audio indication device 574 provides the audio indicator (e.g., a beeping sound). Upon making a determination that the seat sensor is engaged, an activation of the operator switch (e.g., the operator controls 595) is then determined. Next, as depicted at a block 990, upon making a determination that the operator switch is deactivated, the indicator is provided and the computing device is disabled from instructing the actuator to move the operator protection apparatus, as depicted at the block 992.

As an example, in the riding mower 590, while the operator controls 595 are in a position other than a drive position, the computing device 598 is disabled from instructing the first and second actuators 540, 545 to move the operation protection apparatus 500, and as a result, the operator protection apparatus 500 is held in a current position. Continuing, when the operator protection apparatus 500 is not in the fully raised position, the computing device 598 instructs the audio indicator 574 to provide the audio output, and a beeping sound is made.

Figure 33:
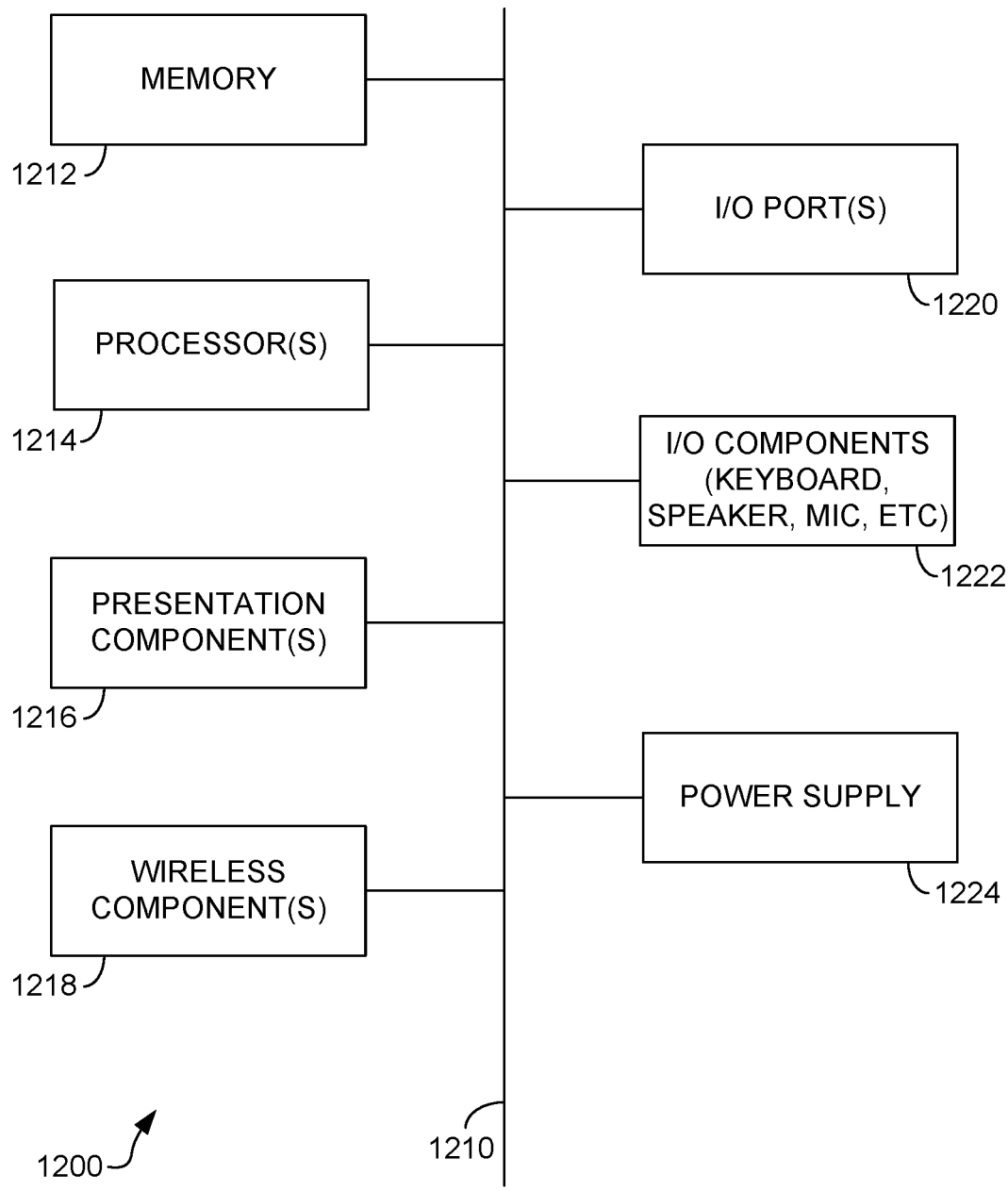
FIG. 33 is a block diagram of a computing device of a control system for controlling one or more operations of a terrain working vehicle with an operator protection apparatus, in accordance with aspects hereof.

Turning now to FIG. 33 a block diagram of an illustrative computing device is provided and is referenced generally by the numeral 1200. As used throughout this disclosure, the computing device is meant to encompass a wide variety of computing devices with different components and combinations thereof. Although some components are shown in the singular, they may be plural. For example, the computing device 1200 might include multiple processors or multiple power supplies, etc. In addition, some components may be removed entirely or may be included to perform a certain task and then removed once the task has been completed. For instance, the computing device 1200 might include a presentation component and an input component when programing and/or troubleshooting, but once the programing and/or troubleshooting is completed, the presentation component and then input component are removed and the computing device 1200 no longer includes these components. Notwithstanding, as illustratively shown, the computing device 1200 includes a bus 1210 that directly or indirectly couples various components together including memory 1212, a processor 1214, a presentation component 1216, wireless component 1218, input/output ports 1220, input/output components 1222, and a power supply 1224.

The memory 1212 might take the form of memory components previously described. Thus, further elaboration will not be provided here, only to say that the memory component 1212 can include any type of medium that is capable of storing information (e.g., a database). In one aspect, the memory 1212 includes a set of embodied computer-executable instructions that, when executed, facilitates various aspects disclosed herein. Such instructions may include the logic and operational commands for instructing and ceasing an operation of a terrain working vehicle.

The processor 1214 might actually be multiple processors that receive instructions and process them accordingly. The presentation component 1216 includes the likes of a display, a speaker, a touch screen interface, as well as other components that can present information, and as mentioned, may be included and removed, as is needed to perform certain tasks associated with the computing device 1200. In some aspects, the presentation component 1216 may be included to display information related to operations and conditions of a terrain working vehicle. The wireless components 1218 facilitates communication with other components of the control system, including Wi-Fi®, Bluetooth® communications, GIS communications, and other near-field communications.

The input/output port 1220 might take on a variety of forms. Illustrative input/output ports include a USB jack, stereo jack, infrared port, proprietary communications ports, and the like. In one aspect, the input/output ports 1200 are configured to receive wires that communicatively couple the computing device 1200 to other components of the control system including the one or more sensors, the one or more input devices, and the one or more indication devices. In yet another aspect, the input/out ports 1200 are configured to receive wires that communicatively couple the computing device 1200 to components of a terrain working vehicle such as the at least one actuator or the one or more switches. The input/output components 1222 include items such as keyboards, microphones, speakers, touch screens, and any other item usable to directly or indirectly input data into the computing device 1200. In some aspects, the input/output components 1222 comprise components of the control system or a terrain working vehicle including, but not limited to, the one or more sensors, the one or more input devices, the one or more indication devices, the at least one actuator, and the one or more switches. The power supply 1224 includes items such as batteries, fuel cells, or any other component that can act as a power source to power the computing device 1200, and in one aspect, the power supply 1224 is a power source provided by a terrain working vehicle.

Turning now to a general discussion of each of the embodiments described hereinabove, a variety of features discussed with respect to specific embodiments may be implemented with any of the embodiments described herein. Additionally, some of the features described hereinabove may include variations, which may be applicable to each of the embodiments described herein. For example, although the embodiments described hereinabove and depicted in the figures may provide advantageous configurations, other configurations should be considered within the scope of this disclosure.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

What is claimed is:

1. A control system for a terrain working vehicle having an operator protection apparatus movable to and between a raised position and a lowered position, the control system comprising:
   a computing device configured to instruct and cease a first actuation for moving the operator protection apparatus in a down direction and a second actuation for moving the operator protection apparatus in an up direction;
   a first sensor communicatively coupled with the computing device and engaged when the operator protection apparatus is in the raised position;
   a second sensor communicatively coupled with the computing device and engaged when the operator protection apparatus is in the lowered position;
   a first input device communicatively coupled with the computing device; and
   a first switch associated with the first input device that is configured to be activated when the first input device is engaged;
   wherein, while the first switch is activated, the computing device instructs the first actuation when the second sensor is disengaged and ceases the first actuation when the second sensor is engaged, and
   wherein, while the first switch is deactivated, the computing device instructs the second actuation when the first sensor is disengaged and ceases the second actuation when the first sensor is engaged.

2. The control system of claim 1 further comprising an indication device communicatively coupled with the computing device and configured to provide an indicator.

3. The control system of claim 2, wherein, when the first sensor is disengaged, the indication device provides the indicator.

4. The control system of claim 3 further comprising a third sensor communicatively coupled with the computing device and engaged when an operator seat of the terrain working vehicle is occupied.

5. The control system of claim 4, wherein, when the third sensor is disengaged, the computing device ceases the first and second actuations.

6. The control system of claim 5 further comprising a second input device communicatively coupled with the computing device and engaged while a second switch associated with the second input device is activated.

7. The control system of claim 6, wherein, while the second switch is deactivated, the control system is disabled.

8. The control system of claim 7 further comprising a third input device communicatively coupled with the computing device and engaged while a third switch associated with the third input device is activated.

9. The control system of claim 8, wherein, while the third switch is activated, the terrain working vehicle is energized.

10. The control system of claim 9, wherein, while the third switch is deactivated, the terrain working vehicle is unenergized and the control system is disabled.

11. A terrain working vehicle comprising:
    an operator protection apparatus mechanically connected to the terrain working vehicle and moveable to and between a raised position and a lowered position;
    at least one actuator operably coupled to the operator protection apparatus and configured to move the operator protection apparatus to and between the raised position and the lowered position;
    a computing device coupled proximate a frame of the terrain working vehicle and communicatively coupled to the at least one actuator, the computing device configured to instruct one or more operations of the terrain working vehicle based on one or more of (1) sensor data and (2) one or more inputs received by the computing device;
    a first sensor coupled proximate the operator protection apparatus and communicatively coupled with the computing device, the first sensor configured to be engaged when the operator protection apparatus is in the raised position;
    a second sensor coupled proximate the operator protection apparatus and communicatively coupled with the computing device, the second sensor configured to be engaged when the operator protection apparatus is in lowered position; and
    a first input device coupled proximate a seat of the terrain working vehicle and communicatively coupled with the computing device, the first input device configured to be engaged while a first switch associated with the first input device is activated and to be disengaged while the first switch is deactivated.

12. The terrain working vehicle of claim 11, wherein, while the first switch is activated, the first input device communicates a first input to the computing device and wherein, while the first input is being received, the computing device instructs the at least one actuator to move the operator protection apparatus in a lowered direction when the second sensor is disengaged and ceases to instruct the at least one actuator when the second sensor is engaged.

13. The terrain working vehicle of claim 12, wherein, while the first switch is deactivated, the first input device ceases communicating the first input to the computing device and wherein, while the first input is absent, the computing device instructs the at least one actuator to move the operator protection apparatus in a raised direction when the first sensor is disengaged and ceases to instruct the at least one actuator when the first sensor is engaged.

14. The terrain working vehicle of claim 13 further comprising a third sensor coupled proximate the seat of the terrain working vehicle and communicatively coupled with the computing device, the third sensor configured to be engaged when the operator is seated in the terrain working vehicle.

15. The terrain working vehicle of claim 14 further comprising an indication device communicatively coupled with the computing device, the indication device configured to provide an indicator, wherein, when the first sensor is disengaged, the indication device provides the indicator.

16. The terrain working vehicle of claim 15, wherein the first switch comprises a pedal coupled to a floor of the terrain working vehicle, wherein, while the pedal is depressed towards the floor, the first switch is activated, and wherein, while the pedal is undepressed, the first switch is deactivated.

17. A method for controlling one or more operations of a terrain working vehicle having an operator protection apparatus, the method comprising:
    communicating, to a computing device, activation of a control switch and engagement of an upper sensor and a lower sensor;
    determining the control switch is activated;
    upon determination that the control switch is activated, initiating a lowering actuation sequence comprising:
        the computing device instructing an actuator to move the operator protection apparatus in a down direction while the control switch is activated and when the lower sensor is disengaged,
        the computing device ceasing instructing the actuator to move the operator protection apparatus in the down direction while the control switch is activated and when the lower sensor is engaged, and
        providing an indicator when the upper sensor is disengaged,
    determining the control switch is deactivated; and
    upon determination that the control switch is deactivated, initiating a raising actuation sequence comprising:
        the computing device instructing the actuator to move the operator protection apparatus in an up direction while the control switch is deactivated and when the upper sensor is disengaged,
        the computing device ceasing instructing the actuator to move the operator protection apparatus in the up direction while the control switch is deactivated and when the upper sensor is engaged, and
    providing the indicator when the upper sensor is disengaged and ceasing providing the indicator when the upper sensor is engaged.

18. The method of claim 17 further comprising:
communicating, to the computing device, energization of the terrain working vehicle, engagement of a seat sensor, and activation of an operation switch; and
when the terrain working vehicle is unenergized, disabling the computing device from instructing the actuator to move the operator protection apparatus.

19. The method of claim 18 further comprising:
determining the terrain working vehicle is energized;
determining the seat sensor is disengaged; and
upon determination that the seat sensor is disengaged, providing the indicator when the upper sensor is disengaged and disabling the computing device from instructing the actuator to move the operator protection apparatus.

20. The method of claim 19 further comprising:
determining the seat sensor is engaged;
determining the operation switch is deactivated; and
upon determination that the operation switch is deactivated, providing the indicator when the upper sensor is disengaged and disabling the computing device from instructing the actuator to move the operator protection apparatus.

* * * * *

UNITED STATES PATENT AND TRADEMARK OFFICE
CERTIFICATE OF CORRECTION

| | |
|---|---|
| PATENT NO. | : 11,198,408 B2 |
| APPLICATION NO. | : 16/700715 |
| DATED | : December 14, 2021 |
| INVENTOR(S) | : Harlan J. Bartel et al. |

It is certified that error appears in the above-identified patent and that said Letters Patent is hereby corrected as shown below:

In the Drawings

• Sheet 29 of 31, Reference Numeral 930, FIG. 31.: Delete "DETERMING" and insert -- DETERMINING --.

• Sheet 30 of 31, Reference Numeral 940, FIG. 32.: Delete "ENERIGIAZATION" and insert -- ENERGIZATION, --.

• Sheet 30 of 31, Reference Numeral 970, FIG. 32.: Delete "DETERMING" and insert -- DETERMINING --.

• Sheet 30 of 31, Reference Numeral 990, FIG. 32.: Delete "DETERMING" and insert -- DETERMINING --.

In the Specification

• In the Cross-Reference to Related Applications, Column 1, Lines 13-14: Delete "Deployable Operator Protection Apparatus with an Over-Center Linkage" and insert -- Rollover Protection Apparatus --.

• Column 3, Line 15: Delete "hereof:" and insert -- hereof; --.

• Column 7, Line 64: Delete "positon." and insert -- position. --.

• Column 8, Line 1: Delete "the a" and insert -- a --.

• Column 12, Line 37: Delete "positon." and insert -- position. --.

• Column 17, Line 1: Delete "the a" and insert -- the --.

Signed and Sealed this
Twenty-sixth Day of April, 2022

*Katherine Kelly Vidal*
Katherine Kelly Vidal
*Director of the United States Patent and Trademark Office*

CERTIFICATE OF CORRECTION (continued)
U.S. Pat. No. 11,198,408 B2

- Column 19, Line 7: Delete "The a" and insert -- The --.

- Column 20, Line 10: Delete "a an" and insert -- an --.